(12) United States Patent
Bedford

(10) Patent No.: US 12,493,866 B2
(45) Date of Patent: Dec. 9, 2025

(54) SYSTEM, METHOD AND DEVICE FOR PROCESSING A TRANSACTION

(71) Applicant: Charles Christian Bedford, Yonkers, NY (US)

(72) Inventor: Charles Christian Bedford, Yonkers, NY (US)

( * ) Notice: Subject to any disclaimer, the term of this patent is extended or adjusted under 35 U.S.C. 154(b) by 0 days.

(21) Appl. No.: 18/625,362

(22) Filed: Apr. 3, 2024

(65) Prior Publication Data

US 2024/0338668 A1 Oct. 10, 2024

Related U.S. Application Data

(63) Continuation of application No. 17/517,645, filed on Nov. 2, 2021, now Pat. No. 11,989,713, which is a continuation-in-part of application No. 15/736,772, filed as application No. PCT/ZA2016/000016 on Jun. 23, 2016, now Pat. No. 11,216,776.

(30) Foreign Application Priority Data

Jun. 26, 2015 (ZA) .................................. 2015/04635

(51) Int. Cl.
G06Q 20/20 (2012.01)
G06Q 10/087 (2023.01)
G06Q 20/38 (2012.01)
G06Q 20/40 (2012.01)

(52) U.S. Cl.
CPC ......... G06Q 20/203 (2013.01); G06Q 10/087 (2013.01); G06Q 20/38215 (2013.01); G06Q 20/4014 (2013.01)

(58) Field of Classification Search
CPC ............... G06Q 20/203; G06Q 10/087; G06Q 20/38215; G06Q 20/4014; G06Q 20/065; G06Q 20/206; G06Q 20/208; G06Q 20/3825; G06Q 20/389; G06Q 20/401; G06Q 20/4012; G06Q 20/40145; G06Q 20/407; G07G 1/0045; G07G 1/009
See application file for complete search history.

(56) References Cited

U.S. PATENT DOCUMENTS

2016/0300234 A1* 10/2016 Moss-Pultz ........... H04L 9/3247

* cited by examiner

Primary Examiner — A. Hunter Wilder

(57) ABSTRACT

A method for use in a computing device, comprising: receiving, from a remote device, a request to record an asset transfer in a first blockchain system; authenticating the request by using an authentication mechanism that is independent of the first blockchain system and obtaining an authentication record indicating that the request has been authenticated successfully; and recording the asset transfer in the first blockchain system, the asset transfer being recorded by storing the authentication record and a record of the asset transfer in a first ledger of the first blockchain system, wherein recording the asset transfer includes associating an instance of the record of the asset transfer that is stored in the first ledger of the first blockchain system with an instance of the authentication record that is stored in the first ledger of the first blockchain system.

19 Claims, 42 Drawing Sheets

```
3330                                    ┌──3321
┌─────────────────────────────────────────┐
│ PAIR A RECIPIENT DEVICE TO A SUPPLIER   │
│                DEVICE                   │
└─────────────────────────────────────────┘
                    │
                    ▼              ┌──3323
┌─────────────────────────────────────────┐
│    GENERATE AN AUTHENTICATION RECORD    │
└─────────────────────────────────────────┘
                    │
                    ▼              ┌──3325
┌─────────────────────────────────────────┐
│         RECORD AN ASSET TRANSFER        │
└─────────────────────────────────────────┘
```

6012

6012

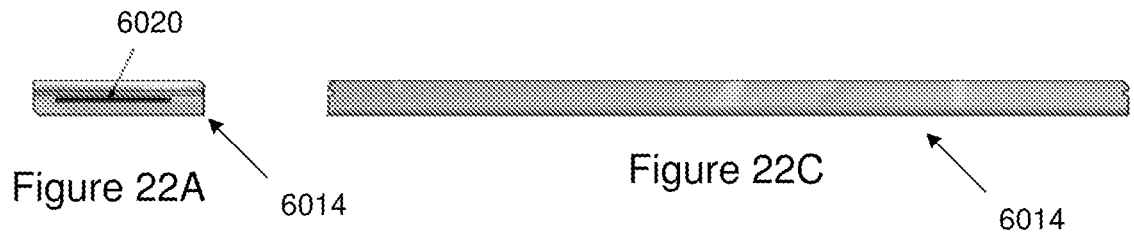
Figure 22A
Figure 22C
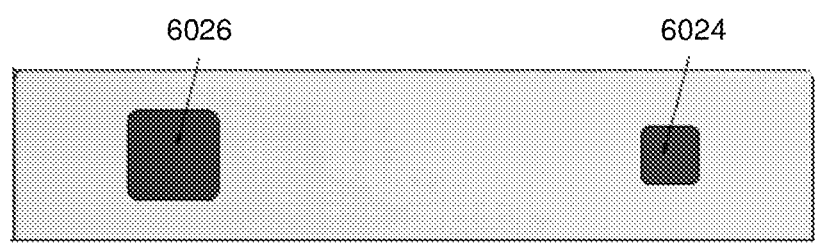
Figure 22D
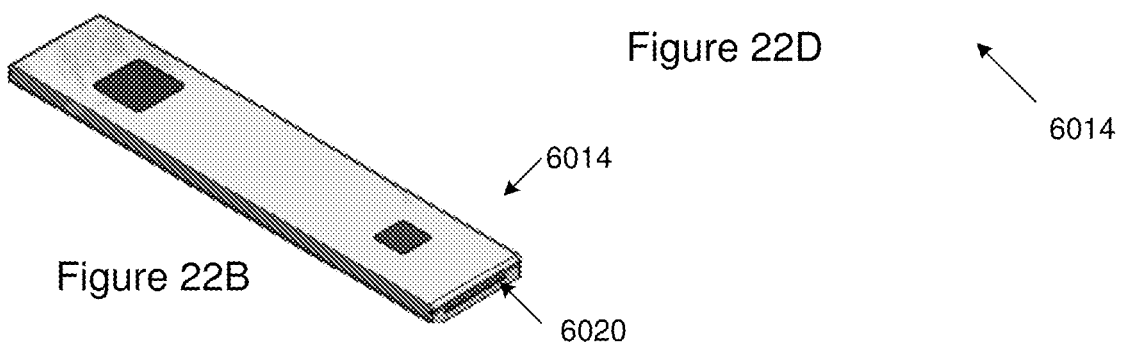
Figure 22B
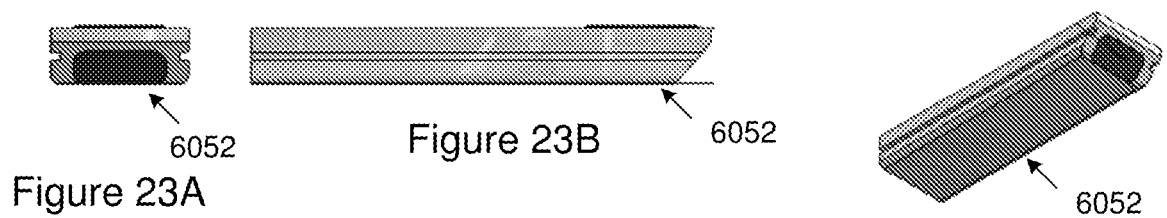
Figure 23A
Figure 23B
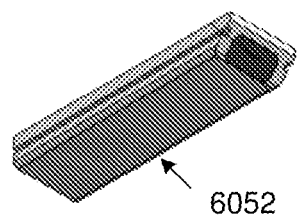
Figure 23C
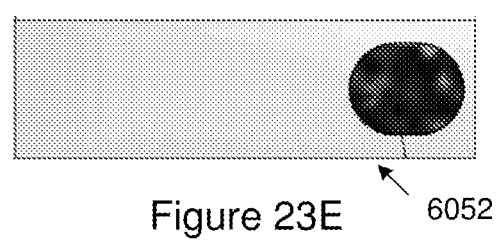
Figure 23E
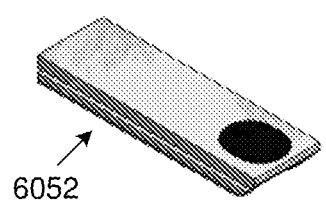
Figure 23D

| TIMESTAMP | EVENT | ASSET AUTHETNICATION STATUS | USER AUTHETNICATION STATUS |
|---|---|---|---|
| TIMESTAMP #1 | ASSET AUTHENTICATION INFORMATION ITEM FOR ASSET 'A' RECEIVED FROM USER 1 | ASSET AUTHENTICATION INFORMATION ITEM FOR ASSET 'A' SUCCESSFULLY AUTHENTICATED | USER 1 SUCCESSFULLY AUTHENTICATED |
| TIMESTAMP #2 | ASSET AUTHENTICATION INFORMATION ITEM FOR ASSET 'A' RECEIVED FROM USER 2 | ASSET AUTHENTICATION INFORMATION ITEM FOR ASSET 'A' SUCCESSFULLY AUTHENTICATED | USER 2 SUCCESSFULLY AUTHENTICATED |
| ... | ... | ... | ... |
| TIMESTAMP #N | ASSET AUTHENTICATION INFORMATION ITEM FOR ASSET 'A' RECEIVED FROM USER M | ASSET AUTHENTICATION INFORMATION ITEM FOR ASSET 'A' SUCCESSFULLY AUTHENTICATED | USER M SUCCESSFULLY AUTHENTICATED |

FIG. 25B

| 2522 | |
|---|---|
| USER AUTHENTICATION INFORMATION ITEM #1 | USER 1 |
| USER AUTHENTICATION INFORMATION ITEM #2 | USER 2 |
| USER AUTHENTICATION INFORMATION ITEM #3 | USER 3 |
| ASSET AUTHENTICATION INFORMATION ITEM #1 | ASSET 'A' |
| ASSET AUTHENTICATION INFORMATION ITEM #2 | ASSET 'B' |
| ASSET AUTHENTICATION INFORMATION ITEM #3 | ASSET 'C' |

| | 2570 |
|---|---|
| ASSET 'A' TRANSFERRED FROM MANUFACURER TO USER 1 | ASSET 'A' IS NOW IN POSSESSION OF USER 1 | AUTHENTICATION RECORD #1 |
| ASSET 'A' TRANSFERRED FROM USER 2 TO USER 1 | ASSET 'A' IS NOW IN POSSESSION OF USER 2 | AUTHENTICATION RECORD #2 |
| ASSET 'A' TRANSFERRED FROM USER 2 TO USER 3 | ASSET 'A' IS NOW IN POSSESSION OF USER 3 | AUTHENTICATION RECORD #3 |
| ASSET 'A' TRANSFERRED FROM USER 3 TO USER 4 | ASSET 'A' IS NOW IN POSSESSION OF USER 4 | AUTHENTICATION RECORD #4 |
| ASSET 'A' TRANSFERRED FROM USER 4 TO USER 5 | ASSET 'A' IS NOW IN POSSESSION OF USER 5 | AUTHENTICATION RECORD #5 |
| ASSET 'A' TRANSFERRED FROM USER 5 TO USER 6 | ASSET 'A' IS NOW IN POSSESSION OF USER 6 | AUTHENTICATION RECORD #6 |

Labels: 2572, 2574, 2576, 2578, 2580, 2582

FIG. 25D

SYSTEM, METHOD AND DEVICE FOR PROCESSING A TRANSACTION

CLAIM OF PRIORITY

The present application is a continuation of U.S. patent application Ser. No. 17/517,645 filed on Nov. 2, 2021, which is a continuation-in-part of U.S. patent application Ser. No. 15/736,772 filed on Dec. 14, 2017, which claims priority to PCT Application PCT/ZA2016/000016, filed on Jun. 23, 2016, which claims priority to the Republic of South Africa Application 2015/04635, filed on Jun. 26, 2015.

BACKGROUND

The term supply chain generally refers to a system of entities, people, activities, information, and/or resources involved in moving a product from a supplier to an end-operator. Supply chain activities may involve the transformation of natural resources, raw materials, and components into a finished product that is delivered to the end-user.

Presently, the complexity of supply chains is increasing as, for example, companies outsource more aspects of their business to globally distributed supplier networks. Due to the number of different third parties involved in a supply chain, each with their own systems in place, it can be difficult for a product or resource to be reliably tracked as it moves from one stage in the supply chain to another.

There is accordingly a need for a technology which alleviates these and/or other difficulties. Although the invention is primarily aimed at supply chain management applications, it is envisaged that the invention may be applied to many other applications, for example, point of sale (POS) applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method for use in a computing device, comprising: receiving, from a remote device, a request to record an asset transfer in a first blockchain system; authenticating the request by using an authentication mechanism that is independent of the first blockchain system and obtaining an authentication record indicating that the request has been authenticated successfully; and recording the asset transfer in the first blockchain system, the asset transfer being recorded by storing the authentication record and a record of the asset transfer in a first ledger of the first blockchain system, wherein recording the asset transfer includes associating an instance of the record of the asset transfer that is stored in the first ledger of the first blockchain system with an instance of the authentication record that is stored in the first ledger of the first blockchain system.

According to aspects of the disclosure, a system is provided, comprising: a memory; and at least one processor that is operatively coupled to the memory, the at least one processor being configured to perform the operations of: receiving, from a remote device, a request to record an asset transfer in a first blockchain system; authenticating the request by using an authentication mechanism that is independent of the first blockchain system and obtaining an authentication record indicating that the request has been authenticated successfully; and recording the asset transfer in the first blockchain system, the asset transfer being recorded by storing the authentication record and a record of the asset transfer in a first ledger of the first blockchain system, wherein recording the asset transfer includes associating an instance of the record of the asset transfer that is stored in the first ledger of the first blockchain system with an instance of the authentication record that is stored in the first ledger of the first blockchain system.

According to aspects of the disclosure, a non-transitory computer-readable medium is provided that stores one or more processor-executable instructions, which when executed by at least one processor, cause the at least one processor to perform the operations of: receiving, from a remote device, a request to record an asset transfer in a first blockchain system; authenticating the request by using an authentication mechanism that is independent of the first blockchain system and obtaining an authentication record indicating that the request has been authenticated successfully; and recording the asset transfer in the first blockchain system, the asset transfer being recorded by storing the authentication record and a record of the asset transfer in a first ledger of the first blockchain system, wherein recording the asset transfer includes associating an instance of the record of the asset transfer that is stored in the first ledger of the first blockchain system with an instance of the authentication record that is stored in the first ledger of the first blockchain system.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

The invention will now be described, by way of example only, with reference to the accompanying representations in which:

FIG. 11A is a table showing exemplary traceable data;

FIG. 11B is a table showing exemplary traceable data for pharmaceuticals;

FIG. 22A illustrates an exemplary portable device including a biometric capturing device, a credential storage device receiving module and a product identifying component;

FIG. 22B illustrates an exemplary portable device including a biometric capturing device, a credential storage device receiving module and a product identifying component;

FIG. 22C illustrates an exemplary portable device including a biometric capturing device, a credential storage device receiving module and a product identifying component;

FIG. 22D illustrates an exemplary portable device including a biometric capturing device, a credential storage device receiving module and a product identifying component;

FIG. 23A illustrates an exemplary product identifying device;

FIG. 23B illustrates an exemplary product identifying device;

FIG. 23C illustrates an exemplary product identifying device;

FIG. 23D illustrates an exemplary product identifying device;

FIG. 23E illustrates an exemplary product identifying device;

FIG. 25B is a diagram of an example of an authentication record, according to aspects of the disclosure;

FIG. 25C is a diagram of an example of user/asset authentication records, according to aspects of the disclosure;

FIG. 25D is a diagram of an example of a custodial chain description, according to aspects of the disclosure;

DETAILED DESCRIPTION

Figure 1:
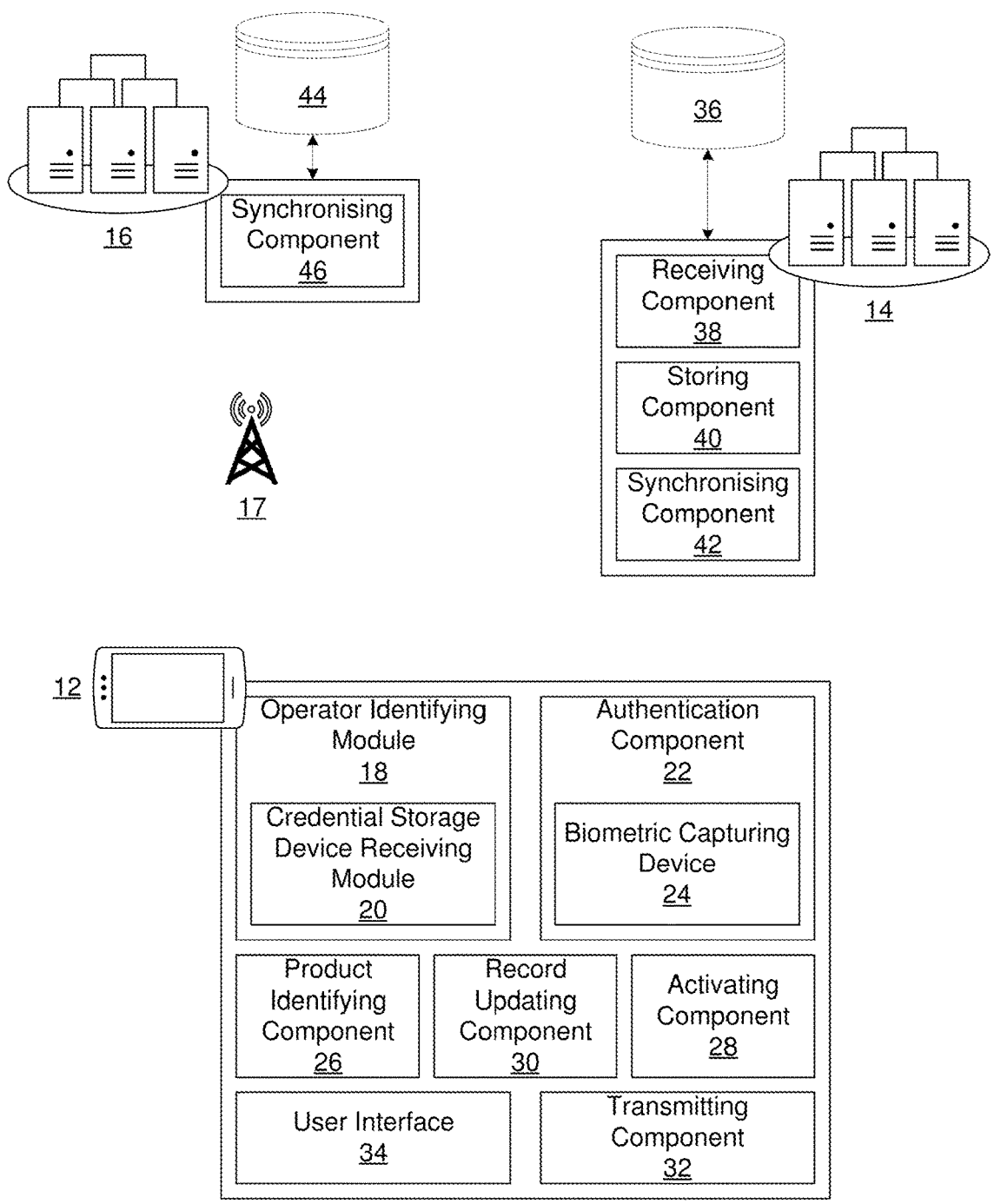
FIG. 1 is a schematic diagram which illustrates an exemplary supply chain management system.

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Although the description that follows focuses on the application of the present invention to supply chain management, it will be appreciated that this has been done only to fully describe the invention and win not be construed to limit the invention to this application exclusively. For example, the invention is capable of being applied to many applications, with point of sales application just being one other.

Effective supply chain management may enable a sufficient amount of inventory to make sales to be maintained by a third party, thereby preventing unnecessary storage and wastage expenses. Furthermore, logistics expenses may be reduced due to more efficient distribution systems. Communication channels between recipients and suppliers may be enhanced. Resources, including raw materials, equipment, employees and finances may be more efficiently utilised.

The systems described herein include a central server computer which receives data associated with a product from a number of third party server computers, each of which relates to or is associated with a different stage in a supply chain, as the product moves from one stage in the supply chain to another. The data is received at each third party server computer from a transaction device, more particularly and for the purposes of supply chain management applications a supply chain management device, operated by an operator who handles the product. The supply chain management device obtains an identifier of the operator and, in one embodiment, authenticates the operator prior to obtaining an identifier of the product. The data received at the central server computer from the third party server computers includes the identifier of the operator, the identifier of the product and optionally additional information and is used to update a record to associate, for each stage of the supply chain, the identifier of the operator and optionally additional information with the identifier of the product.

In another embodiment, and either as an alternative or a supplement to authenticating the operator prior to obtaining an identifier of the product, the system is configured to obtain at least the identifier of the operator and the identifier of the product within a predefined transaction time interval, outside of which the transaction is operably cancelled. Although the predefined transaction time interval may typically be any time span of 10 seconds or less, it is preferable that such predefined transaction time interval is very small such that such steps are undertaken near simultaneously thereby to constitute a "virtual handshake".

The systems and methods described herein aim to improve supply chain visibility. This may help to minimize risk of loss, order delays and reduced quality. Collaboration and communication between recipients and suppliers may be improved. Additionally, transparency, traceability, allocation and accountability of resources along the supply chain may be improved so as to enable accurate and timely designation and distribution along the supply chain.

The term "supplier" as used herein should be broadly construed and includes any individual authorised to distribute, dispense, release, deliver or otherwise dispose of or order the disposal of a product. The supplier may represent (e.g. be employed by) a third party organization or entity which is involved in a product supply chain. Some specific examples of suppliers as anticipated herein include medical practitioners such as doctors who diagnose conditions and prescribe medication based on the diagnosis. A supplier may further include a pharmacist who dispenses a product based on a doctors prescription.

It will be appreciated that a supplier may even further include a retail merchant, for the retail of any product pharmaceutical or otherwise.

The term "recipient" as used herein should be broadly construed and includes any individual authorised to receive, take delivery of or collect a product, or any individual receiving authorisation to receive, take delivery of or collect a product. The recipient may represent (e.g. be employed by) a third party organisation or entity which is involved a product supply chain. A specific example of a recipient as used herein includes a patient who is prescribed certain medication by a medical practitioner and who then seeks the medication from a pharmacist.

It will be appreciated that a recipient may be the ultimate customer in the supply chain, or any intermediate supplier between the first supplier and the ultimate customer.

The term "product" as used herein should be broadly construed and includes any article, commodity, object, product of manufacture, shipment, consignment, container, crate, pallet or the like which moves from control of one individual or entity to control of another individual or entity through a supply chain.

The term "supply chain" as used herein refers to a system of entities, organisations individuals, activities, information, and resources involved in moving a product or service from supplier to end-user.

FIG. 1 is a schematic diagram which illustrates an exemplary supply chain management system (10). The system includes a supply chain management device (12), a third party server computer (14) maintained by third party entity (e.g. a supplier or a recipient entity) involved in one stage of a supply chain and a central server computer (16) maintained by a supply chain management entity. Although only one third party server computer and one supply chain management device are illustrated, it should be appreciated that in a practical implementation there may be one or more of each of these. For example, there may be one third party server and one or more supply chain management devices at each stage in the supply chain. The system (10) includes a communication network (17) via which the supply chain management device (12), third party server computer (14) and central server computer (16) communicate.

The supply chain management device (12) may be any appropriate mobile communication device. In one embodiment, the supply chain management device (12) takes on the form of a portable tablet computer which is able to operate in remote locations. The supply chain management device is operated by an operator who may be an employee or representative of the third party entity. As mentioned above, the third party entity may be any entity along a supply chain who receives and/or disposes of products.

The supply chain management device (12) includes an operator identifying module (18) for obtaining an identifier of the operator. In the illustrated embodiment, the operator identifying module (18) includes a credential storage device receiving module (20) for obtaining an identifier from a credential storage device of the operator. In the illustrated embodiment, the credential storage device is a smartcard (e.g. an ID smartcard) which is configured to store credentials relating to the operator. Credentials stored in the credential storage device include one or more of the group of: the operators name, date of birth, authority level, biometric information, organisational details and the like. The credential storage device receiving module (20) is, in this embodiment, a smartcard reader.

The supply chain management device (12) further includes an authentication component (22) for authenticating the operator. The authentication component (22) includes, in this exemplary embodiment, a biometric capturing device (24) for obtaining biometric information from the operator and comparing the obtained biometric information to biometric information stored on one or both of the supply chain management device (12) and the credential storage device. The biometric capturing device may be one or more of the group of: a fingerprint scanner, a finger vein scanner, a retina scanner, a microphone for performing voice recognition, a high resolution camera for performing facial recognition, a means for measuring electrophysiological signals (i.e. an electrocardiography device (ECC) or an electroencephalogram device (EEG)), a means for distinguishing humans from microbial, bacterial and/or DNA markers, and the like The supply chain management device (12) is associated with a product identifying component (26) and includes an activating component (28) for, if the operator is authenticated, activating the product identifying component (26). In this manner, the identifier of a product cannot be obtained if the operator has not been authenticated. The product identifying component is operable to obtain an identifier of a product and may include one or both of a barcode scanner and a radio-frequency identification (RFID) tag reader. The product identifier may be a unique number, an optical machine readable identifier such as a barcode (e.g. linear barcode, two dimensional barcode or the like), an RFID tag, or any other appropriate identifier.

As previously described, and either as an alternative or a supplement to authenticating the operator prior to obtaining an identifier of the product, the device may include a timing component for timing a predefined transaction time interval during which at least the identifier of the operator and the identifier of the product must be obtained. If such identifiers are not obtained within such predefined transaction time interval, the transaction is operably cancelled.

Furthermore, the step of obtaining an identifier of the product should further include a step of authenticating the identifier of the product. In the event of the identifier of the product failing authentication, the transaction is operably cancelled with the product being flagged or remove.

In the illustrated embodiment, the supply chain management device (12) includes a record updating component (30) for updating a record to associate the identifier of the operator with the identifier of the product and optionally additional information. The record updating component (30) is operable to store one or more of the identifier of the operator, the identifier of the product and additional information in one or both of a digital storage of the supply chain management device (12) and a credential storage device. The additional information includes one or more of: biometric information of the operator (e.g. supplier and/or recipient); a time at which the identifier of the product was obtained; a time at which the identifier of the operator (e.g. supplier and/or recipient) was obtained; diagnostic information; and, a time at which the operator (e.g. supplier and/or recipient) was authenticated. In some embodiments, the record updating component (30) updates a record maintained remotely by a cloud-based server computer (e.g. a cloud-based record).

It will be appreciated that for point of sales applications, it would be useful for the additional information to also include, for example, the date and time of concluding the transaction and the monetary amount associated with the transaction.

Furthermore, in the illustrated embodiment, the supply chain management device (12) includes a transmitting component (32) for transmitting data including one or more of the identifier of the operator, the identifier of the product and additional information to the third party server computer (14) for storage thereat. The transmitting component (32) is operable to transmit data via one or more of the group of: a long range wireless area network (LoRAWAN), a satellite communication link; a cellular communication link such as a universal mobile telecommunications system (UMTS) link (e.g. 3G, 4G, LTE, etc.) and/or global system for mobile communications (GSM); a wired local area network; and a wireless local area network (e.g. Wi-Fi). In this manner, the supply chain management device may be operable in remote areas, even outside of the range of terrestrial-based communication networks.

The supply chain management device (12) also includes a user interface (34) via which the operator (e.g. a supplier or recipient) may interface with the device (12). The user interface (34) is operable to receive operator input in the form of controls, instructions and/or information. The user interface, in one embodiment, is operable to receive diagnostic information relating to a medical (or other) condition of a recipient. The user interface is also operable to output data and/or information to the operator. In this exemplary embodiment, the user interface (34) includes a touch-sensitive display screen for input and output.

The third party server computer (14) is any appropriate server computer and has access to a database (36). The third party server computer (14) includes a receiving component (38) for receiving data from the supply chain management device (12) and a storing component (40) for storing the received data in the database (36). Storing the received data may include updating various inventory lists so as to indicate, for example, whether a product which was in possession of the operator has been dispensed or dispatched or is counterfeit/unidentifiable or, conversely, whether a product has been received and must now be included in the inventory. The third party server computer (14) further includes a synchronising component (42) for synchronising the stored data with the central server computer (16) maintained by the supply chain management entity.

The central server computer (16) is any appropriate server computer and has access to a database (44). The central server computer (16) includes a synchronising component (46) for synchronising with the third party server computer (14). The synchronising component (46) updates a record in the database (44) to associate, for each stage of the supply chain, the identifier of the operator and optionally additional information with the identifier of the product.

Thus, a product may be tracked by the central server computer (16) as it moves through a supply chain. For each stage at the supply chain, the product is associated with an operator handling the product, the operator having been securing identified and authenticated prior to the product identifier being obtained. In this manner, transparency, traceability, allocation and accountability of the product along the supply chain may be monitored and managed so as to enable accurate and timely designation and distribution of the product along the supply chain.

In some embodiments, the biometric capturing device (24), credential storage device receiving module (20) and a product identifying component (26) are provided by a separate portable device which is detachable from the supply chain management device (12). Furthermore, some embodiments anticipate the transmitting component (32) being provided in the form of a portable modem detachable from the supply chain management device (12). The supply chain management device (12) may further include a portable electronic device and a further, portable product identifying device which may be detachable from the supply chain management device.

To further authenticate the delivery of the product through the supply chain, the device includes a device identifier in the form of a unique number associated to such supply chain management device and/or a specific location of such device, i.e. the GPS co-ordinate at which the transaction device is located at the time of processing the transaction. It will be appreciate that this identifier is similarly record against one or more of the operator or product identifiers.

Figure 2:
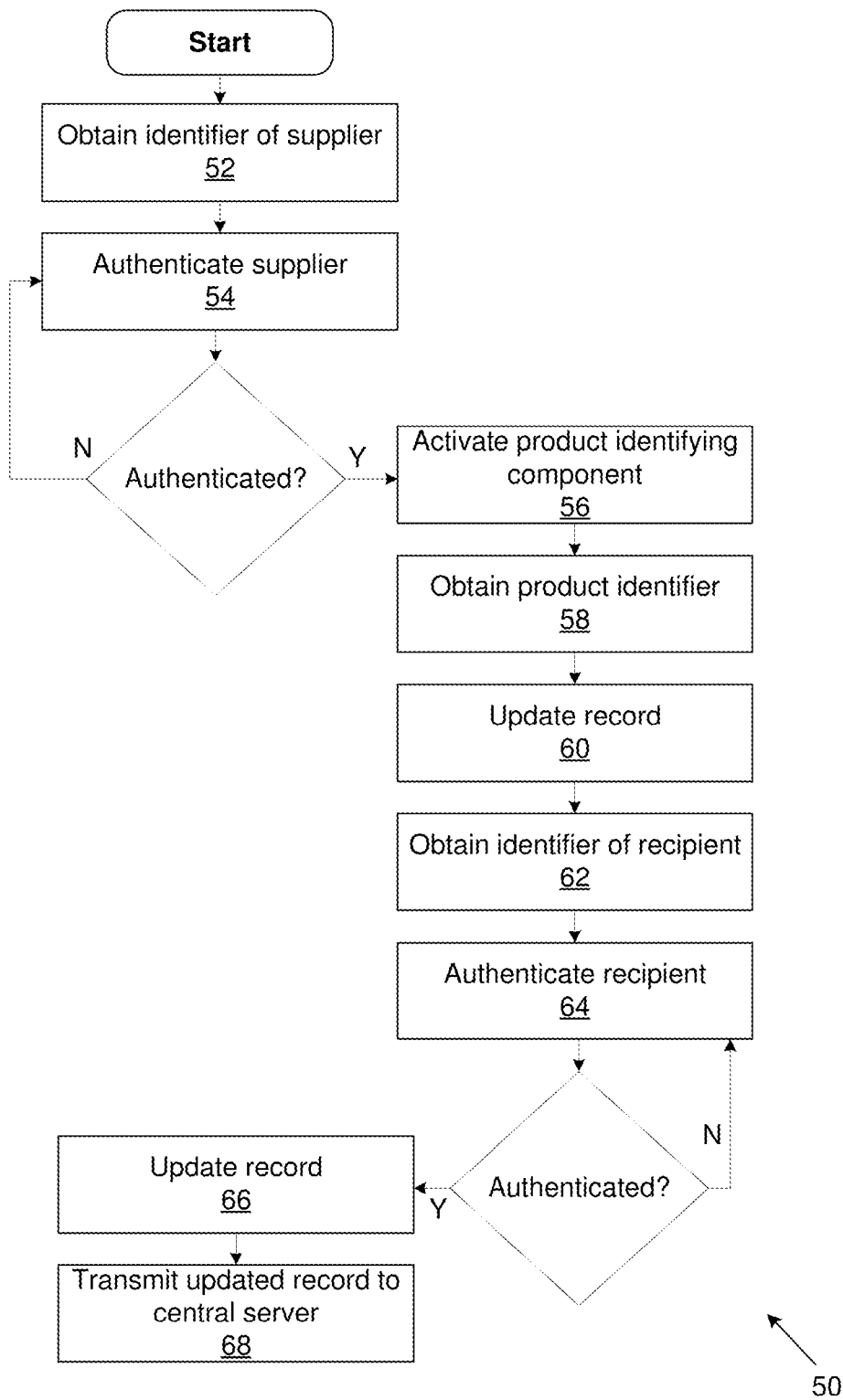
FIG. 2 is a flow diagram which illustrates an exemplary method for managing a supply chain.

Reference is now made to FIG. 2, in which an exemplary method (50) for managing a supply chain is illustrated. The method (50) may be implemented by a supply chain management system as described herein.

At a first stage (52), an identifier of an operator is obtained from, in this exemplary embodiment, a credential storage device (e.g. an ID smartcard) of the operator.

At a next stage (54), the operator is authenticated. Authenticating the operator includes obtaining biometric information (e.g. a fingerprint or retina image) from the operator and comparing the obtained biometric information to biometric information stored on one or both of a supply chain management device and the credential storage device.

At a following stage (56), if the operator is authenticated, a product identifying component (e.g. a barcode scanner) associated with the device is activated and, at a further stage (58), an identifier of a product is obtained using the product identifying component (e.g. by scanning a barcode displayed on the product).

As an alternative or a supplement to authenticating the operator prior to obtaining an identifier of the product, the method may include a timing means for timing a predefined transaction time interval during which at least the identifier of the operator and the identifier of the product must be obtained. If such identifiers are not obtained within such predefined transaction time interval, the transaction is operably cancelled.

A record is then updated at a following stage (60) so as to associate the identifier of the operator with the identifier of the product and optionally additional information. Updating the record includes storing one or more of the identifier of the operator, the identifier of the product and additional information in one or both of a digital storage of the supply management device and a credential storage device. The additional information may include one or more of: biometric information of the operator; a time at which the identifier of the product was obtained; a time at which the identifier of the operator was obtained; and, a time at which the operator was authenticated.

For point of sales applications, it will be appreciated that the additional information could also include, for example, the date and time of concluding the transaction and the monetary amount associated with the transaction.

Updating a record may further include associating the identifier of the product with a status including, for example that the product has been dispensed. In this manner, a product is linked to an operator having handled the product at each stage in the supply chain. Furthermore, the operator is authenticated by providing biometric information meaning that the product can be accurately tracked as it moves through the supply chain.

In some embodiments, the operator is a supplier and, at a following stage (62), an identifier of a recipient is obtained from, for example, a credential storage device of the recipient (e.g. the recipients ID smartcard).

The recipient is authenticated at a next stage (64), for example, by obtaining biometric information from the recipient and comparing the obtained biometric information to biometric information stored on the stored on the credential storage device of the recipient.

At a further stage (66), the record is updated so as to associate the identifier of the recipient and optionally additional information with the identifier of the product. The stage (66) of updating the record may include storing one or more of the identifier of the supplier, the identifier of the recipient, the identifier of the product and additional information in one or more of a digital storage of the device, the credential storage device of the supplier and the credential storage device of the recipient. Preferably, at least some or all of the identifiers, including the identifier of the supply chain management device, are obtained within the predefined transaction time interval.

The additional information may further include biometric information of the recipient; a time at which the identifier of the recipient was obtained; and, a time at which the recipient was authenticated. Updating the record may further include associating the identifier of the product with a status including, for example that the product has been received. Thereafter, the product may be dispensed from the supplier to the recipient.

At a later stage (68), data including the updated record is transmitted to a third party server computer for storage thereat.

Figure 3:
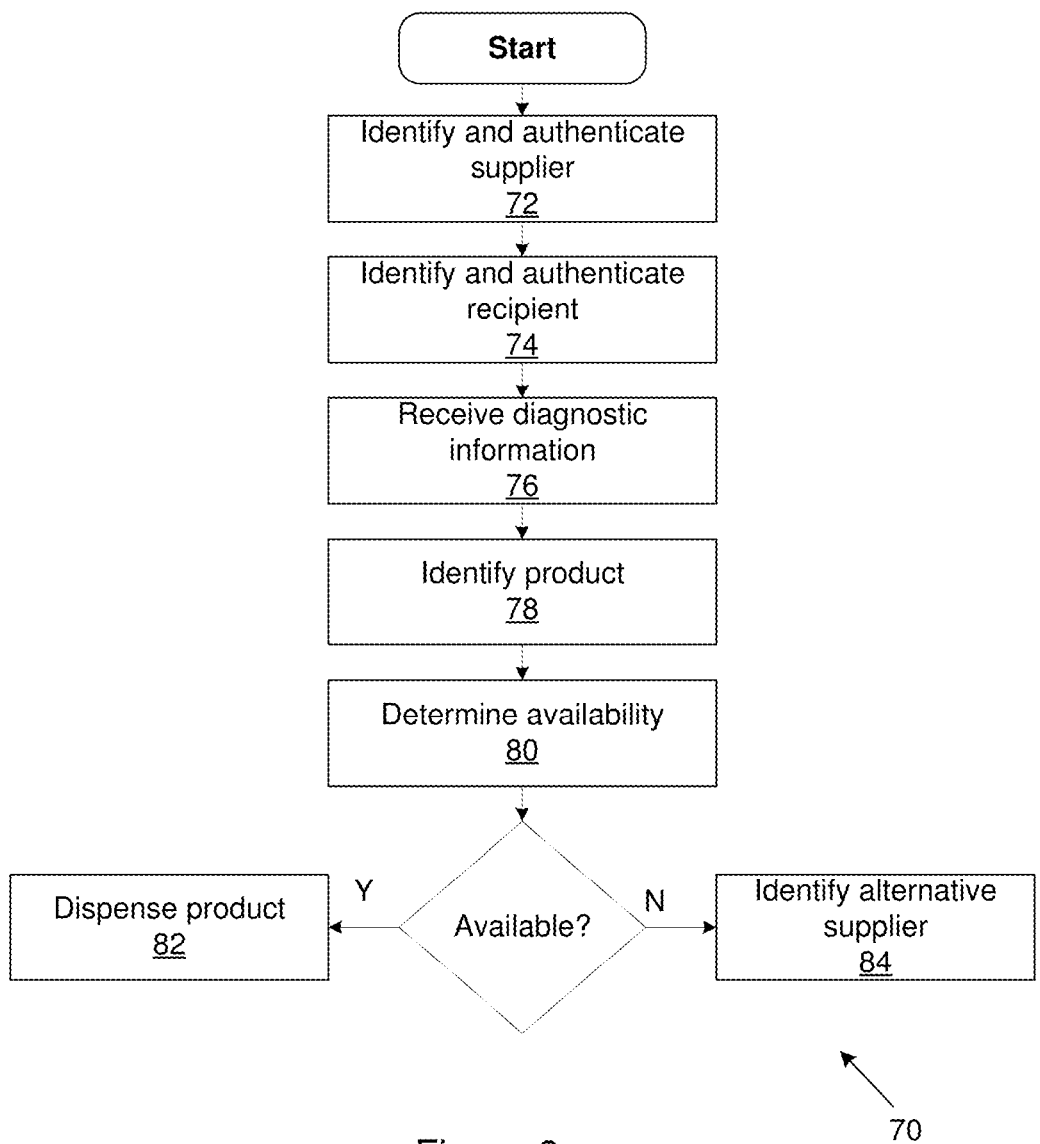
FIG. 3 is a flow diagram which illustrates another exemplary method for managing a supply chain.

FIG. 3 is a flow diagram which illustrates a method (70) for managing a supply chain. The method (70) may be implemented by a supply chain management system and includes an initial stage (72) of obtaining an identifier of an operator, in this case being a supplier, and authenticating the supplier.

At a following stage (74), an identifier of a recipient is obtained and the recipient is authenticated.

At a next stage (76), diagnostic information relating to a recipient is received. In one case, the diagnostic information may be received as an input from the supplier. For example, the supplier may be a medical practitioner who performs medical tests on a recipient and in doing so diagnoses a condition with which the recipient is suffering. The medical practitioner may then input the diagnostic information into a supply chain management device of the supply chain management system. In another case, the diagnostic information may be received from a credential storage device of the recipient. For example, the recipient may have previously been diagnosed with a condition and diagnostic information relating thereto having been stored on the recipient's credential storage device.

At a following stage (78), based on the received diagnostic information, a product to be provided to the recipient is identified. The product may be identified as being, for example, a suitable medicament to be taken in order to treat the condition with which the recipient has been diagnosed.

In some embodiments, at a further stage (80), the availability of the relevant product may be determined and, if the identified product is available, permission for release of the identified product may be granted at a next stage (82) such that the recipient can take delivery of the product there and then. If the identified product is not available, an alternative supplier able to release the identified product is identified at a further stage (84). In some cases, permission may be granted for release of the product and stored in the credential storage device of the recipient, along with an identifier of the product and any appropriate additional information, such that the recipient may visit the alternative supplier (e.g. a pharmacist) in order to obtain the product.

Figure 4:
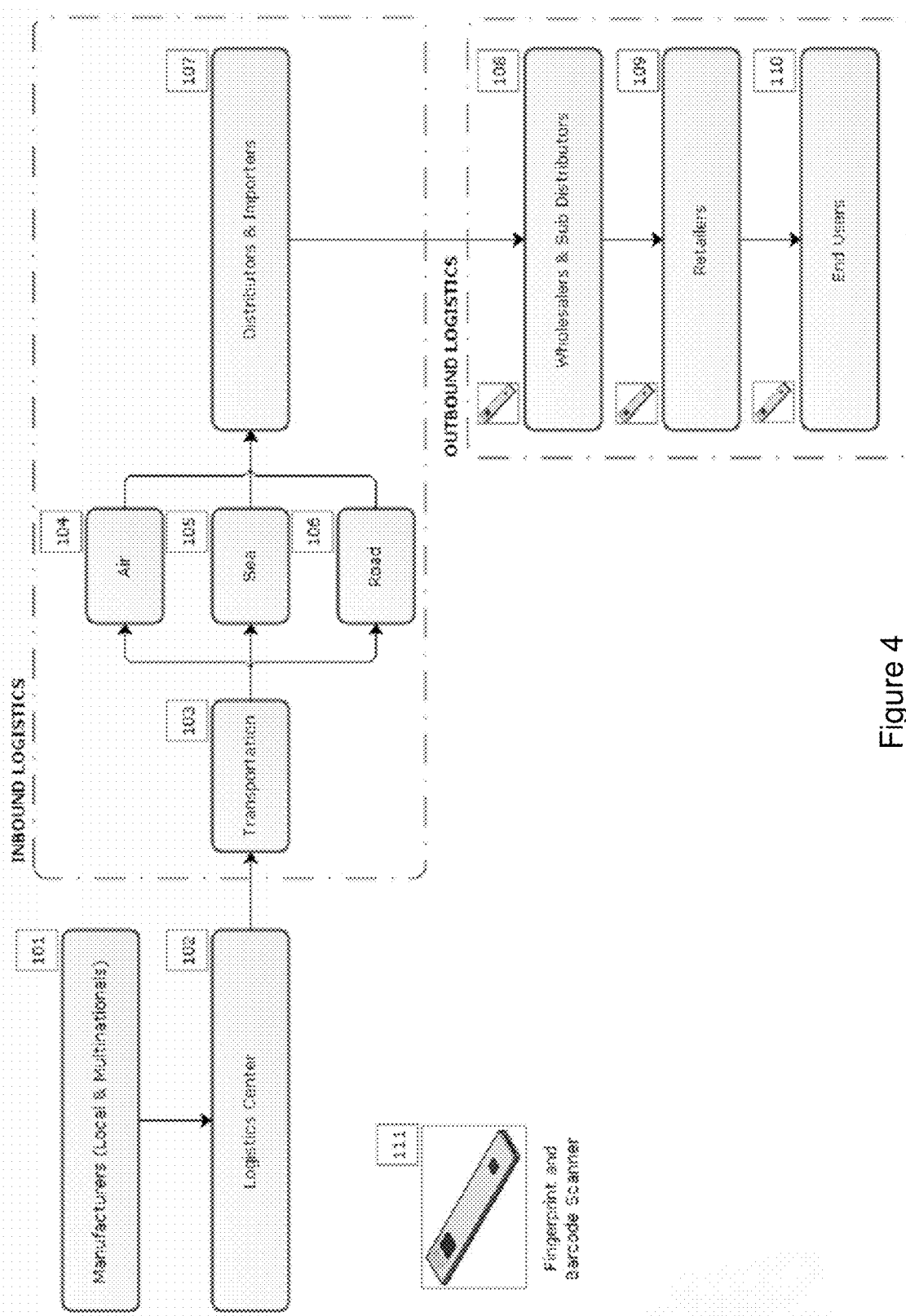
FIG. 4 is a flow chart showing an example of a supply chain at macro level.

FIG. 4 is a flow chart showing an exemplary supply chain at macro level. The supply chain includes manufactures (101), which may be local or international, and a logistics centre (102) which manages products manufactured by the manufacturer. Various transportation (103) methods may be used by the logistics centre (102) in transporting the products to distributors and importers (107). Exemplary transportation (103) methods include, air (104), sea (105) or road (106). Transporting products to distributors and importers (107) may be referred to as inbound logistics. Wholesalers and sub-distributors (108) supply retailers (109) who in turn supply end operators (110), a processes which is referred to as outbound logistics. A supply chain management device (111) may be used at each stage within the outbound logistics and provides statistics and end-to-end detail of the product that is made available to any of the supply chain operators.

Figure 5:
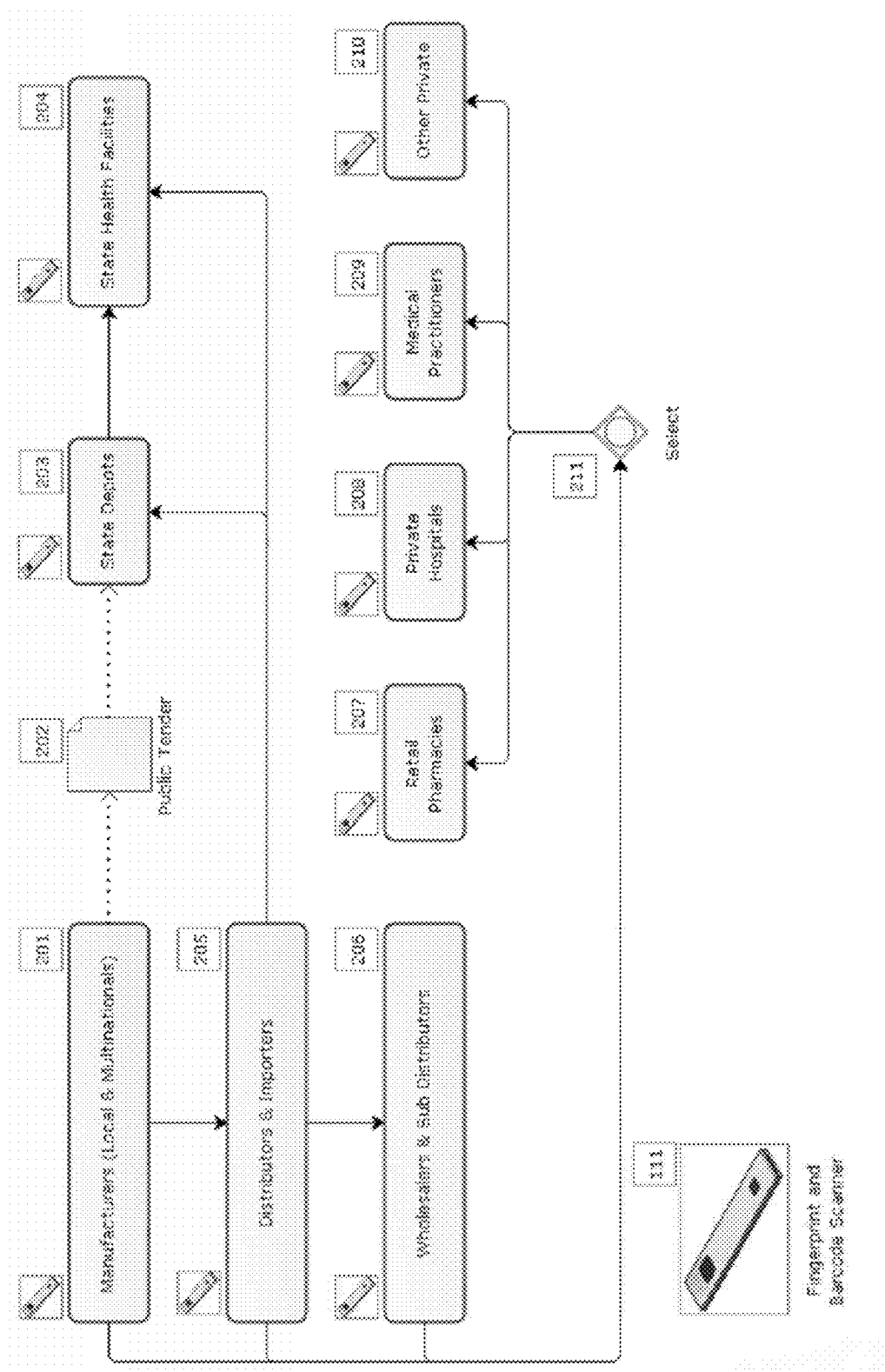
FIG. 5 is a flow chart showing an example of a supply chain of pharmaceuticals at macro level.

FIG. 5 is a flow chart showing an exemplary supply chain of pharmaceuticals at macro level. The local and international manufacturers (201) perform a dual function; firstly, to supply government directly via awarded tenders (202), where the pharmaceuticals are distributed directly to state depots (203) who then supply state health facilities (204); secondly, the pharmaceuticals are distributed to distributors and importers (205) or to wholesalers and sub distributors (206) or even directly to the private health sector (211). Typically the private health sector is split between retail pharmacies (207), private hospitals (208), medical practitioners (209) and other private business (210).

On a micro level the process can be used within a specific segment of a corporation's supply chain to capture and manage data that provides key interest i.e. biometrics only as part of outbound logistics.

Figure 6:
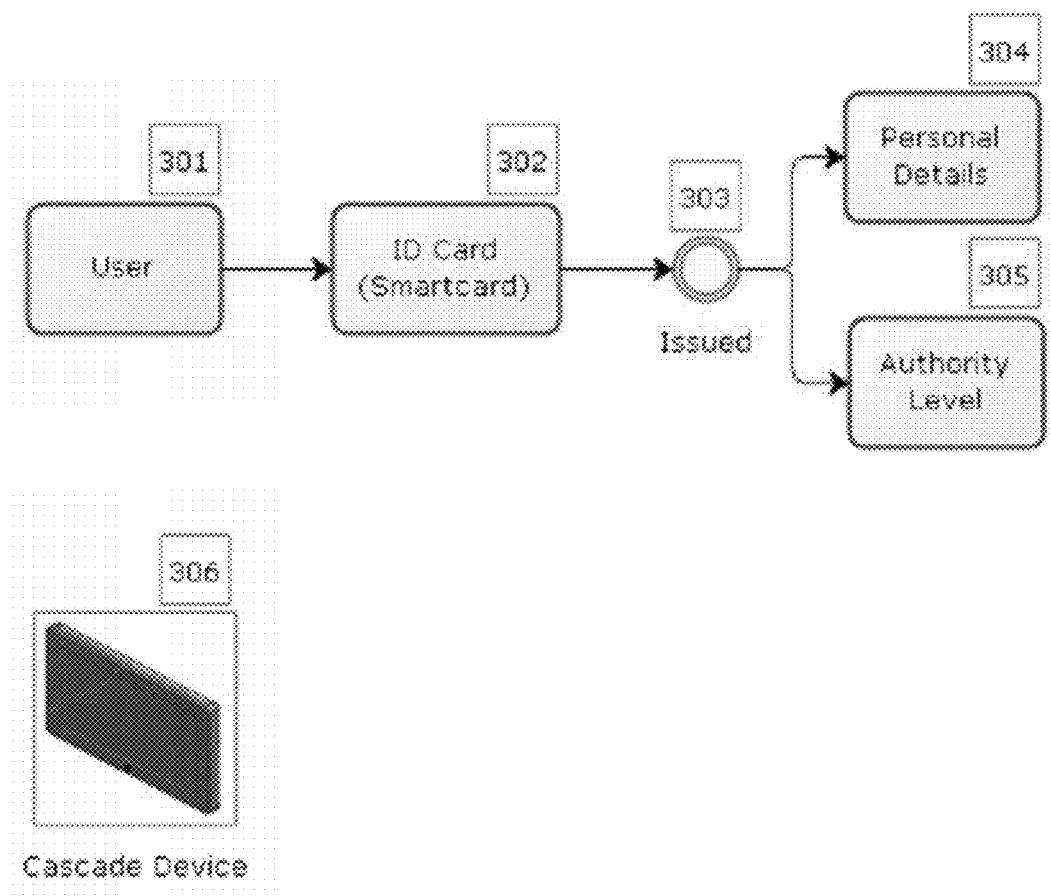
FIG. 6 is a flow chart showing a process for capturing operator information on credential storage device.

FIG. 6 is a flow chart showing an exemplary process of capturing operator information on a credential storage device. The supply chain management device (306) may be a specifically designed tablet computer. The operator (301) is the person designated to use the supply chain management device (306). The operator may be anyone in the outbound logistics referred to in FIG. 4 (e.g. a distributor, wholesaler and retailer). A credential storage device (302) is issued (303) to the designated operator (301) where all relevant personal details (304) are captured. Authority levels (305) are allocated to the operator (301) according to the function to be fulfilled.

Figure 7:
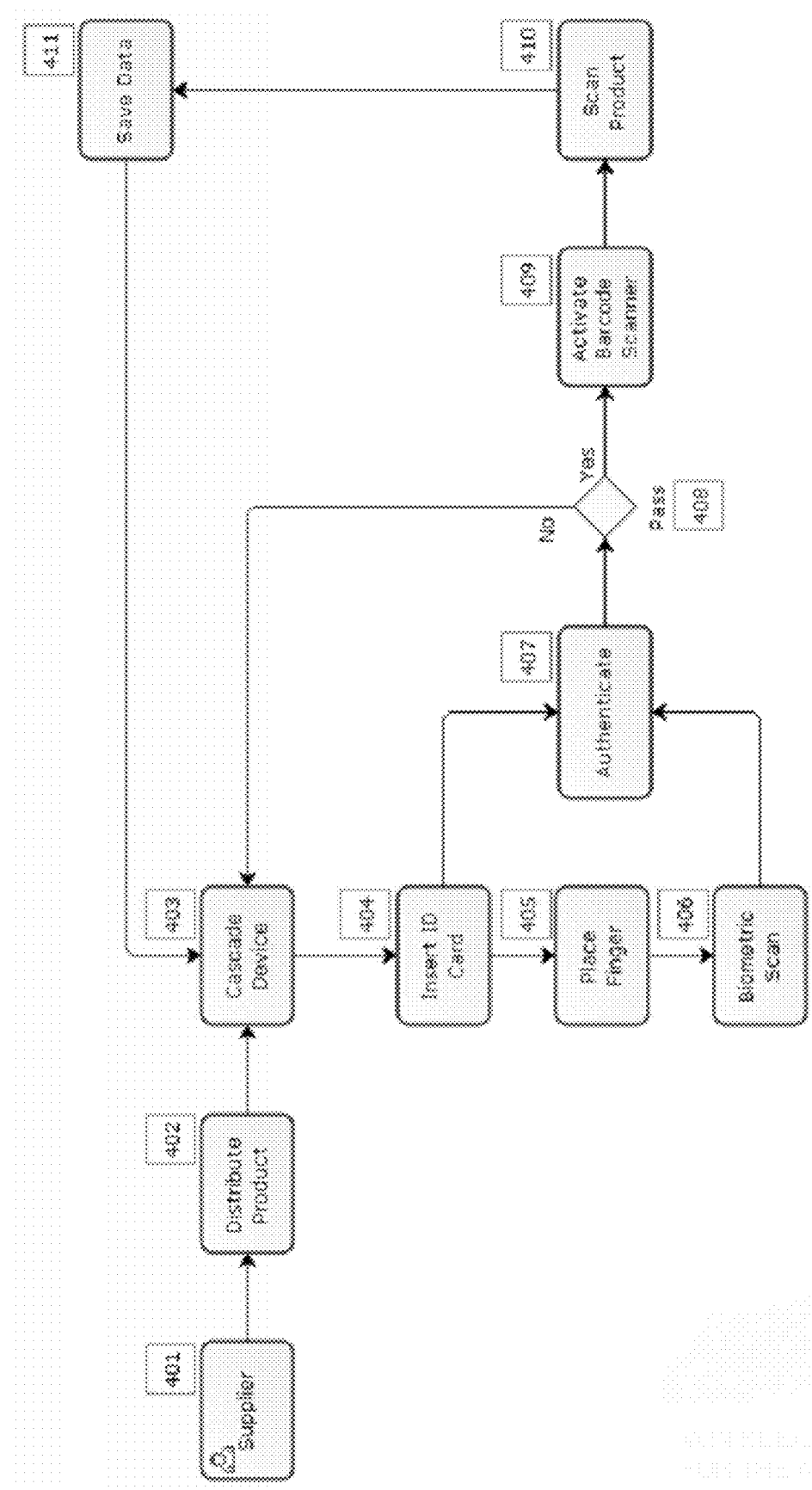
FIG. 7 is a flow chart illustrating a method for managing a supply chain.

FIG. 7 is a flow chart of the scan process using the credential storage device and biometric capturing device. The supplier (401) represents anyone in the outbound logistics role except for the end operator that distributes products (402) using the supply chain management device (403). The supplier (401) places his credential storage device (404) into a credential storage device receiving module the supply chain management device (403) to unlock the device for use. The supplier (401) provides his or her biometric (e.g. a finger (405)) to the biometric capturing device which captures biometric information (406). The supply chain management device (403) authenticates (407) the captured biometric information (406) against the credential storage device (404). If successful (408), the barcode scanning process (409) is activated. The barcode of the product is scanned (410) and all the information (e.g. supplier (operator) name, biometric information and product details/identifier) is saved (411) to the supply chain management device (403).

Figure 8:
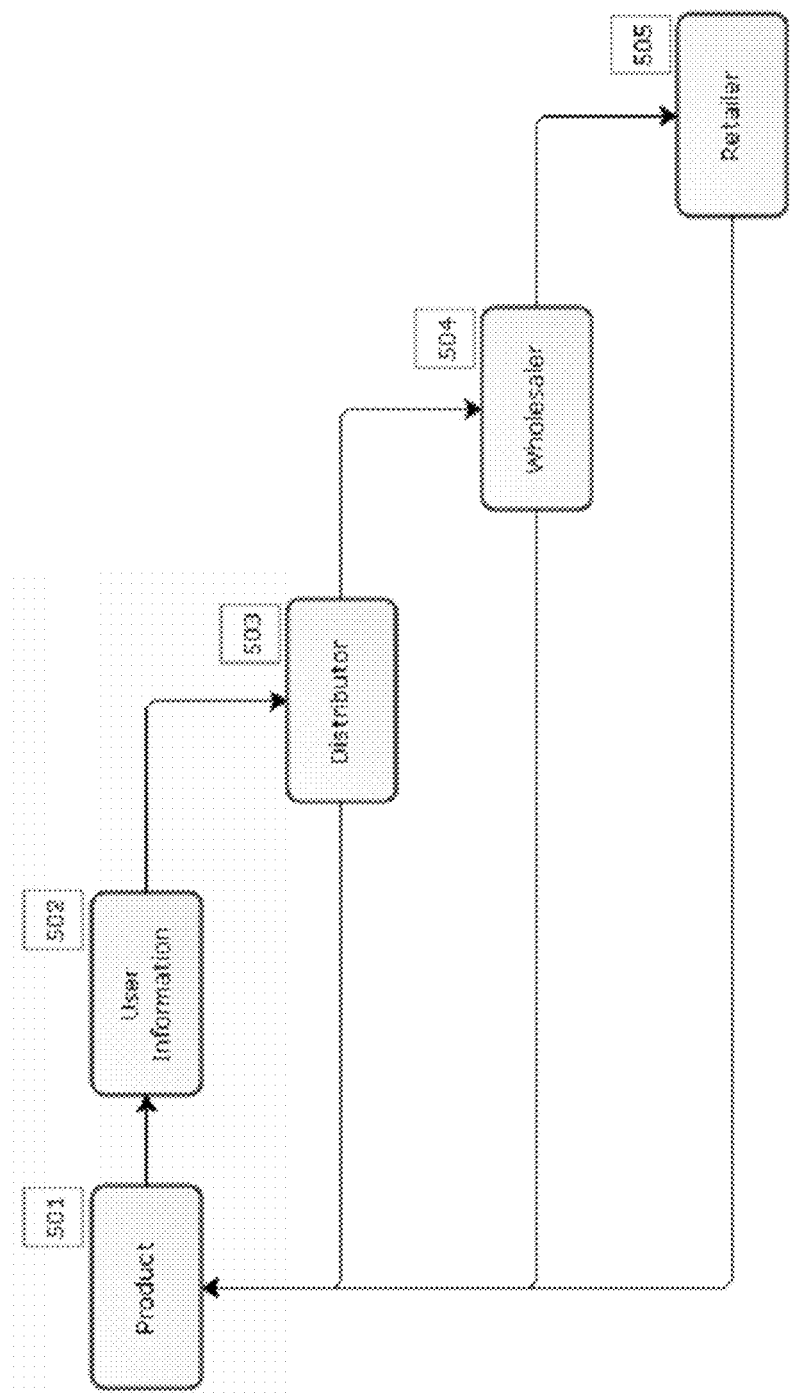
FIG. 8 is a flow chart showing information feedback of a product to a manufacturer.

FIG. 8 is a flow chart showing information feedback of a product to a manufacturer. The product (501) when distributed in outbound logistics has all the relevant operator information linked to it when the distributor, the wholesaler, retailer and end-user use the barcode scan functions (502) of the supply chain management device. It will be appreciated that the process preferably includes an authentication (503) of the product (501) through its identifier. In the event of the identifier of the product failing authentication, the transaction is operably cancelled with the product being flagged or removed (504).

Figure 9:
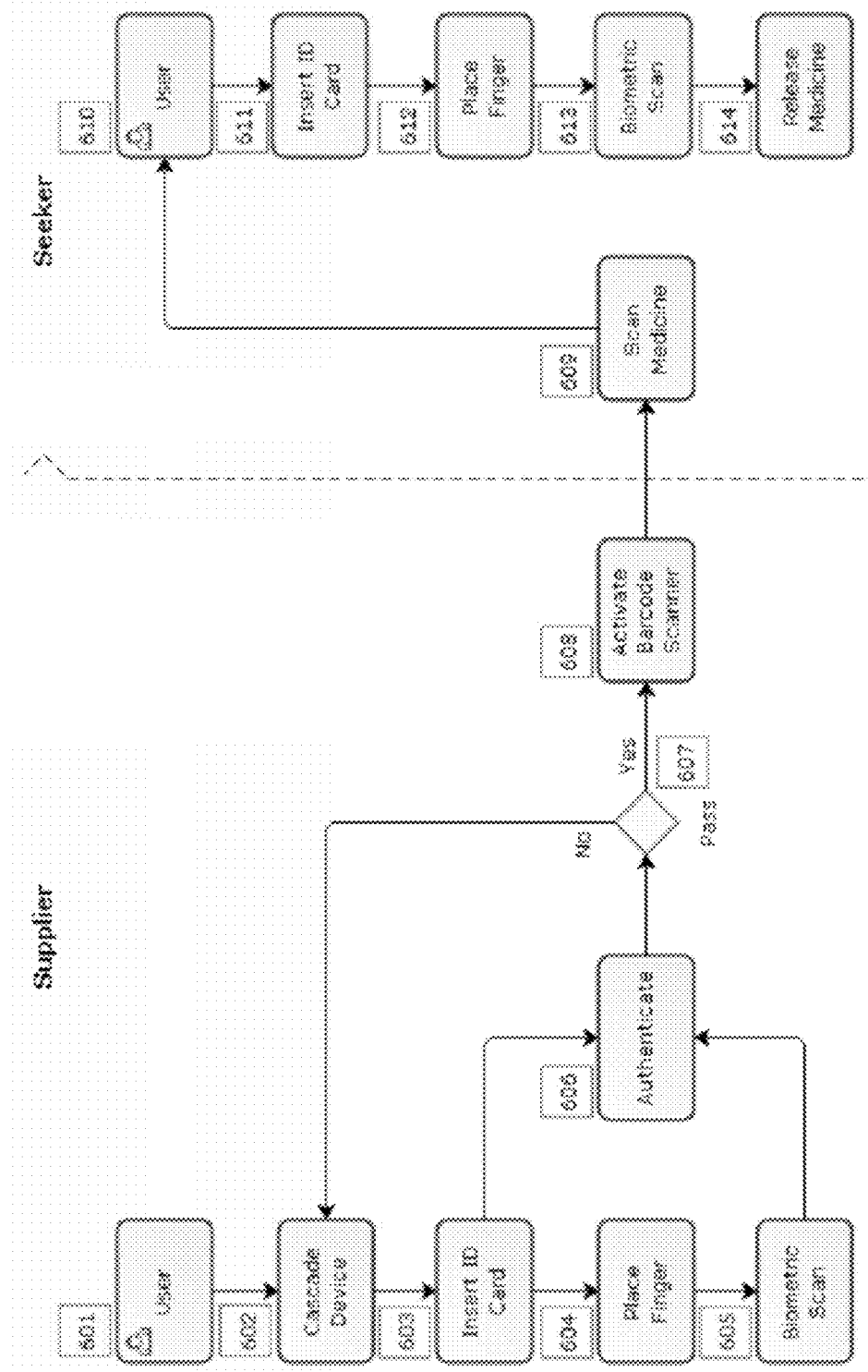
FIG. 9 is a flow chart illustrating a method for managing a supply chain.

FIG. 9 is a flow chart which illustrates an exemplary process using the credential storage device, biometric capturing device and product identifying device in the context of a supplier and a recipient capture. The supplier (601) places his credential storage device (603) into the available the credential storage device receiving module the supply chain management device (602) to unlock for the supply chain management device for use. The supplier (601) places provides his or her biometric information (e.g. a finger (604)) to the biometric capturing device which captures the biometric information (e.g. a fingerprint (605)). The supply chain management device (602) authenticates (606) the biometric information (605) against the credential storage device (603). If successful (607) the product identification process (608) is activated. The supplier (601) identifies the product (e.g. by scanning the barcode of the medicine (609)) to be issued to the recipient (610). The recipient (610) places his credential storage device into the credential storage device receiving module the supply chain management device (602) to unlock for use. The recipient (610) provides his biometric (e.g. a finger (612)) to the biometric capturing device which captures the biometric information (e.g. a fingerprint (613)). Once the biometric information is authenticated, the medicine (614) is released. Though the supply chain focus is on outbound logistics, the following processes can be implemented at inbound logistics as well. Where there is a supplier there is a recipient, from manufacturer through the supply chain down to the retailer this system can capture specific events and interactions.

Figure 10:
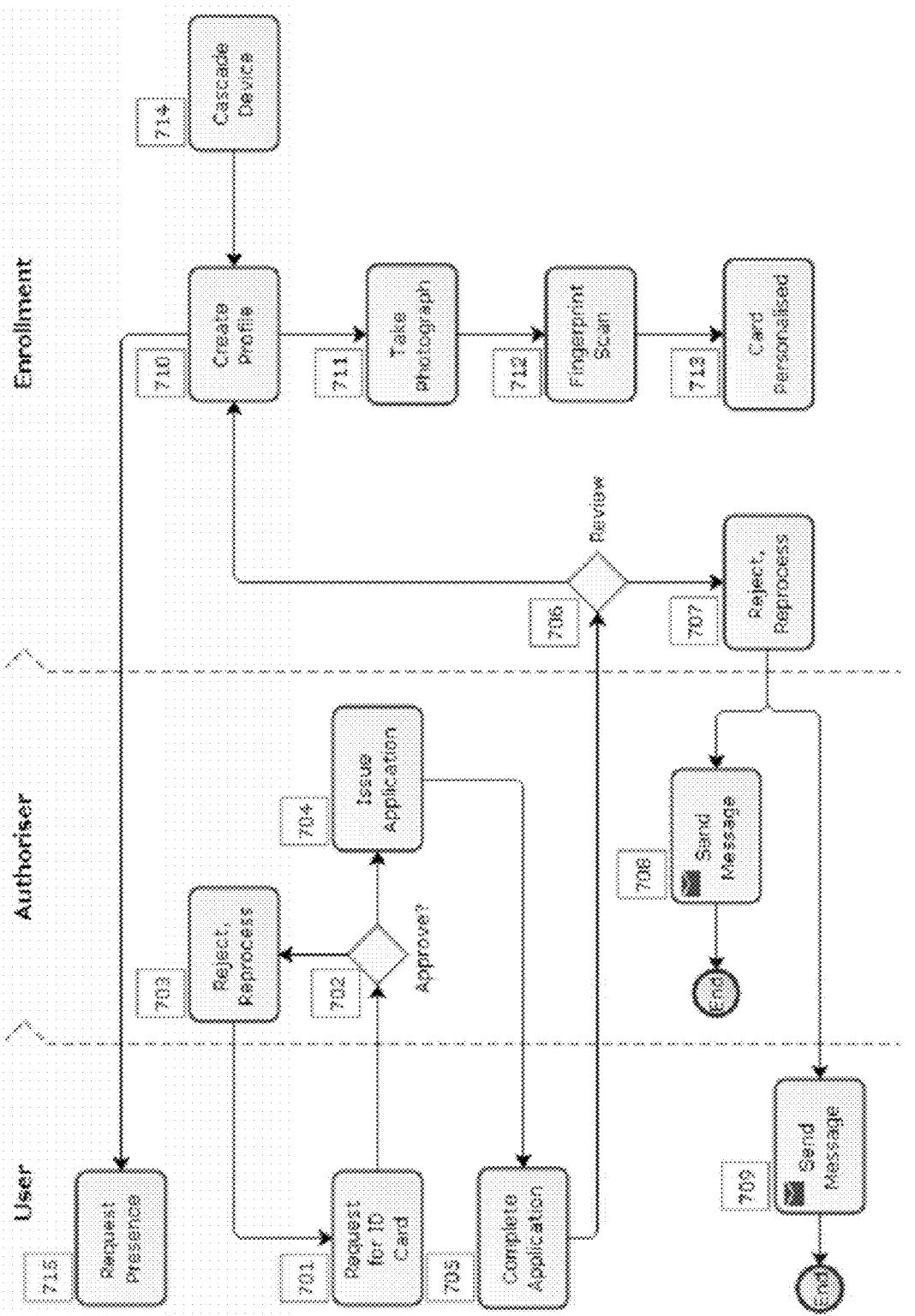
FIG. 10 is a flow chart which illustrates an exemplary enrollment process.

FIG. 10 is a flow chart which illustrates an exemplary credential storage device enrollment process. The operator requests a credential storage device (701) form the authoriser who then approves (702) the application and issues the relevant application form (704) to the operator to complete (705). The request may also be declined (702) and sent back (703) for possible reprocessing. When the operator completes the application form (705) the document is sent to the enrollment department for processing. The application is reviewed (706). The application may be rejected or sent back for reprocessing (707) to the authoriser (708) and operator (709). The application can be resubmitted when the highlighted problems are resolved. When the application meets the criteria, an operator profile is created (710) using the credential storage device reader software installed on the supply chain management device (714). When the enrollment department is ready the operator's presence is requested (715). A photograph is taken (711) with the supply chain management device (714); a fingerprint (biometric) scan is taken (712) with the supply chain management device (714); and the credential storage device is personalised including the operator password. All the recorded data is stored on the supply chain management device (714).

Figure 11:
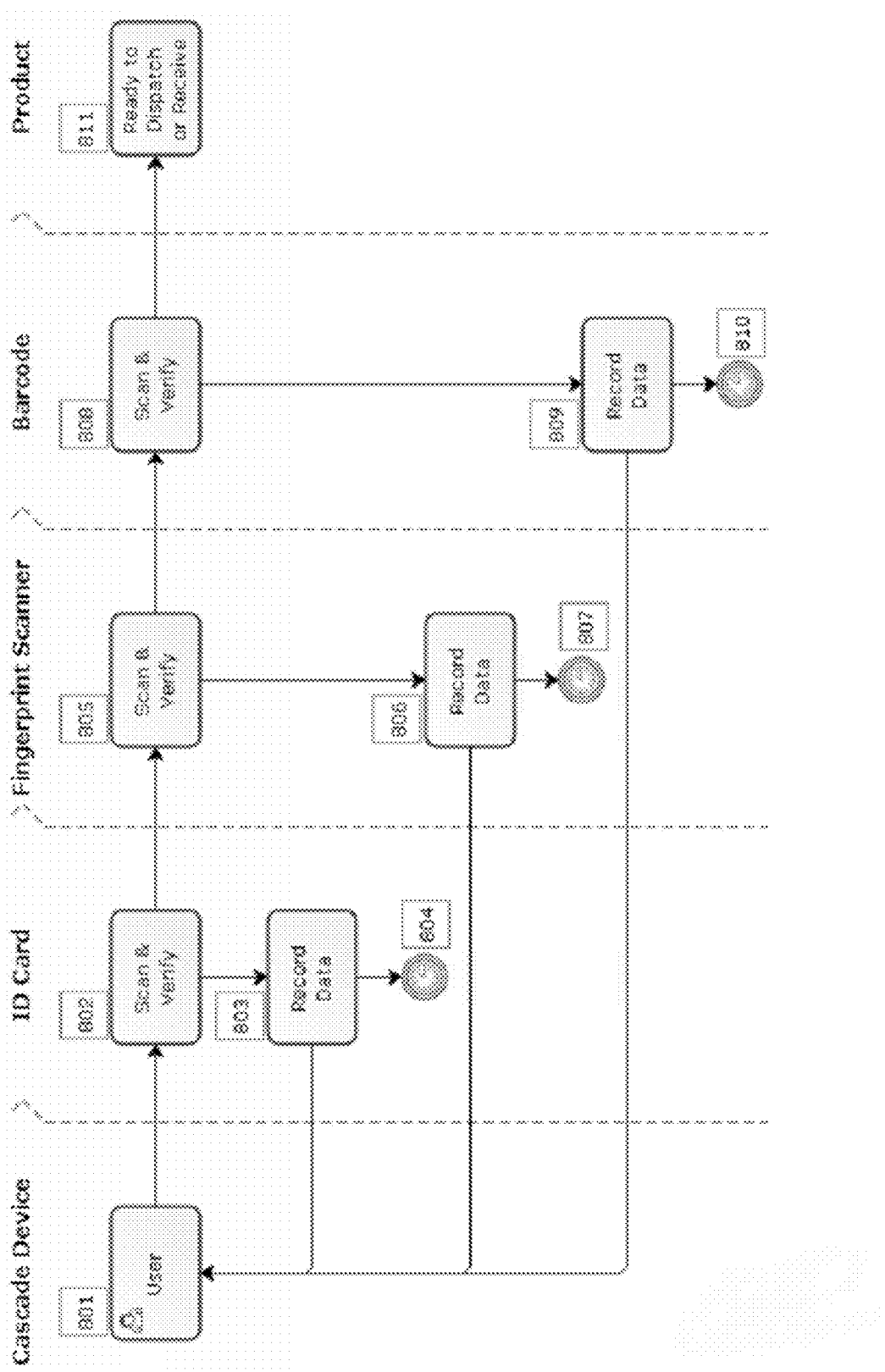
FIG. 11 is a flow chart illustrating a method for managing a supply chain.

FIG. 11 is a flow chart of an exemplary supply chain management process using the supply chain management system through the supply chain. The operator (801) takes the supply chain management device, places his credential storage device into the credential storage device receiving module, scans, verifies and authenticates (802) his credentials. The data is recorded (803) including a date and time stamp (804) onto the supply chain management device. The biometric capturing device is activated and the operator (801) places e.g. his finger on the biometric capturing device, captures a biometric and verifies (805) the captured biometric. The data is recorded (806) including a date and time stamp (807) onto the supply chain management device. The product identifying device is activated and the operator (801) identifies the product (e.g. by scanning, verifying and authenticating (808) a barcode). Once the product has been authenticated as genuine (809), the data is recorded (812) including a date and time stamp (813) onto the supply chain management device. The product is ready to be shipped or received (814). In the event of the product failing authentication it is not dispense but flagged (810), allowing for the product removal from the supply chain (811).

FIG. 11A is a table of exemplary traceable data as may be recorded through various supply chain stages described in FIG. 11. FIG. 11B is a table of exemplary traceable data for pharmaceuticals as may be recorded through the various stages described in FIG. 11.

Figure 12:
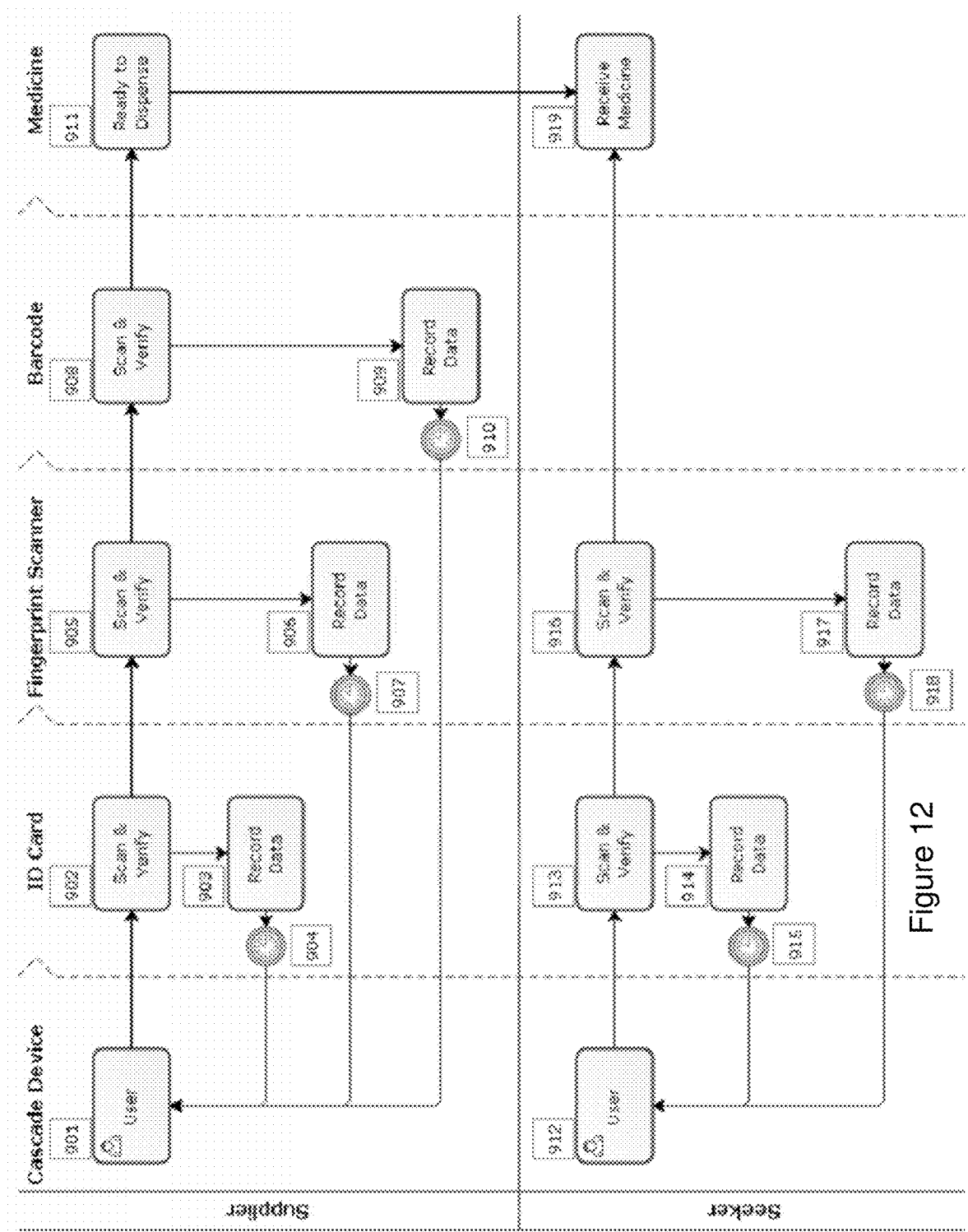
FIG. 12 is a flow chart which illustrates a method for managing a supply chain in which a supplier and recipient participate.

FIG. 12 is a flow chart of an exemplary supply chain management process which uses a supply chain management system between a supplier and a recipient (seeker). The supplier (901) places his credential storage device into the credential storage device receiving module of his supply chain management device which scans and verifies (902) his credentials. The data is recorded (903) including a date and time stamp (904) onto the supply chain management device. The biometric capturing device is activated and the operator (901) provides biometric information to the biometric capturing device which obtains and verifies (905) biometric information of the operator. The data is recorded (906) including a date and time stamp (907) onto the supply chain management device. A product identifying device of the supply chain management device is activated to enable the supplier (901) to identify the product (e.g. by scanning and verifying (908) a barcode thereof). The data is recorded (909) including a date and time stamp (910) onto the supply chain management device. Thereafter, the medicine is ready to dispense (911). In order to take delivery of the medicine, the recipient (912) places his credential storage device into the credential storage device receiving module. Information stored on the credential storage device is obtained and verified (913) by the supplier (901). The data is recorded (914) and date and time stamped (915) in the supply chain management device. The biometric capturing device is activated and the recipient (912) provides his biometric to the biometric capturing device which obtains and verifies (916) biometric information of the recipient. The data is recorded (917) and date and time stamped (918) in the supply chain management device. Thereafter, the supplier (901) may dispense (919) the medicine to the recipient (912).

Figure 13:
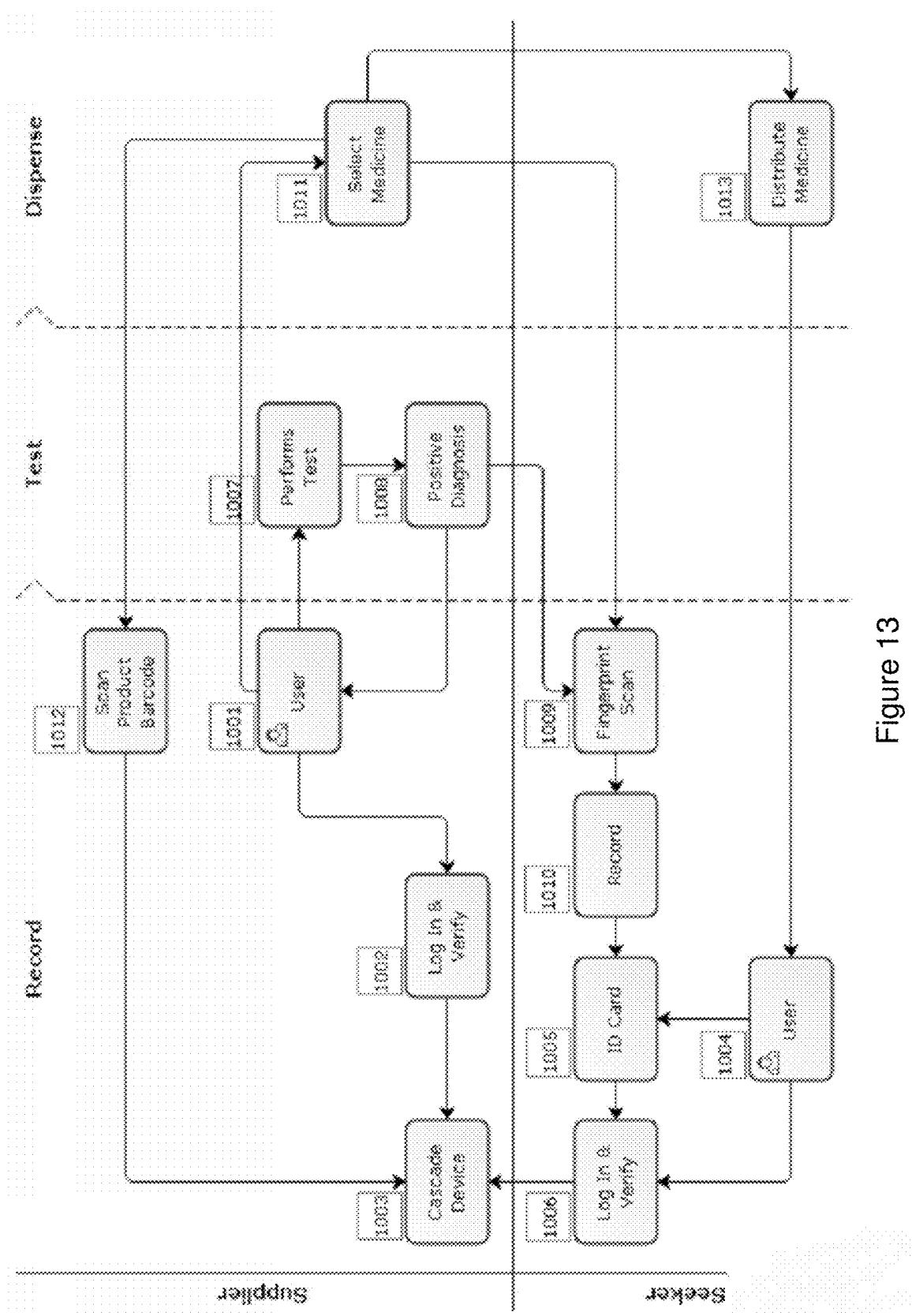
FIG. 13 is a flow chart which illustrates a method in which diagnostic information is obtained and medicine dispensed.

FIG. 13 is a flow chart which illustrates an exemplary supply chain management process which utilises a supply chain management system to diagnosis and dispense medicine. The recipient (1004) arrives at a health facility and presents his credential storage device (1005) to the supplier (1001). Initially, the supplier (1001) logs in (this includes inserting his credential storage device into the credential storage device receiving module and providing a biometric from which biometric information can be obtained) (1002) into the supply chain management device (1003). The supplier (1001) inserts the recipient's (1004) credential storage device (1005), logs in and verifies (1006) (this includes fingerprint (biometric) scan) into the supply chain management device (1003). The supplier (1001) performs the required test (1007) (e.g. a medical test) on the recipient (1004). When a positive diagnosis (1006) has been established, the supplier (1001) obtains biometric information (1009) of the recipient (1004) and records (1010) the results on the credential storage device (1005) and the supply chain management device (1003). The supplier (1001) selects the appropriate medicine (1011) and scans the product barcode (1012) and records the information to the supply chain management device (1003). The supplier (1001) obtains biometric information (1009) of the recipient (1004) and records (1010) the medicine information on the credential storage device (1005) and the supply chain management device (1003). The medicine is distributed (1013) to the recipient (1004) by the supplier (1001).

Figure 14:
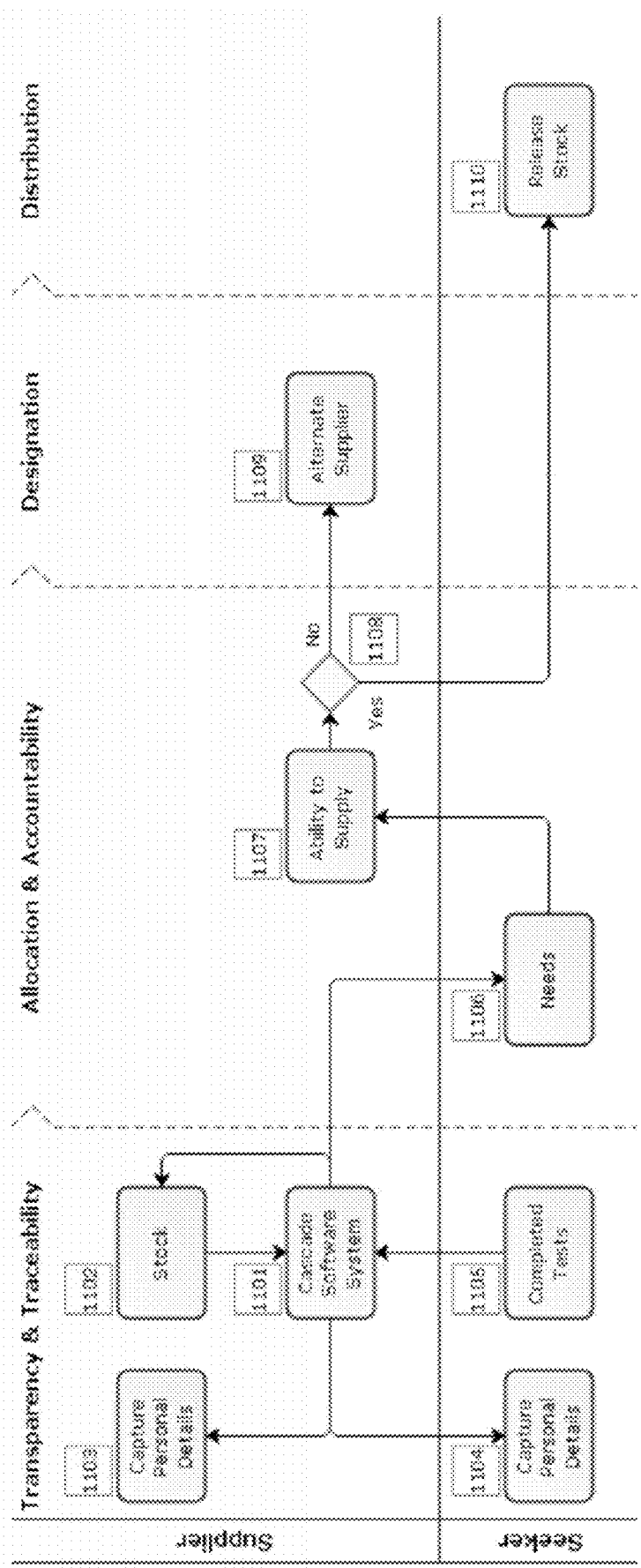
FIG. 14 is a flow chart illustrating a method for managing a supply chain in which product availability is determined and an alternative supplier is identified.

FIG. 14 is a flow chart which illustrates interactions between a supply chain management system and a pharmaceutical supply chain at recipient level. The supply chain management system (1101) has a database to add, retrieve or update stored information to manage stock (1102), to capture personal details of the supplier (1103), to capture personal details of the recipient (1104) and to capture the tests results (1105) of the recipient (1104). Furthermore, the supply chain management system (1101) captures the data input by the supplier to determine the needs (1106) required by the recipient (1104). For example, a positive test result for malaria allows for the release of the appropriate medicines. The stock (1102) availability is checked to ascertain whether the supplier has the ability to supply (1107) the appropriate stock. A decision (1108) is made to either find an alternate supplier (1109) that has the legitimate stock if the stock is not available, if available then release (1110) the legitimate stock to the recipient (1104).

Figure 14A:
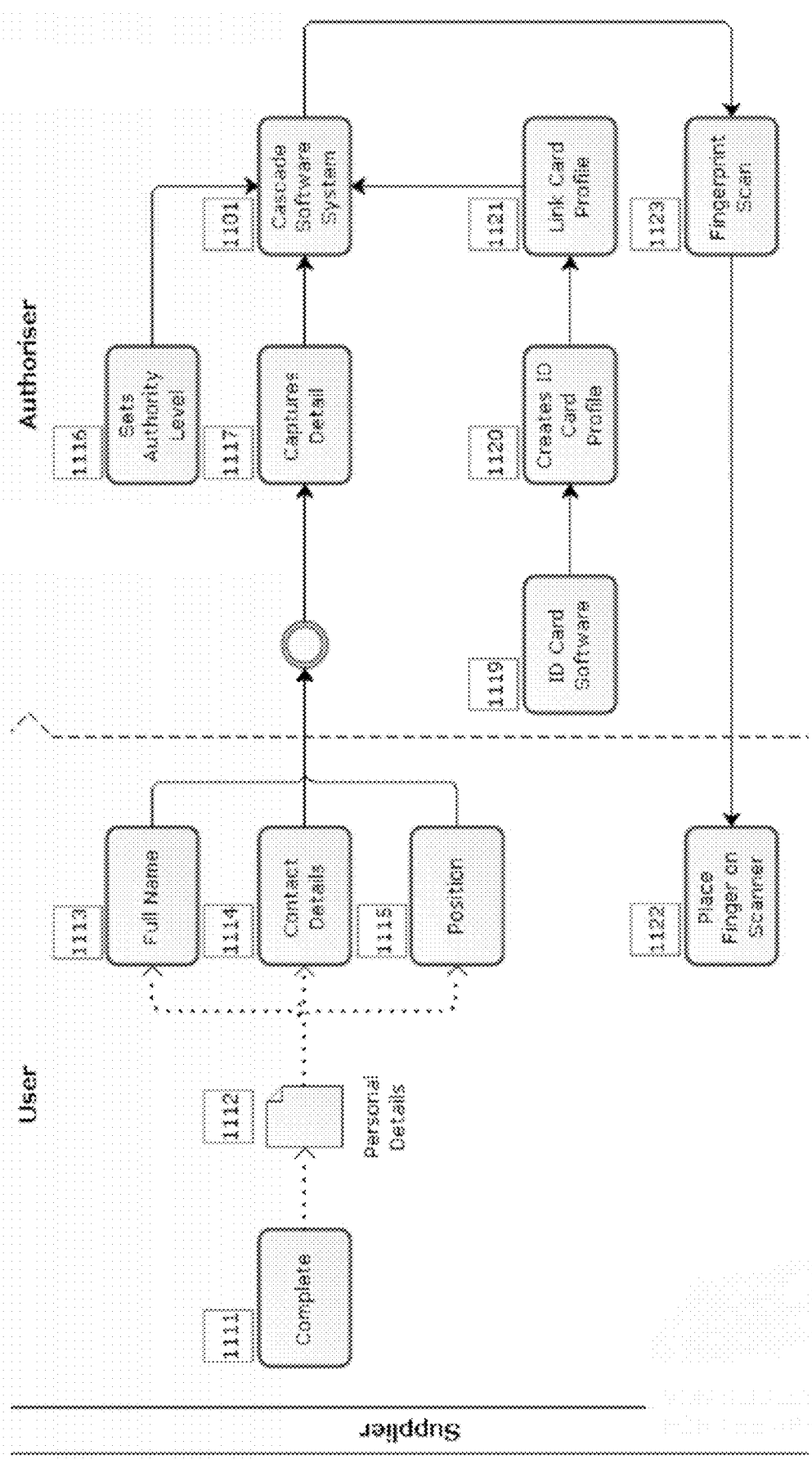
FIG. 14A is a flow chart which illustrates a stage of the method illustrated in FIG. 14 in greater detail.

FIG. 14A is a flow chart showing a detailed sub process associated with capturing personal details of the supplier (1103) illustrated in FIG. 14. The supplier allocated to use the supply chain management system (1101) completes (1111) an application form (1112) and fills in his personal details, namely, full name with identification number (1113), contact details (1114) e.g. address, telephone number, email etc. and the position or title (1115) he holds within the organization. The completed form is handed to the authoriser who captures (1117) the detail onto the supply chain management system (1101). The authoriser sets (1116) the authority level of the operator. The authoriser creates a credential storage device profile (1120) using credential storage device software (1119) (as illustrated in FIG. 10). Once the credential storage device issue process is complete, the credential storage device is inserted into the credential storage device receiving module of the supply chain management device and links the credential storage device profile (1121) to the supply chain management system (1101). The operator provides biometric information which is captured by a biometric capturing device (1122) and the authoriser records the biometric information (1123) and records the data to the supply chain management system (1101).

Figure 14B:
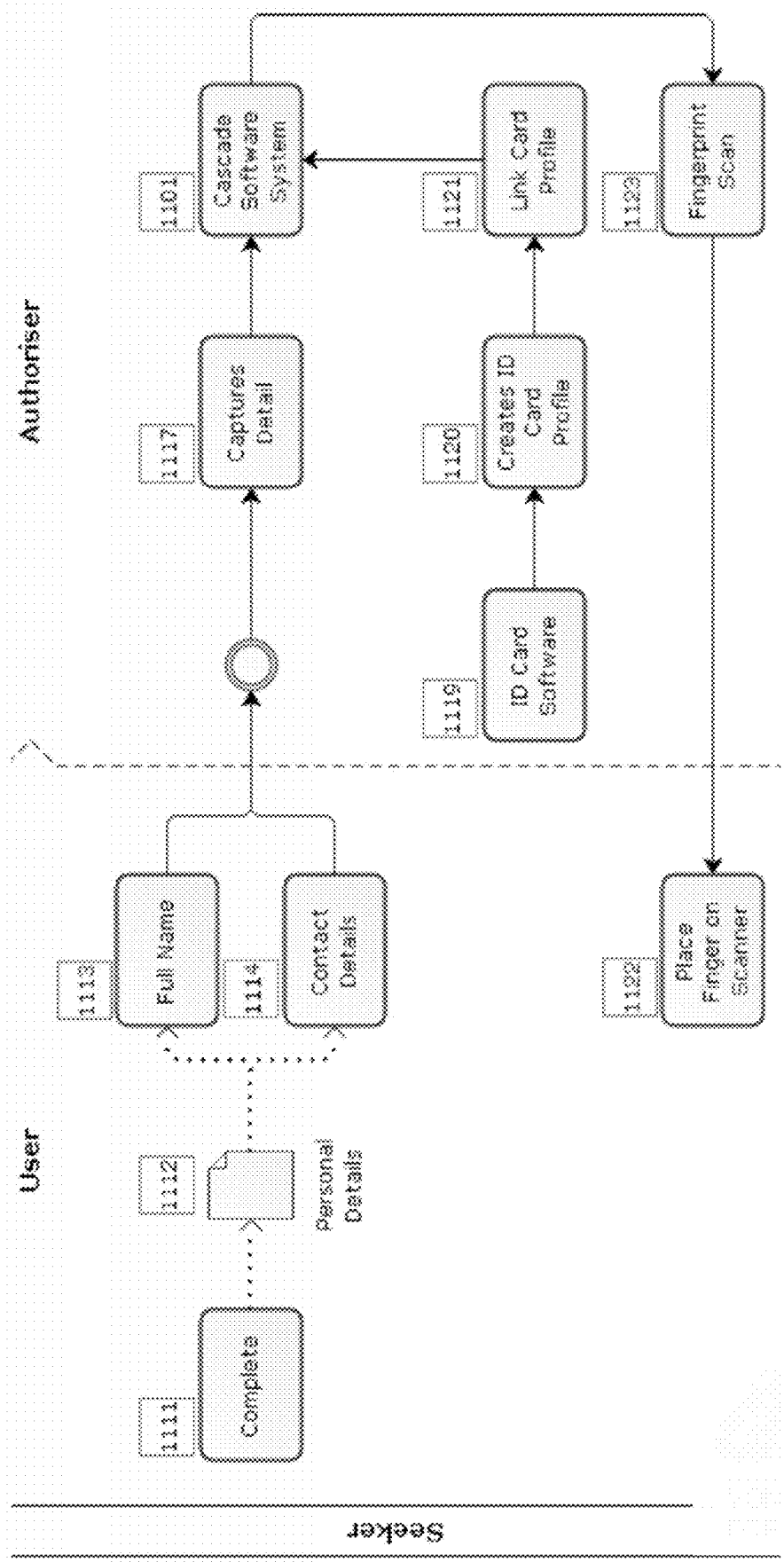
FIG. 14B is a flow chart which illustrates another stage of the method illustrated in FIG. 14 in greater detail.

FIG. 14B is a flow chart illustrating a detailed sub-process of capturing personal details of the recipient (1104) as illustrated in FIG. 14. The supplier allocated to use the supply chain management system (1101) completes (1111) an application form (1112) in fills in his personal details, namely, full name with identification number (1113) and contact details (1114) e.g. address, telephone number, email, etc. The completed form is handed to the authoriser who captures (1117) the detail onto the supply chain management system (1101). The authoriser creates a credential storage device profile (1120) using the credential storage device software (1119) (as illustrated in FIG. 10). Once the credential storage device issue process is complete, the credential storage device is inserted into the credential storage device receiving module of the supply chain management device which links the credential storage device profile (1121) to the supply chain management system (1101). The operator provides biometric information (e.g. places his finger on a scanner) (1122) and the authoriser records the biometric information (e.g. fingerprint) (1123) and saves the data to the supply chain management system (1101).

Figure 15:
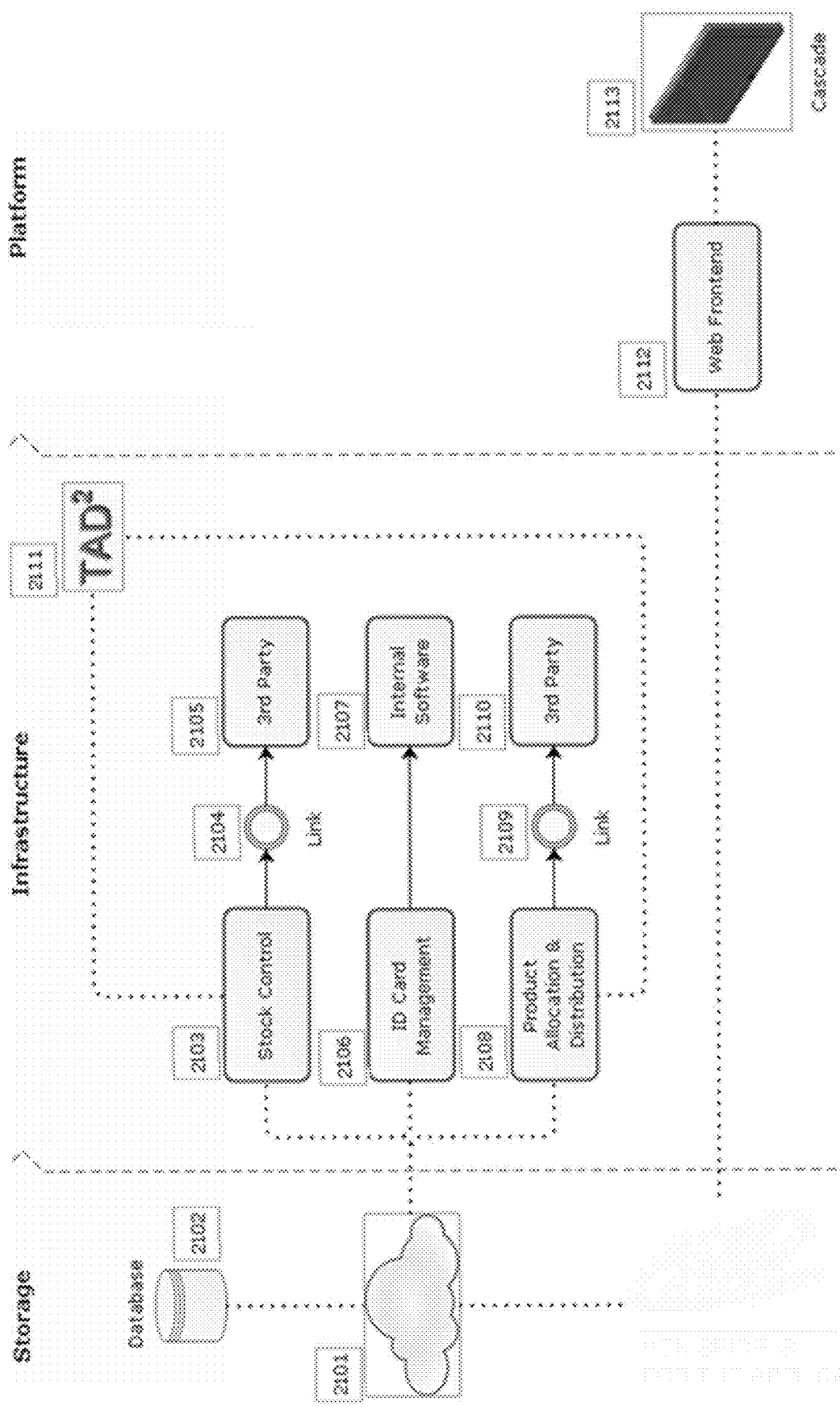
FIG. 15 is a schematic diagram which illustrates aspects of an exemplary supply chain management system.

FIG. 15 is a schematic diagram which illustrates a high level layout of en exemplary supply chain management system. Using a cloud (2101) based server, a central database (2102) stores all information linked to the system. Infrastructure includes various backend systems utilised in the process. The infrastructure includes stock control (2103) processes that are linked (2104) to a third party (2105) software system to extract the relevant information. The infrastructure further includes a credential storage device management (2106) system which uses its own software (2107) to register and manage operators. The product allocation and distribution (2108) system is the process to select and issue product (e.g. medicine) to the recipient (e.g. a patient). The stock control (2103) process and the product allocation and distribution (2108) system are linked to the supply chain management system. A platform includes a web based frontend system (2112) that allows operators to access the cloud via the supply chain management device (2113).

Figure 16:
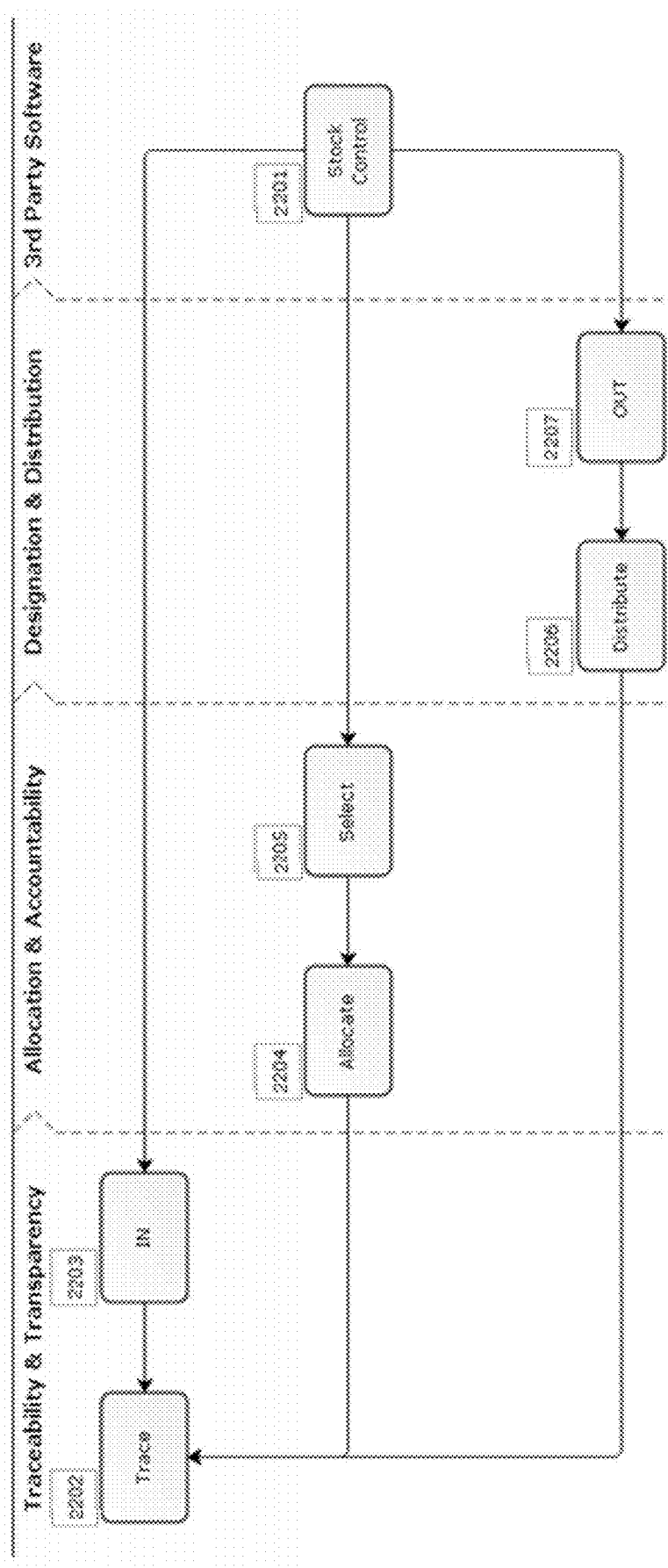
FIG. 16 is a schematic diagram which illustrates third party integration with a supply chain management system.

FIG. 16 is a schematic diagram which illustrates at an intermediate level how third party software may interface with a supply chain management system. Third party software refers to platforms which may be used by third parties along the supply chain to manage their stock in and stock out. The stock control (2201) process includes stock in (2203) which sends selected information to a trace (2202) system. When stock is selected (2205) and allocated (2204) the selected information is sent to the trace (2202) system. Stock out (2207) refers to the distribution (2206) of stock to the recipient and selected information is sent to the trace (2202) system.

Figure 16A:
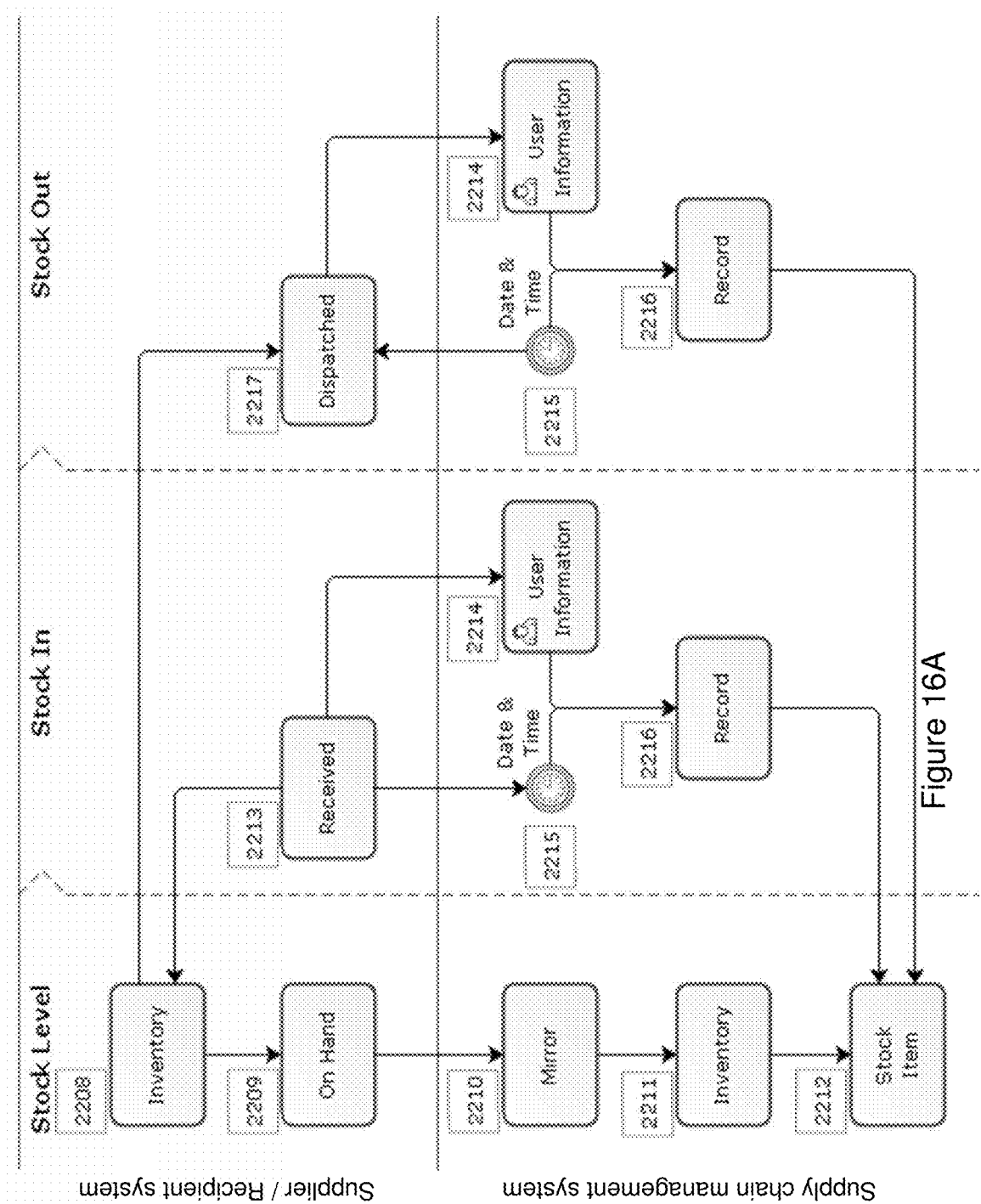
FIG. 16A illustrates an intermediate level of data flow between a supplier and/or a recipient and the supply chain management system.
Figure 16B:
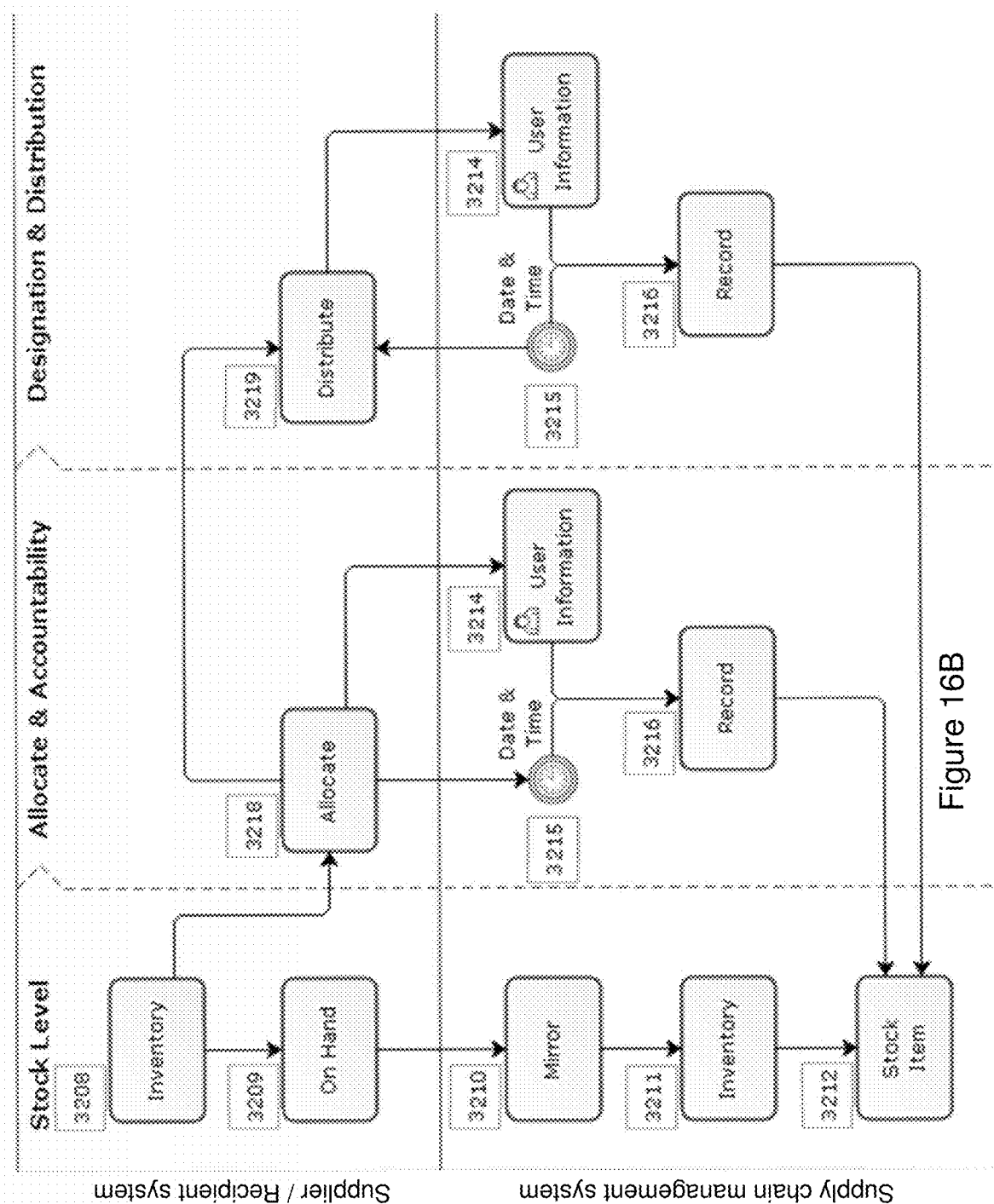
FIG. 16B illustrates an intermediate level of data flow between a supplier and/or a recipient and the supply chain management system.

FIG. 16A is a flow diagram which illustrates an intermediate level of data flow between a supplier and/or a recipient and a supply chain management system. The inventory (2208) on hand (2209) on the recipient supplier platform needs to mirror (2210) to the inventory (2211) database on the supply chain management system. Each stock item (2212) will track data received, as will be explained further below.

For stock in, recipient/supplier platform processes inventory received (2213) and updates the inventory (2208) on hand (2209). The supply chain management system records the operator information (2214) (including information obtained from a credential storage device and biometric capturing device) with a date and time (2215) of transaction. The captured information is recorded (2216) against the individual stock item (2212) (e.g. against a product identifier).

For stock out, the recipient and/or supplier platform processes inventory dispatched (2217) and updates the inventory (2208) on hand (2209). The supply chain management system records the operator information (2214) (including information obtained from a credential storage device and biometric capturing device) with a date and time (2215) of transaction. The captured information is recorded (2216) against the individual stock item (2212) (e.g. against a product identifier).

FIG. 16 is a flow diagram which illustrates an intermediate level of data flow between a supplier and/or a recipient and the supply chain management system. Inventory (3208) on hand (3209) on the recipient/supplier platform needs to mirror (3210) to the inventory (3211) database on the supply chain management system. Each stock item (3212) will track data received. The recipient/supplier platform allocates (3218) available inventories (3208) to be distributed (3219). The supply chain management system records the operator information (3214) (including information obtained from a credential storage device and biometric capturing device) with a date and time (3215) of transaction. The captured information is recorded (3216) against the individual stock item (3212).

Figure 17:
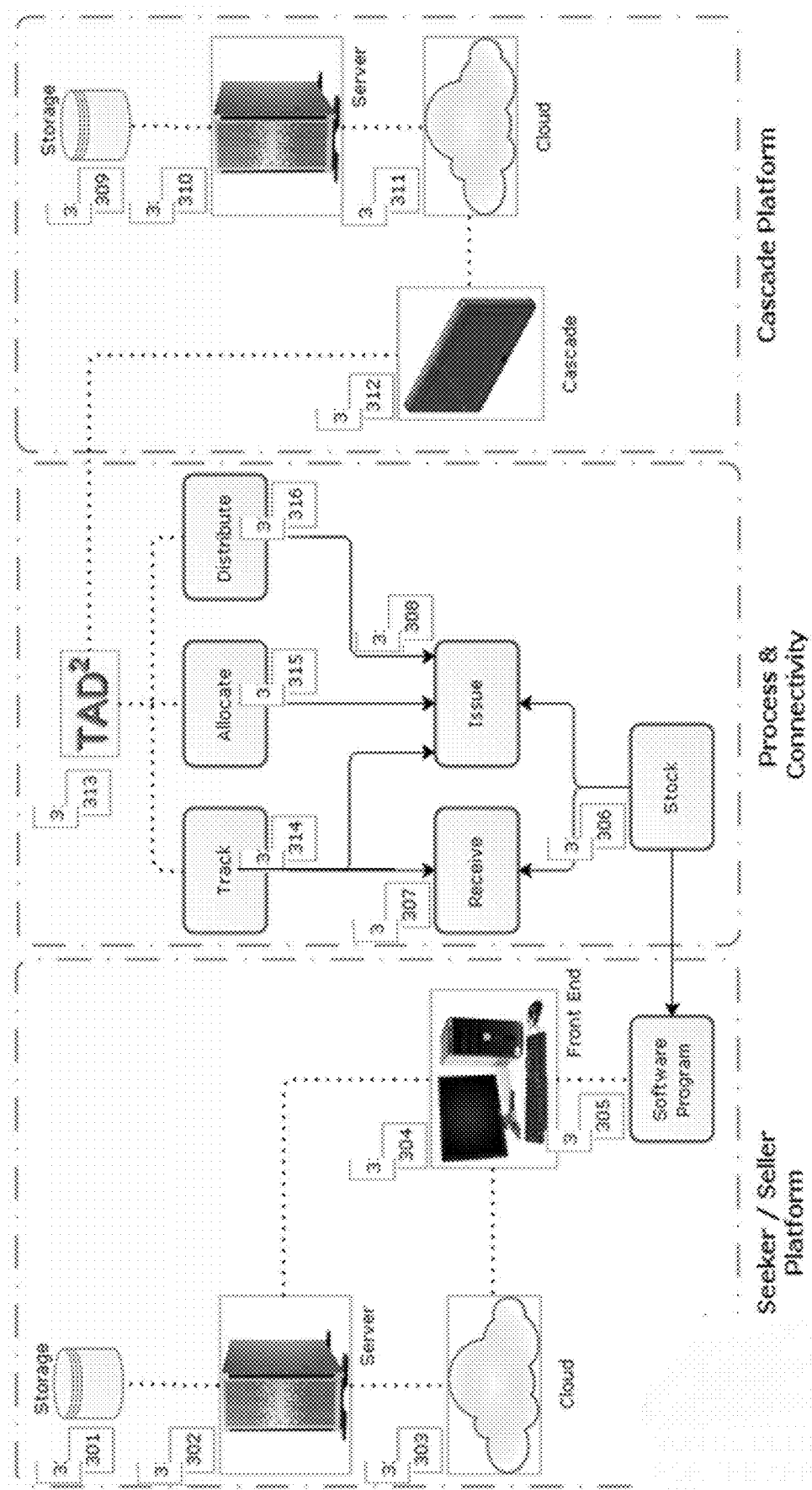
FIG. 17 is a schematic diagram which illustrates aspects of an exemplary supply chain management system.

FIG. 17 is a high level flowchart which illustrates exemplary interfaces between a supply chain management system and a recipient/supplier system. The recipient/supplier system includes a storage database (3301) which may reside on a server (3302). The server (3302) in turn connects to a front end workstation (3304) either directly or through a cloud platform (3303). The recipient/supplier is able to log into the front end workstation (3304) and loads an appropriate software program (3305) which manages stock (3306). Stock is either received (3307) or issued (3308) as may be appropriate. The supply chain management system includes a storage database (3309) which may reside on a server (3310). The server (3310) connects to the supply chain management device (3312) through a cloud (3311) platform. The supply chain management software (3313) is operable to gather information from the recipient/supplier platform as stock is received, sold, dispensed or the like. A process and connectivity module is provided which includes a track module (3314). The track module (3314) enables a traceability and transparency process that follows the journey of the stock (3307) and (3308) from manufacturer to end-operator depending on the supply chain needs. An allocate module (3315) is provided which enables an allocation and accountability process that checks the stock availability (3308) and suggests alternative supply, whether at source or alternative options. A distribute module (3316) is provided which enables a designation and distribution process for selling or dispensing (3308) of stock.

Figure 18A:
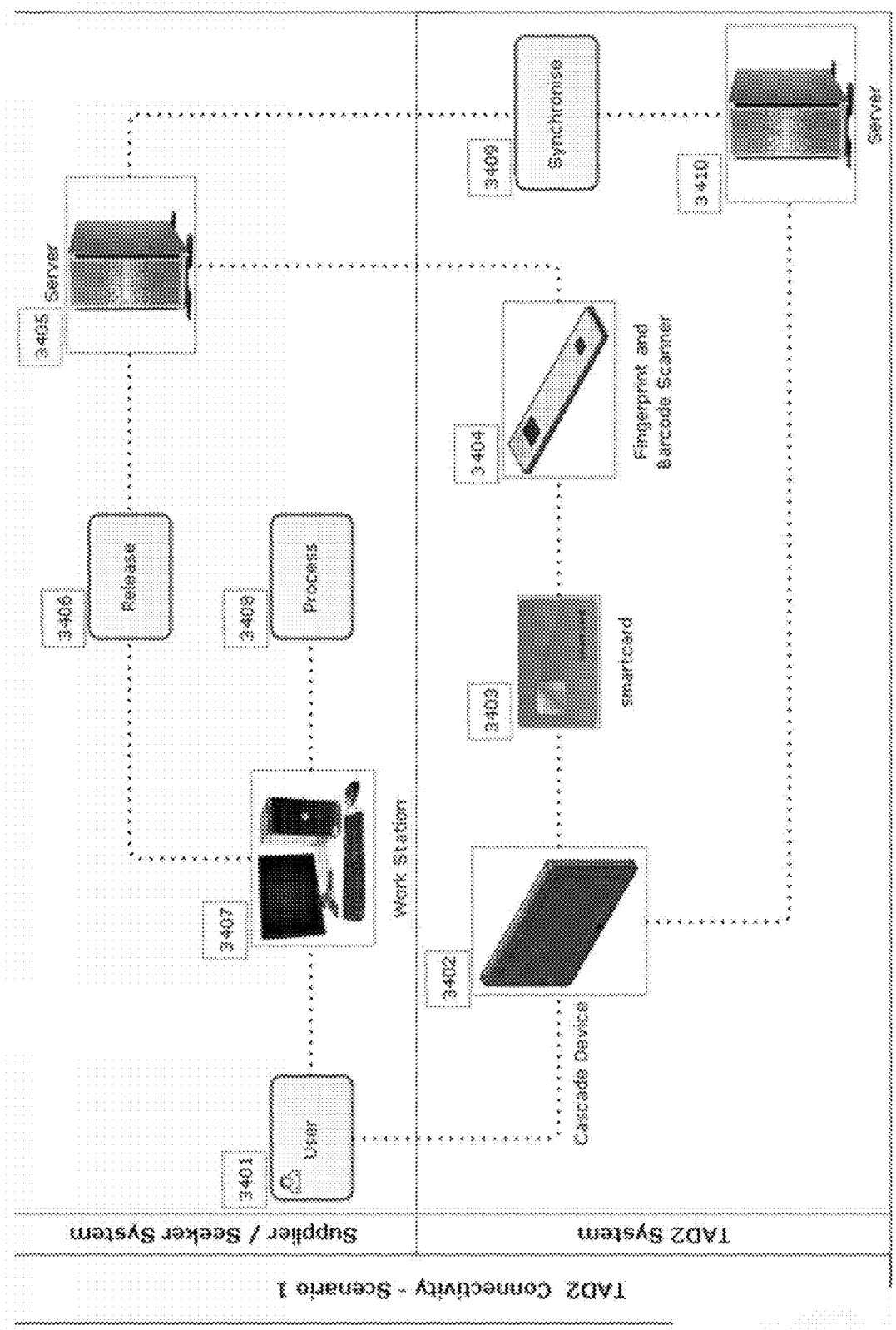
FIG. 18A is a schematic diagram which illustrates a first exemplary in-use scenario.

FIG. 18A is a flowchart which illustrates connectivity which may be implemented between a supplier/recipient system and a supply chain management system according to one embodiment. In this embodiment, a supply chain management device is used alongside a supplier/recipient work station. An operator (3401) logs into the supply chain management device (3402), inserts his credential storage device (3403) and provides biometric information for capture by a biometric capturing device (3404). The information is sent to a third party server computer (3405) which then releases (3406) the work station (3407) to do the required processes (3408). The work station may, for example, identify a product which is to be dispensed or disposed of, or identify a product which is to be received. The data is synchronised (3409) between the third party server computer (3405) and the central server computer (3410).

Figure 18B:
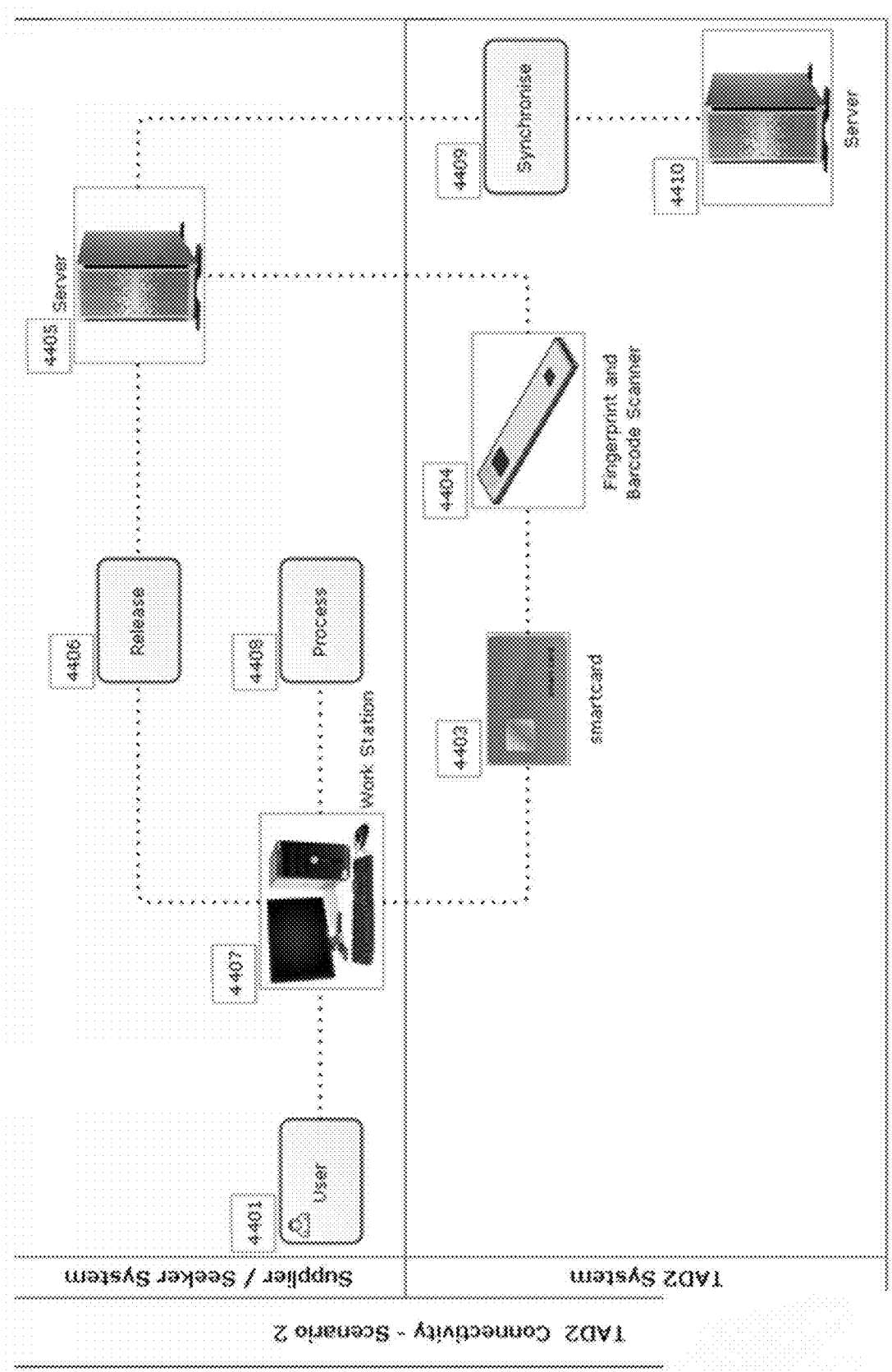
FIG. 18B is a schematic diagram which illustrates a second exemplary in-use scenario.

FIG. 18B is a flowchart which illustrates connectivity which may be implemented between a supplier/recipient system and a supply chain management system according to another embodiment. In this embodiment, the supplier/recipient work station interfaces with the supply chain management system for the entire process. The operator (4401) logs into the supplier recipient work station (4407), inserts his credential storage device (4403) and provides biometric information using the biometric capturing device (4404). The information is sent to the third party server computer (4405) which then releases (4406) the work station (4407) to do the required processes (4408). The data is synchronised (4409) between the third party server computer (4405) and the central server computer (4410).

Figure 18C:
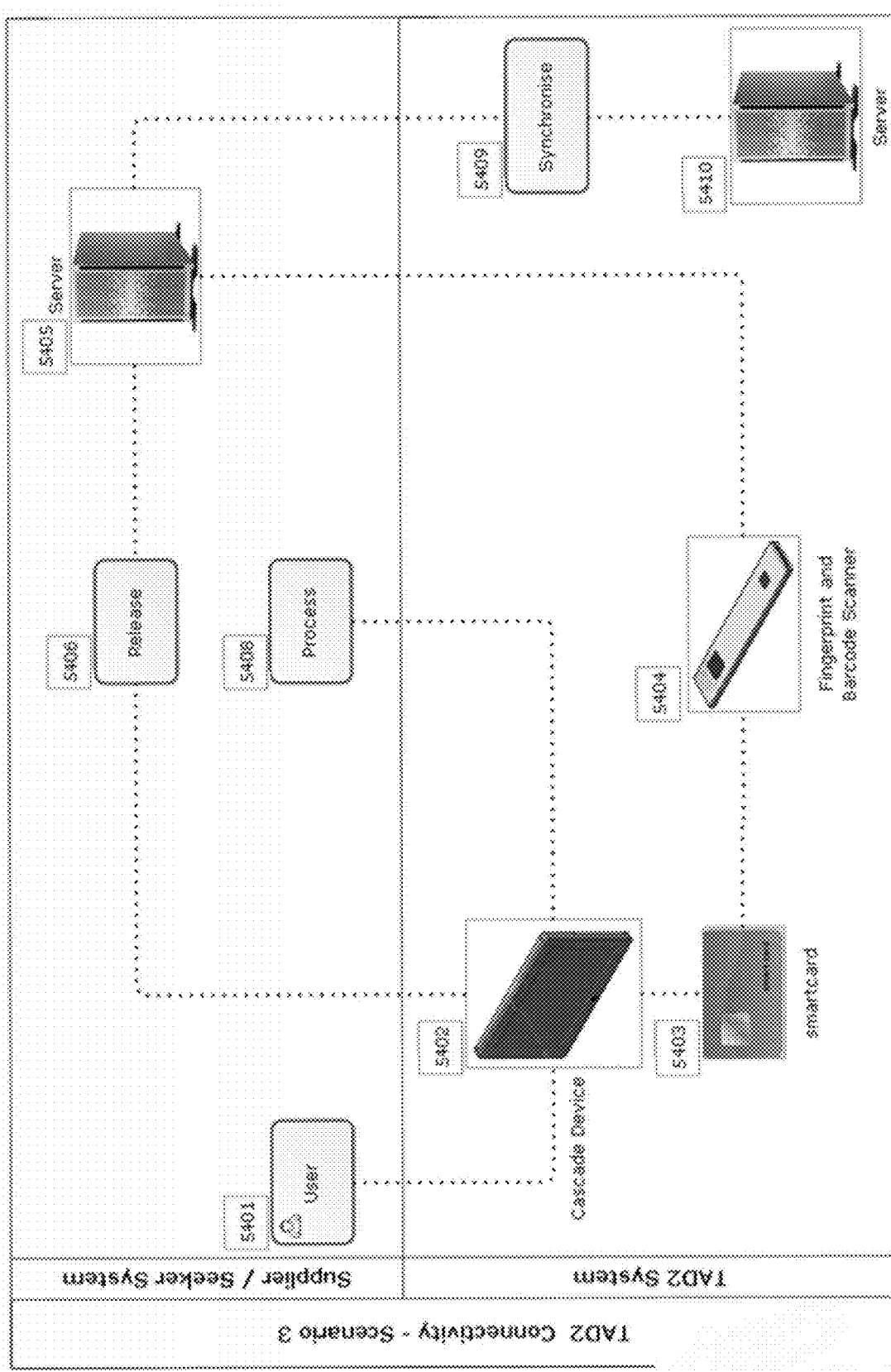
FIG. 18C is a schematic diagram which illustrates a third exemplary in-use scenario.

FIG. 18C is a flowchart which illustrates connectivity which may be implemented between a supplier/recipient system and a supply chain management system according to yet another embodiment. In this embodiment, the supply chain management device uses the supply chain management system for the entire process. The operator (5401) logs into the supply chain management device (5402), inserts his credential storage device (5403) and provides biometric information using the biometric capturing device (5404). The information is sent to the third party server computer (5405) which then releases (5406) the supply chain management device (5402) to do the required processes (5408). The data is synchronised (5409) between the third party server computer (5405) and the central server computer (5410).

Figure 19:
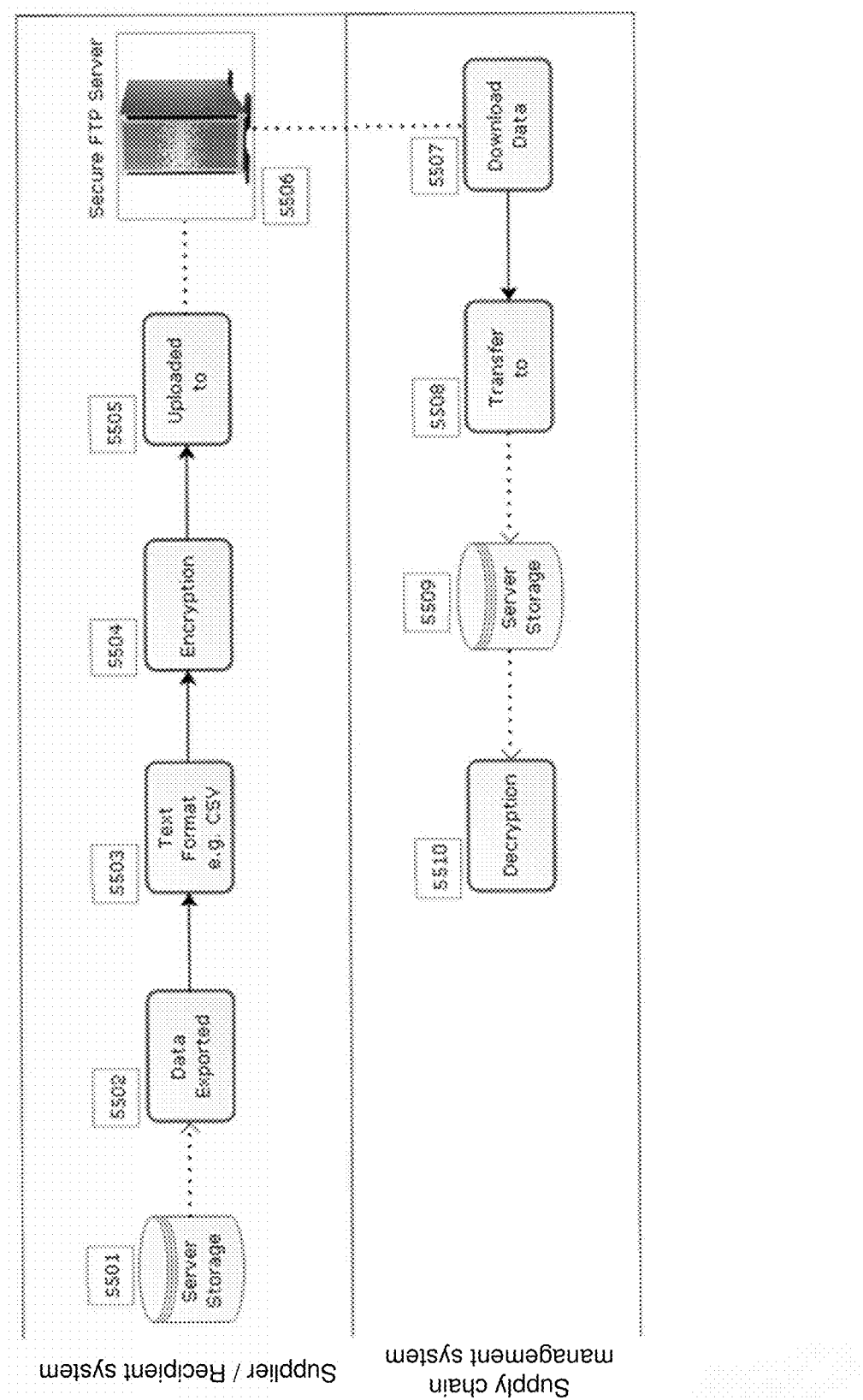
FIG. 19 is a schematic diagram which illustrates a method of synchronising data between a third-party server computer and a central server computer.

FIG. 19 is a flow chart which illustrates method for synchronising data between a supplier/recipient system (e.g. a third party sever) and a supply chain management system (e.g. a central server). The supplier/recipient system server storage (5501) exports the data (5502) in a text format (5503). The resultant text file is encrypted (5504) and uploaded to (5505) a secure file transfer protocol (FTP) server (5506). The supply chain management system accesses the secure FTP server (5506) remotely and downloads (5507) the data. The data is transferred (5508) to a central server computer storage (5509) whereat the text file is decrypted (5510). Such an implementation described above with reference to FIG. 19 may require more resource management than process management. This may in turn require significantly less programming. In some cases, the synchronisation may take place at set intervals, e.g. hourly, daily, weekly, monthly, and the like. The intervals may be initiated or controlled by a recipient/supplier.

Figure 20:
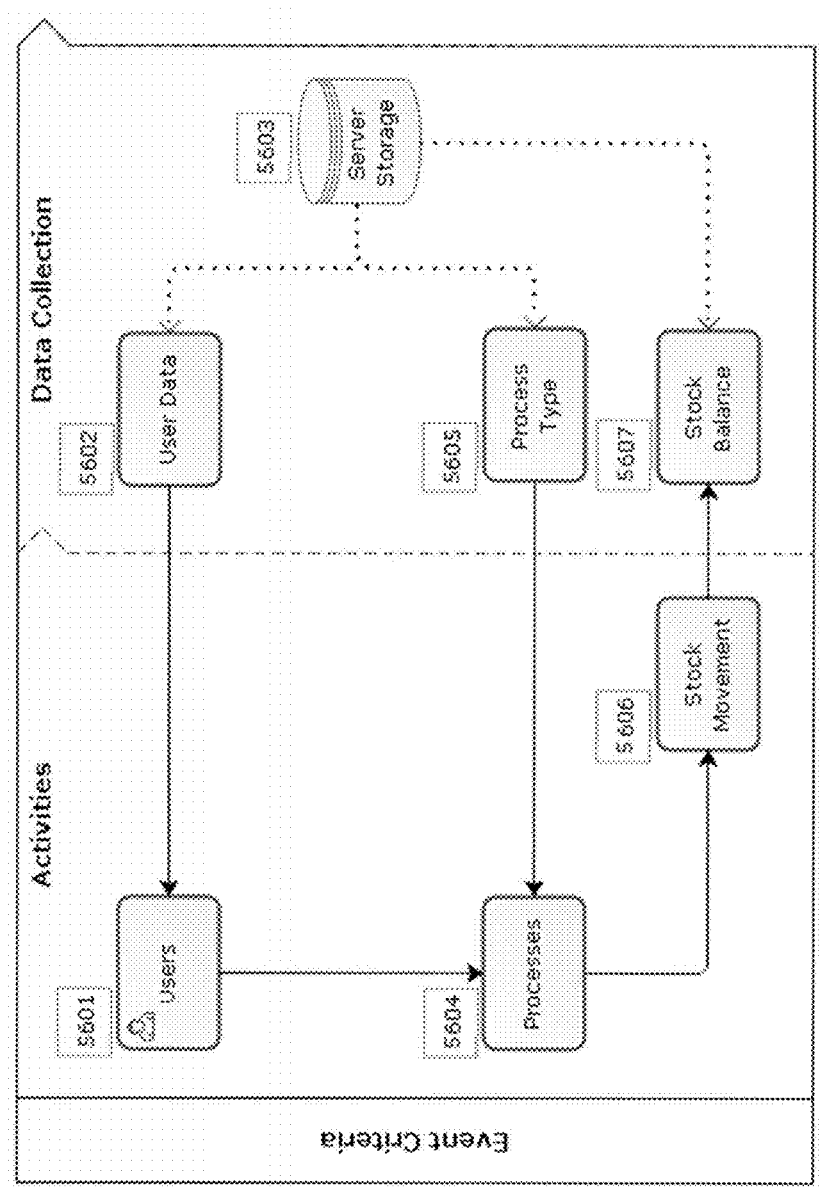
FIG. 20 is a flow chart which illustrates an exemplary event criteria of data collection.
Figure 21A:
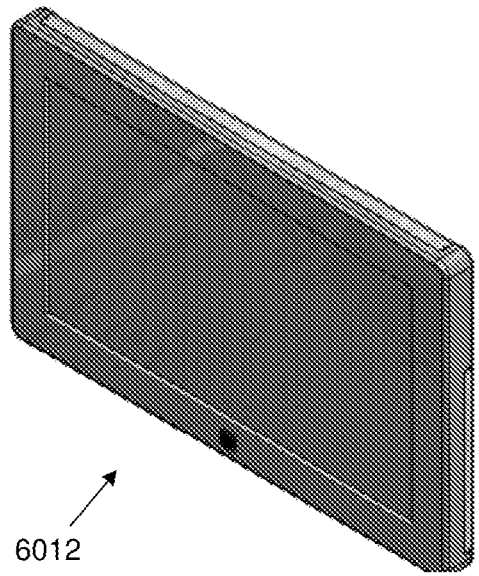
FIG. 21A illustrates an exemplary supply chain management device.
Figure 21B:
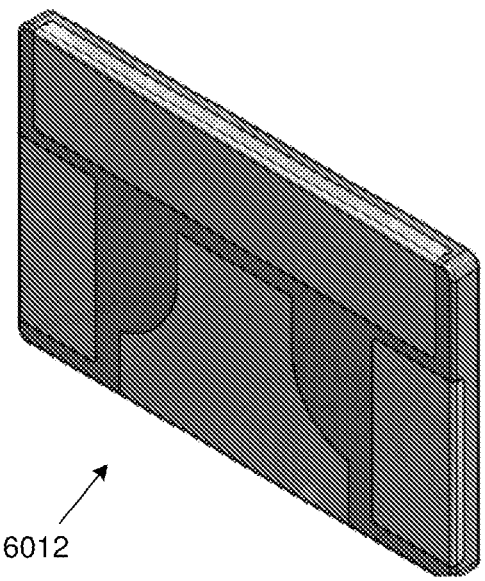
FIG. 21B illustrates an exemplary supply chain management device.
Figure 21C:
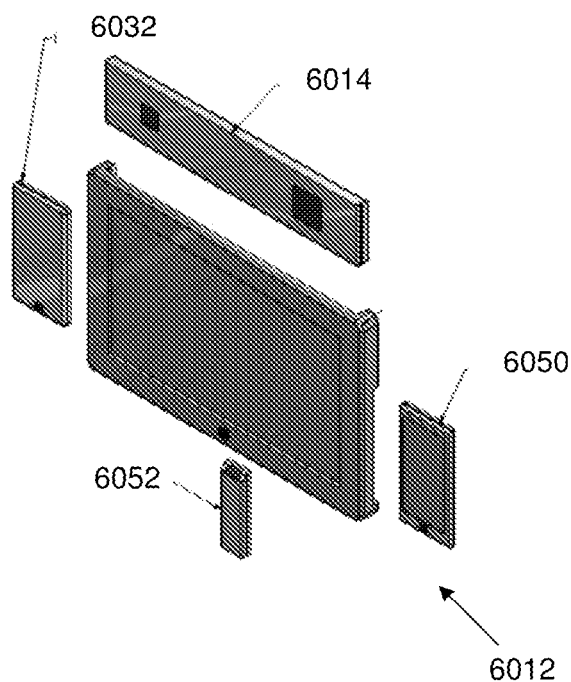
FIG. 21C illustrates an exemplary supply chain management device.
Figure 21D:
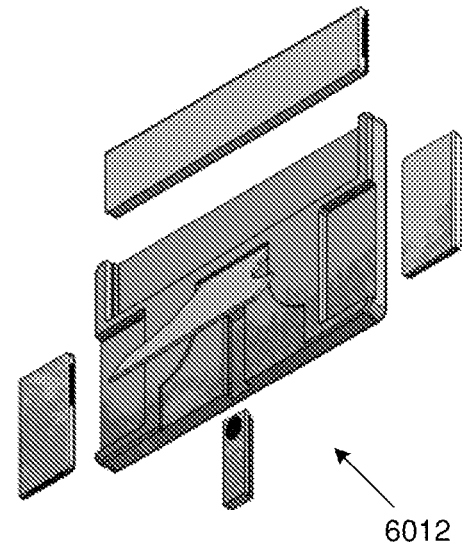
FIG. 21D illustrates an exemplary supply chain management device.

FIG. 20 is a flow chart which illustrates an exemplary event criteria of data collection. Operators (5601) may be the employees or contractors who fulfill the various processes (5604) of stock movement (5606). The operator data (5602) collects information including: operator name; operator position; operator authentication (e.g. credential storage device information, biometric information). This information is stored in the server (5603) storage database. The various processes (5604) done by the operators (5601) relating to stock movement (5606) that affect the stock balance (5607) include: invoicing stock out; credit notes stock out reversed; goods receiving stock in; debit notes stock in reversed; stock take stock adjustments; waste stock adjustments; spoilage stock adjustments; and, expired stock adjustments.

An example of what a text file may look like could be as follows:

Name, Position, Date, Time, ID authentication, Biometric authentication, Process, Description John Smith, Accounts Payable, 5 May 2015, 08:00 am, True, True, Goods Receiving, Stock In Pete Jones, Stores Controller, 16 May 2015, 11:15 am, True, true, Expired, Stock adjustments FIGS. 21A-21D illustrate various views of an exemplary supply chain management device (6012). The supply chain management device (6012) includes a portable device (6014) detachable from the supply chain management device (6012) and which includes a biometric capturing device, a credential storage device receiving module and a product identifying component. The supply chain management device (6012) also includes detachable transmitting component (6032), which may be in the form of a portable modem, and is operable to transmit data via one or more of the group of: a long range wireless area network (LoRAWAN), a satellite communication link; a cellular communication link such as a universal mobile telecommunications system (UMTS) link (e.g. 3G, 4G, LTE, etc.) and/or global system for mobile communications (GSM); a wired local area network; and a wireless local area network (e.g. Wi-Fi). In this manner, the supply chain management device may be operable in remote areas, even outside of the range of terrestrial-based communication networks. The supply chain management device (6012) further includes a portable electronic device (6050) and a portable product identifying device (6052), both of which are detachable from the supply chain management device.

FIGS. 22A-22D illustrate various views of an exemplary portable device (6014) which may be utilized in aspects of the disclosure. The portable device (6014) includes a biometric capturing device (6024), a credential storage device receiving module (6020) and a product identifying component (6026).

FIGS. 23A-23E illustrate various views of an exemplary portable product identifying device (6052), including a product identifying component, which may be utilised in aspects of the disclosure.

Figure 24A:
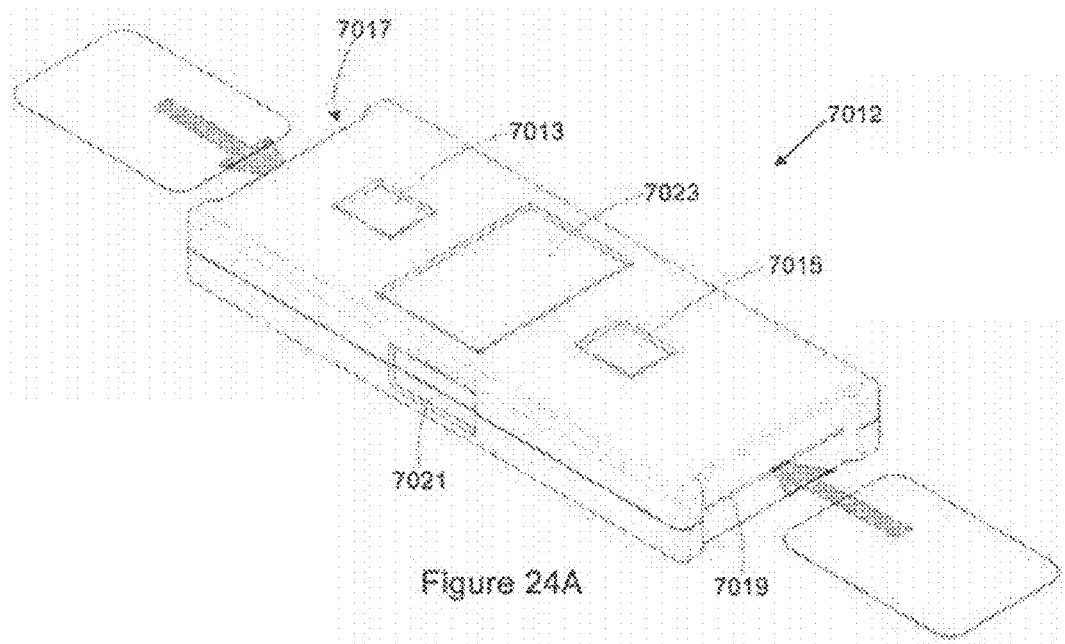
FIG. 24A illustrates an alternative supply chain management device.
Figure 24B:
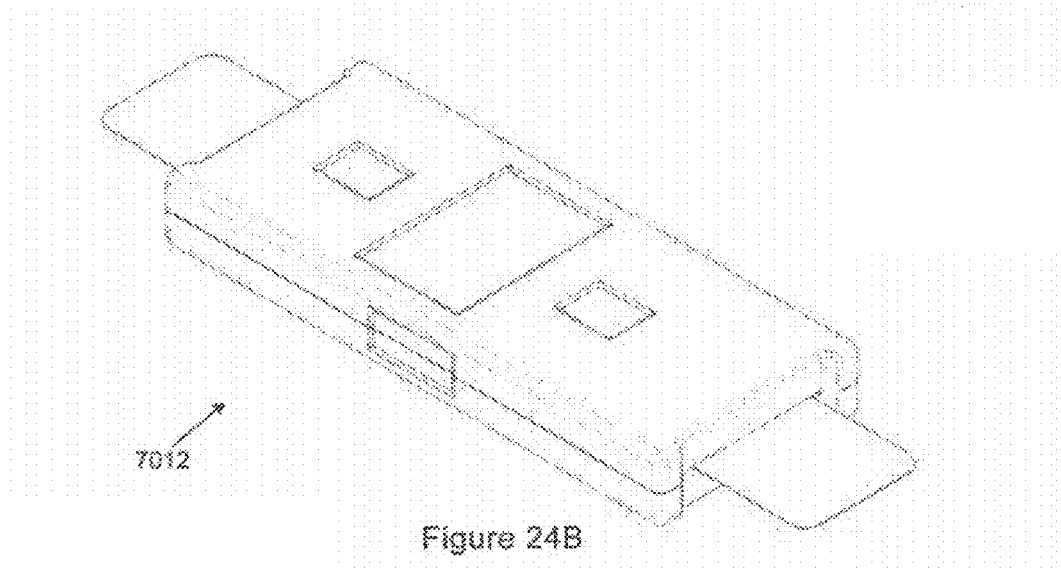
FIG. 24B illustrates an alternative supply chain management device.

FIGS. 24A and 24B illustrates another embodiment of the supply chain management device 7012 including a pair of operator identifying modules 7013, 7015, in the form of biometric fingerprint or finger vein scanners, and a pair of secondary operator identifying modules 7017, 7019, in the form of card readers.

The supply chain management device 7012 further includes a product identifying component 7021, in the form of a barcode scanner, and a screen 7023. With the supply chain management device 7012 configured in this manner, a biometric and secondary identifier of each of the supplier and the recipient, as well as the identifier of the product can be obtained near simultaneously, and certainly within the predefined transaction time interval, constituting a virtual handshake.

Figure 25A:
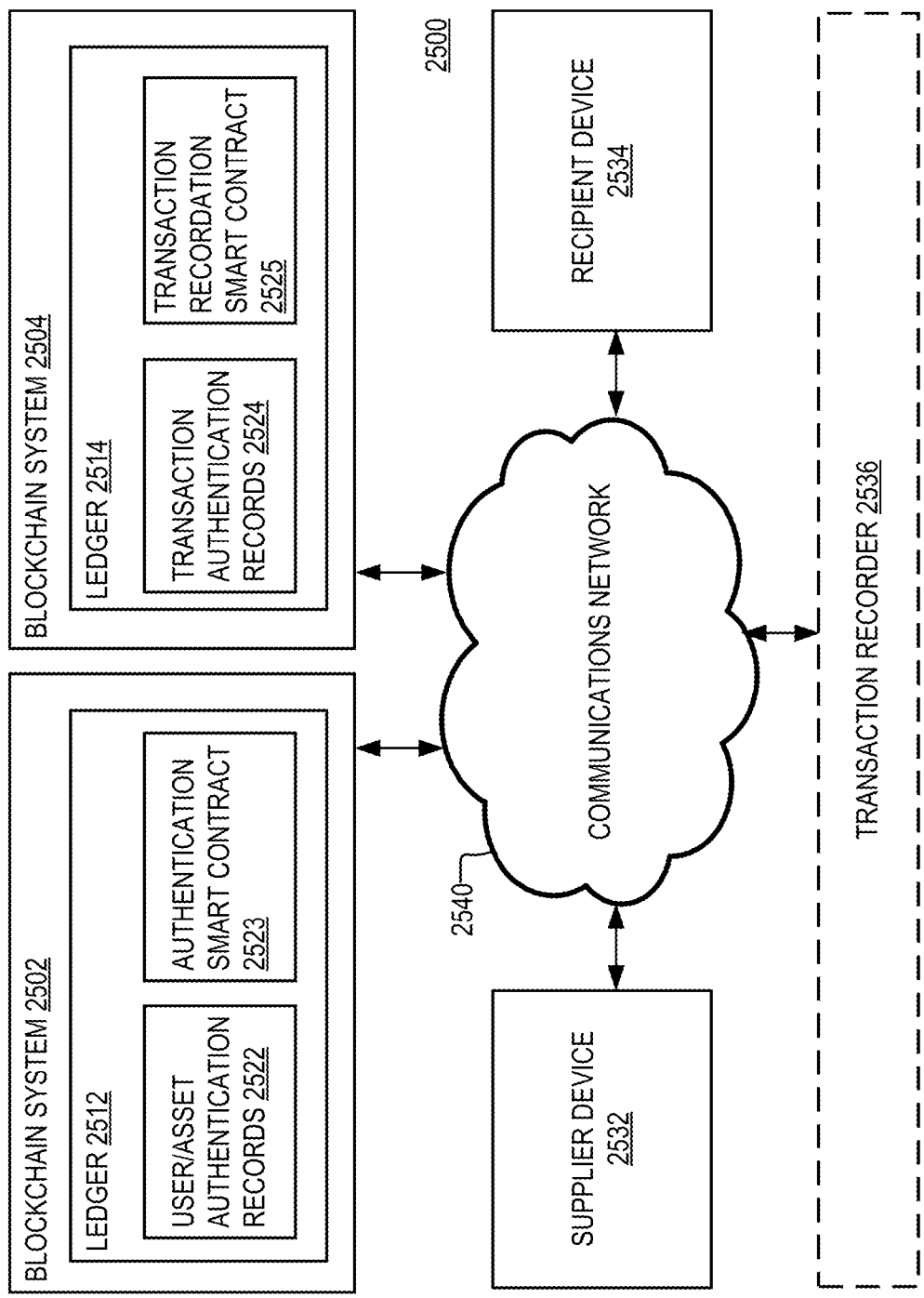
FIG. 25A is a diagram of an example of a system, according to aspects of the disclosure.

FIG. 25A is a diagram of an example of a system 2500, according to aspects of the disclosure. As illustrated, the system 2500 may include a blockchain system 2502, a blockchain system 2504, a supplier device 2532, a recipient device 2534, a transaction recorder 2536, and a communications network.

The blockchain system 2502 may be used to (i) authenticate one or more of the parties to an asset transfer and/or (ii) authenticate the asset that is being transferred. The blockchain system 2504 may be used to record the ownership and/or chain of ownership of the asset. The purpose of the blockchain system 2502 is to ensure high confidence in the current ownership/possession of the asset. It does so by: (i) verifying that (some of) the parties to an asset transfer are indeed who they purport to be, (ii) verifying the identity of the asset to ensure that asset is indeed changing hands (and is not fictitious), and (iii) creating an authentication record that allow(s) the verifications performed by the blockchain system 2502 to be audited, and which is stored in another blockchain system where ownership/possession of the asset is recorded (e.g., the blockchain system 2504).

In some respects, the blockchain system 2502 may be used to process asset authentication information (e.g., crypto-anchors, serial numbers, etc.). The blockchain system 2502 may be provided and or managed by an asset manufacturer. The blockchain system 2504 may be used to record possession/ownership of the asset. The blockchain system 2504, may be managed by a government agency or another entity that wants to track possession of the asset, and which lacks the capability and/or resources to perform asset authentication. As noted above, for each (or at least one) asset transfer that is recorded in the blockchain system 2504, the blockchain system 2504 may store an authentication record for the asset transfer, which may be auditable, and which can be used to increase confidence that the recorded transaction indeed took place (and is not fictitious). As is discussed further below, the authentication record may verify one or more of: (i) that the asset was in possession of the recorded supplier before the transaction (or at or around the time of the transaction) and (ii) or that the recorded supplier had physical possession of the asset before the transaction (or at or around the time of the transaction). The authentication record may use public-private key cryptography and/or any other suitable method to ensure the integrity of trust in the authentication record.

Additionally or alternatively, in some implementations, the authentication record for any asset transfer my certify the integrity of the chain of ownership of the asset. For example, in some implementations, the authentication record may include an indication that the chain of ownership of the asset has been verified and no breaks in the chain of ownership have been detected. As another example, in some implementations, the authentication record may indicate that the chain of ownership of the asset has been examined and a break in the chain of title has been discovered. In some implementations, the verification of the integrity of the chain of ownership may be performed by the device recording the asset transfer in the blockchain system 2504 (e.g., the supplier device 2532, the recipient device 2534, or the transaction recorder 2536, etc.). Additionally or alternatively, in some implementations, the verification of the integrity of the chain of ownership may be performed by the blockchain system 2504 (e.g., by logic that is part of the smart contract 2525 or by another smart contract that is instantiated in the blockchain system 2504).

Figure 26:
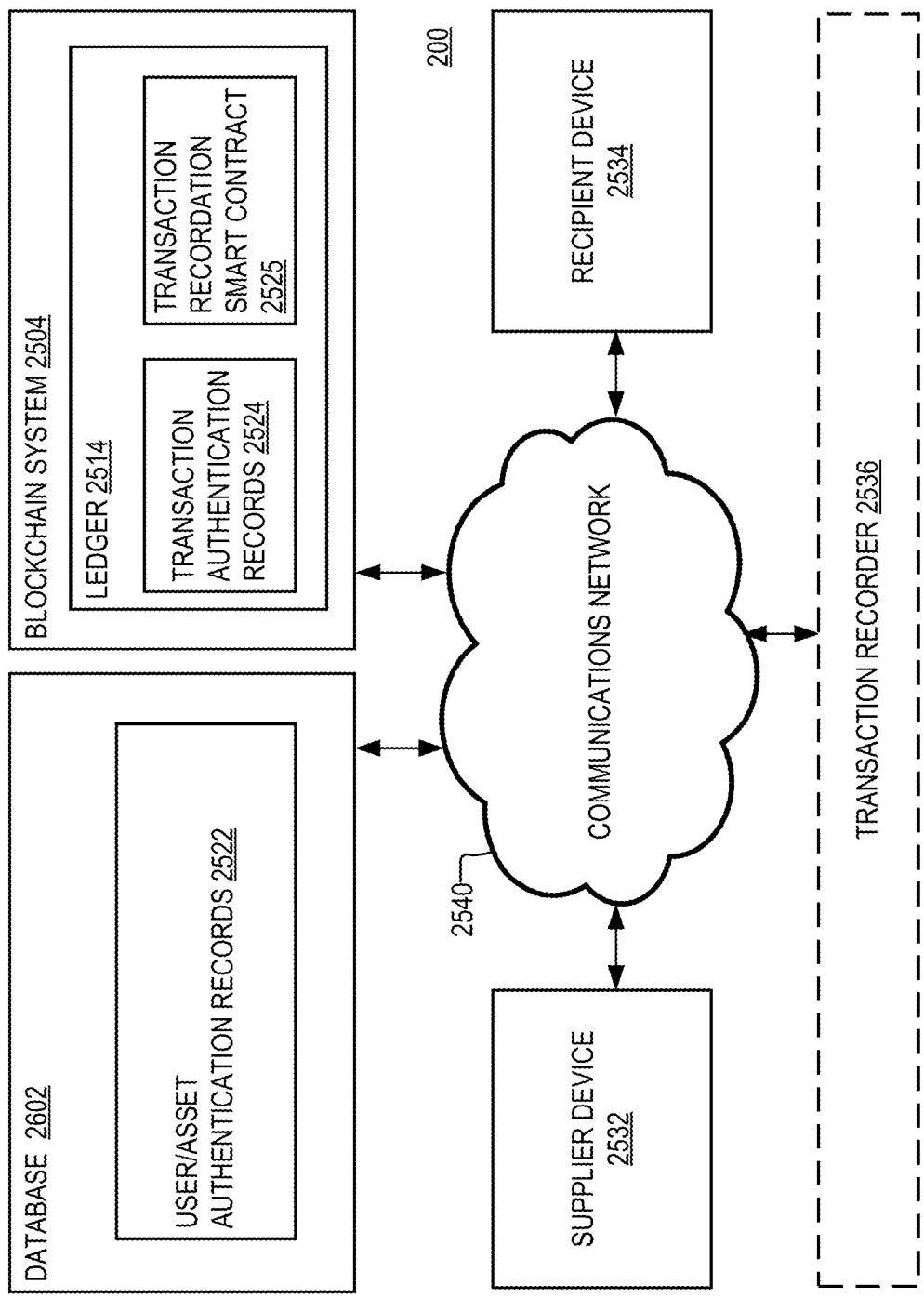
FIG. 26 is a diagram of an example of a system, according to aspects of the disclosure.

In the example of FIG. 25A, the authentication record for an asset transfer is generated by a blockchain system other than a blockchain system where the asset transfer is recorded. However, alternative implementations, are possible in which the authentication record is generated b a centralized issuing authority, such as the authentication database 2602, which is shown in FIG. 26. In addition, further alternative implementations are possible in which the authentication record is generated by the blockchain system where the transfer of asset ownership/possession is recorded (e.g., see FIG. 27). Moreover, further alternative implementations are possible in which the authentication record is generated by the supplier device 2532 and/or the recipient device 2534.

FIG. 25B shows an example of one possible implementation of an authentication record. Shown in FIG. 25B is an authentication record 2575, which includes a plurality of entries 2576. As illustrated, any of the entries 2576 may include one or more of the following: (i) the time when an asset authentication information item is received from a user, (ii) an indication of whether the authentication information item has been successfully authenticated and confirmed to be valid, and (iii) and indication of whether the user/device who provided the asset authentication item has been successfully authenticated.

Returning to FIG. 25A, the blockchain system 2502 may include any suitable type of cryptographically auditable system that is configured to provide secure access control for authentication records that are stored in the blockchain system 2502. For ease of explanation, the blockchain system 2502 is depicted as a monolithic entity. However, according to the present example, the blockchain system 2502 is implemented as a peer-to-peer network including a plurality of computing devices that are configured to operate as nodes of the blockchain system 2502. The blockchain system 2502 may include a ledger 2512, as shown. The ledger 2512 may include a list of records 2522 which are linked using a cryptographic technique. The ledger 2512 may be distributed between the nodes of the blockchain system 2502, such that each of the nodes stores a respective copy of the ledger 2512 in its memory. The records 2522 may be stored on the ledger 2512 by using a consensus algorithm that is configured to ensure correct replication of the records 2522 across the nodes in the blockchain system 2502, such that once data is stored in a given block of the ledger, that data cannot be altered retroactively without a consensus of a network majority (or another consensus-building mechanism).

The user/asset authentication records 2522 may include records that store information for authenticating users. The information for authenticating users may include a user ID, a password, a personal identification number (PIN), biometric information (e.g., a fingerprint or an iris signature, etc.), an answer to a secret question, and/or any other suitable number, string or alphanumerical string that can be used to authenticate a supplier of an asset or a recipient of the asset. The supplier of an asset may include a person or a physical entity that has been recorded in the blockchain system 2504 as being in possession of an asset. The asset may be a physical asset or a virtual asset. The possession may be physical possession (when the asset is a physical asset) or virtual possession (when the asset is a virtual asset). A physical asset may be a package of medication, a painting, a precious metal bar, and/or any other suitable physical object whose exchange is desired. A virtual asset may include cryptocurrency, a non-fungible token (NFT) and/or any other suitable type of electronic asset. The terms "virtual asset" and "digital asset" are used interchangeably in the present disclosure. The recipient of an asset may be a person or entity that receives the asset, and which is subsequently recorded in the blockchain system 2504 as being in possession of the asset. As noted, the possession may be physical possession when a physical asset is being transferred or virtual possession when a digital asset (e.g., cryptocurrency, an NFT, etc.) is being transferred.

The user/asset authentication records 2522 may include one or more of: records that store information for authenticating assets. The information for authenticating assets may include a serial number of an asset, an identifier corresponding to an asset, and/or a descriptor of a crypto-anchor corresponding to an asset. In some implementations, the crypto-anchor of an asset may include a configured secret that is associated with the asset. A configured secret may be a digital password or a crypto key that is added to an asset by its manufacturer. An example of such configured secret may be an integrated circuitry (IC) that stores a unique key and implements cryptographic functions protecting that key. A descriptor of such configured secret may include the digital representation of a password or crypto key that is stored in the digital circuit. Additionally or alternatively, in some implementations, the crypto-anchor of an asset may include a physical fingerprint of the asset. By way of example, the crypto-anchor may be a physical unclonable function (PUF). A PUF may include a physical entity that is embedded in a physical structure and is easy to evaluate, but hard to predict. Examples of different PUF types include magnetic PUF, optical PUF, delay PUF, surface PUF, RF PUF, etc. A descriptor of a PUF may include a representation (e.g., a number, string, or alphanumerical string) that identifies one or more characteristics (or features) of the PUF. Additionally or alternatively, in some implementations, a crypto anchor of an asset may include an embedded security feature, such as a micro-printed image/text, a hologram, a printing with security ink, etc. A descriptor of an embedded security feature may include a representation (e.g., a number, string, or alphanumerical string) that identifies one or more characteristics (or features) of the embedded security feature. Additionally or alternatively, in some implementations, a crypto-anchor of an asset may include a surface descriptor. The surface descriptor may include a feature vector that is generated based on an image of a surface (interior or exterior) of a physical. The term "descriptor" as used in the phrase "descriptor of a crypto-anchor" shall refer to any object, number, string, alphanumerical string, hash, or another digital representation of the crypto-anchor.

FIG. 25C shows an example of the user/asset authentication records 2522 in accordance with one implementation. As illustrated, the user/asset authentication records 2522 may include user authentication records 2562 and asset authentication records 2564. Each user authentication record 2562 may include: (i) a user authentication information item, and (ii) an identifier of the user to whom the user authentication information item belongs. A user authentication information item may include biometric data, a cryptographic key, or a secret word for authenticating a user. By way of example, and as noted above, a user authentication information item may include a password, a fingerprint signature, an iris signature, and/or any other suitable type of number, string, or alphanumerical string that can be used to authenticate the user. Each asset authentication record 2564 may include: (i) an asset authentication information item, and (ii) an identifier of the asset to which the asset authentication information item belongs. As noted above, an asset authentication information item may include a serial number, a crypto-anchor descriptor, and/or any other suitable type of number, string, or alphanumerical string that can be used to authenticate the asset.

The smart contract 2523 may include logic for validating at least one of: (i) a user authentication information item that is provided to the blockchain system 2502 and/or (ii) an asset authentication information item that is provided to the blockchain system 2502.

In some implementations, the logic may receive as an input a user authentication item for a user and compare the input to a master copy of the user authentication item that is stored in the ledger 2512. If the input matches the "master copy", the logic may determine that the user authentication item provided by the user (as the input) is valid. Otherwise, if the input does not match the "master copy", the logic may determine that the user authentication item provided by the user (as the input) is not valid. The "master copy" may include a complete or incomplete copy of a user authentication item (e.g., a hash) to which user input provided over the course of an authentication handshake is compared.

For example, the logic may receive as input a fingerprint scan of the user (i.e., a fingerprint signature that is generated by the recipient device 2534 by scanning the fingerprint of the user). Next, the logic may compare the received fingerprint scan to a fingerprint signature that is stored in the ledger 2512, and which is registered in the ledger 2512 as belonging to the user. If the fingerprint signature that is stored in the ledger 2512 matches the fingerprint scan, the logic may determine that the user is authenticated. On the other hand, if the fingerprint scan does not match the fingerprint signature for the user that is stored in the ledger 2512, the logic may determine that the user cannot be authenticated.

As another example, the logic may receive as input a password for the user (i.e., a password that has been typed by the user into the recipient device 2534). Next, the logic may compare the received password to a password hash that is stored in the ledger 2512, and which is registered in the ledger 2512 as belonging to the user. If the password hash matches the password typed by the user, the logic may determine that the user is authenticated. On the other hand, if the typed password does not match the password hash, the logic may determine that the user cannot be authenticated. Although in the present example the logic of the smart contract 2523 is configured to authenticate the user of the recipient device 2534, it will be understood that in some implementations the logic of the smart contract 2523 may be configured to authenticate the user of the supplier device 2532 in the same manner as it would the user of the recipient device 2534.

Additionally or alternatively, the logic of the smart contract 2523 may receive as input an asset authentication information item for an asset and compare the input to a master copy of the asset authentication information item that is stored in the records 2522. If the input matches the "master copy", the logic may determine that the asset authentication information item is valid. Otherwise, if the input does not match the "master copy", the logic may determine that the asset authentication information item, which is provided as input, is not valid. In other words, in addition to (or instead of) authenticating part(ies) to an asset transfer, the smart contract 2523 may also be configured to authenticate the asset that is being transferred.

For example, the logic may receive as input an identifier of an asset. The identifier may be typed into the recipient device 2534 after the asset has changed hands from the user of the supplier device 2532 to the user of the recipient device 2534. Next, the logic may compare the received input to a copy of the identifier that is recorded in the records 2522 as belonging to the asset. If the identifier provided by the user matches the identifier that is stored in the records 2522, the logic may confirm that the asset has been properly authenticated, and determine that the user of the recipient device 2534 is currently in physical possession of the asset. On the other hand, if the identifier provided by the user does not match the identifier for the asset that is on record in the ledger 2512, the logic may determine that the asset cannot be authenticated and thus no confidence can be built that the user of the recipient device 2534 is in physical possession of the asset.

As another example, the logic of the smart contract 2523 may receive as input a first descriptor of a crypto-anchor for an asset. The first descriptor may be provided by the recipient device 2534. The logic may compare the first descriptor to a second descriptor of a crypto-anchor, which is identified in the records 2522 as belonging to the asset. If the first descriptor matches the second descriptor, the logic may conclude that the asset has been properly authenticated and determine that the user of the recipient device 2534 is currently in physical possession of the asset. On the other hand, if the first descriptor does not match the second descriptor, the logic may conclude that the asset cannot be authenticated and thus no confidence can be established that the user of the recipient device 2534 is in physical possession of the asset. In other words, the logic of the The blockchain system 2504 may include any suitable type of cryptographically auditable system that is configured to provide secure access control for authentication records that are stored therein. For ease of explanation, the blockchain system 2504 is depicted as a monolithic entity. However, according to the present example, the blockchain system 2504 is implemented as a peer-to-peer network including a plurality of computing devices that are configured to operate as nodes of the blockchain system 2504. The blockchain system 2504 may include a ledger 2514, as shown. The ledger 2514 may include a list of transaction records 2524 which are linked using a cryptographic technique. The ledger 2514 may be distributed between the nodes of the blockchain system 2504, such that each of the nodes stores a respective copy of the ledger 2514 in its memory. The transaction records 2524 may be stored on the ledger 2514 by using a consensus algorithm that is configured to ensure correct replication of the transaction records 2524 across the nodes in the blockchain system 2504, such that once data is stored in a given block of the ledger, that data cannot be altered retroactively without a consensus of a network majority.

The ledger 2514 may be configured to store one or more transaction records 2524 and a smart contract 2525 for updating the transaction records 2524. The one or more transaction records 2524 may include one or more data structures that are configured to store a description of a full custodial chain of an asset (e.g., a physical asset or a digital asset). FIG. 25D shows an example of a custodial chain description 2570 for an asset 'A' that can be part of the transaction records 2524. The description 2570 includes entries 2582-2812. Each entry 2502-2512 is associated with a different transaction involving asset 'A. Under the nomenclature of the present disclosure, a transaction record may include one or more entries, such as the entries 2502-2512, and/or any indication of a transfer of an asset.

Entry 2572 indicates that asset 'A' has been transferred from the manufacturer to 'user 1'. In addition, entry 2572 includes an authentication record #1. Authentication record #1 may include a record certifying that the identity of user 1 and/or asset 'A' has been authenticated. For example, the identity of user 1 and/or the asset 'A' may be authenticated by using the blockchain system 2502 (shown in FIG. 25A) or an authentication database 2602 (shown in FIG. 26). Additionally or alternatively, authentication record #1 may include a record that user 1 has assumed physical possession of asset 'A'. For example, the authentication record #1 may indicate that a crypto-anchor descriptor for asset 'A' (or another asset authentication information item) provided by user 1 has been authenticated. For example, the crypto-anchor descriptor and/or another asset authentication information item may be authenticated by using the blockchain system 2502 (shown in FIG. 25A) or an authentication database 2602 (shown in FIG. 26).

Entry 2574 indicates that asset 'A' has been transferred from user 1 to user 2. In addition, entry 2574 includes an authentication record #2. Authentication record #2 may include a record certifying that the identity of user 1 and/or user 2 has been authenticated. For example, the identity of user 2 and/or user 1 can be authenticated by using the blockchain system 2502 (shown in FIG. 25A) or an authentication database 2602 (shown in FIG. 26). Additionally or alternatively, authentication record #2 may include a record that user 2 has assumed physical possession of asset 'A'. For example, the authentication record #2 may indicate that a crypto-anchor descriptor for asset 'A' (or another asset authentication information item) provided by user 2 has been authenticated. For example, the crypto-anchor descriptor and/or another asset authentication information item may be authenticated by using the blockchain system 2502 (shown in FIG. 25A) or an authentication database 2602 (shown in FIG. 26).

Entry 2576 indicates that asset 'A' has been transferred from user 2 to user 3. In addition, entry 2576 includes an authentication record #3. Authentication record #3 may include a record certifying that the identity of user 2 and/or user 3 has been authenticated. For example, the identity of user 3 and/or user 2 can be authenticated by using the blockchain system 2502 (shown in FIG. 25A) or an authentication database 2602 (shown in FIG. 26). Additionally or alternatively, authentication record #3 may include a record that user 3 has assumed physical possession of asset 'A'. For example, the authentication record #3 may indicate that a crypto-anchor descriptor for asset 'A' (or another asset authentication information item) provided by user 3 has been authenticated. For example, the crypto-anchor descriptor and/or another asset authentication information item may be authenticated by using the blockchain system 2502 (shown in FIG. 25A) or an authentication database 2602 (shown in FIG. 26).

Entry 2578 indicates that asset 'A' has been transferred from user 3 to user 4. In addition, entry 2578 includes an authentication record #4. Authentication record #4 may include a record certifying that the identity of user 3 and/or user 4 has been authenticated. For example, the identity of user 4 and/or user 3 can be authenticated by using the blockchain system 2502 (shown in FIG. 25A) or an authentication database 2602 (shown in FIG. 26). Additionally or alternatively, authentication record #4 may include a record that user 4 has assumed physical possession of asset 'A'. For example, the authentication record #4 may indicate that a crypto-anchor descriptor for asset 'A' (or another asset authentication information item) provided by user 4 has been authenticated. For example, the crypto-anchor descriptor and/or another asset authentication information item may be authenticated by using the blockchain system 2502 (shown in FIG. 25A) or an authentication database 2602 (shown in FIG. 26).

Entry 2580 indicates that asset 'A' has been transferred from user 4 to user 5. In addition, entry 2580 includes an authentication record #5. Authentication record #5 may include a record certifying that the identity of user 4 and/or user 5 has been authenticated. For example, the identity of user 5 and/or user 4 can be authenticated by using the blockchain system 2502 (shown in FIG. 25A) or an authentication database 2602 (shown in FIG. 26). Additionally or alternatively, authentication record #5 may include a record that user 5 has assumed physical possession of asset 'A'. For example, the authentication record #5 may indicate that a crypto-anchor descriptor for asset 'A' (or another asset authentication information item) provided by user 5 has been authenticated. For example, the crypto-anchor descriptor and/or another asset authentication information item may be authenticated by using the blockchain system 2502 (shown in FIG. 25A) or an authentication database 2602 (shown in FIG. 26).

Entry 2582 indicates that asset 'A' has been transferred from user 5 to user 6. In addition, entry 2582 includes an authentication record #6. Authentication record #6 may include a record certifying that the identity of user 5 and/or user 6 has been authenticated. For example, the identity of user 6 and/or user 5 can be authenticated by using the blockchain system 2502 (shown in FIG. 25A) or an authentication database 2602 (shown in FIG. 26). Additionally or alternatively, authentication record #5 may include a record that user 6 has assumed physical possession of asset 'A'. For example, the authentication record #5 may indicate that a crypto-anchor descriptor for asset 'A' (or another asset authentication information item) provided by user 6 has been authenticated. For example, the crypto-anchor descriptor and/or another asset authentication information item may be authenticated by using the blockchain system 2502 (shown in FIG. 25A) or an authentication database 2602 (shown in FIG. 26).

Returning to FIG. 25A, the smart contract 2525 may include logic for adding entries to the ledger 2514, such as the entries 2572-2582 (i.e., entries identifying different transfers of an asset). The logic may receive as input: (i) an indication of a transaction of an asset between two entities, and (ii) an authentication record that is associated with the transaction. Afterwards, the logic may generate an entry identifying the transaction and associate the entry with the received authentication record. As illustrated in the example of FIG. 25D, the authentication record may be made part of the generated entry. However, it will be understood that the present disclosure is not limited to any specific method for associating an authentication record with a generated entry. In some implementations, the authentication record may be associated with a generated entry (e.g., a transaction record of an asset transfer) by using a mapping table that maps the authentication record to the entry. Additionally or alternatively, in some implementations, the authentication record may be associated with a generated entry (e.g., a transaction record of an asset transfer) by inserting, into the entry, a pointer to the authentication record.

When a physical asset is being transacted, storing authentication records in association with the transfer records enables the custodial chain of an asset to be audited to ensure that physical ownership of the asset has changed—i.e., to ensure that entities which are recorded as having possession of the asset indeed have it. This is especially useful in commercial contexts in which assets have to be monitored carefully, such as distribution systems for prescription medications.

It will be understood that the authentication records stored in the blockchain system 2504 may supplement any authentication mechanisms that are provided by the blockchain system 2504. In general, a transaction may be recorded in the blockchain system 2504 by a participant in the transaction, and/or a third-party entity, such as transaction recorder 2536. In such implementations, the blockchain system 2504 may not be in a position to ascertain independently the identities of one or more parties to the transaction and/or physical possession of the asset by the receiving party. In such implementations, storing the authentication record in the blockchain system 2504 may supplement any authentication mechanisms that are built into the blockchain system 2504 and help built further trust in the custodial chain records (e.g., the transaction records 2524) that are maintained by the blockchain system 2504.

The supplier device 2532 may include any suitable type of electronic device, such as a smartphone, a desktop computer, a barcode scanner, a laptop, or a tablet. In some implementations, the supplier device 2532 may be the same or similar to the computing device 3500, which is discussed further below with respect to FIG. 35. It will be understood that the present disclosure is not limited to any specific implementation of the supplier device 2532.

The recipient device 2534 may include any suitable type of electronic device, such as a smartphone, a desktop computer, a barcode scanner, a laptop, or a tablet. In some implementations, the supplier device 2532 may be the same or similar to the computing device 3500, which is discussed further below with respect to FIG. 35. It will be understood that the present disclosure is not limited to any specific implementation of the recipient device 2534.

The transaction recorder 2536 may include any suitable type of electronic device, such as a smartphone, a desktop computer, a barcode scanner, a laptop, or a tablet. In some implementations, the transaction recorder 2536 may be the same or similar to the computing device 3500, which is discussed further below with respect to FIG. 35. It will be understood that the present disclosure is not limited to any specific implementation of the transaction recorder 2536.

The communications network 2540 may include one or more of a local area network (LAN), a wide area network (WAN), the Internet, an 802.11 wireless network, a 5G wireless network, and/or any other suitable type of communications network.

FIG. 26 is a diagram of the system 2500, in accordance with another implementation. In the implementation of system 2500, which is shown in FIG. 26, the blockchain system 2502 (shown in FIG. 25A) is replaced with an authentication database 2602. The authentication database 2602 may include a relational database, a non-relational database, and/or another suitable type of database. The authentication database 2602 may be configured to store that user/asset authentication records and respond to queries requesting the authentication of a user and/or an asset authentication information item. Unlike the blockchain system 2502, the authentication database 2602 may not use a cryptographically auditable ledger to store the user/asset authentication records 2522.

Figure 27:
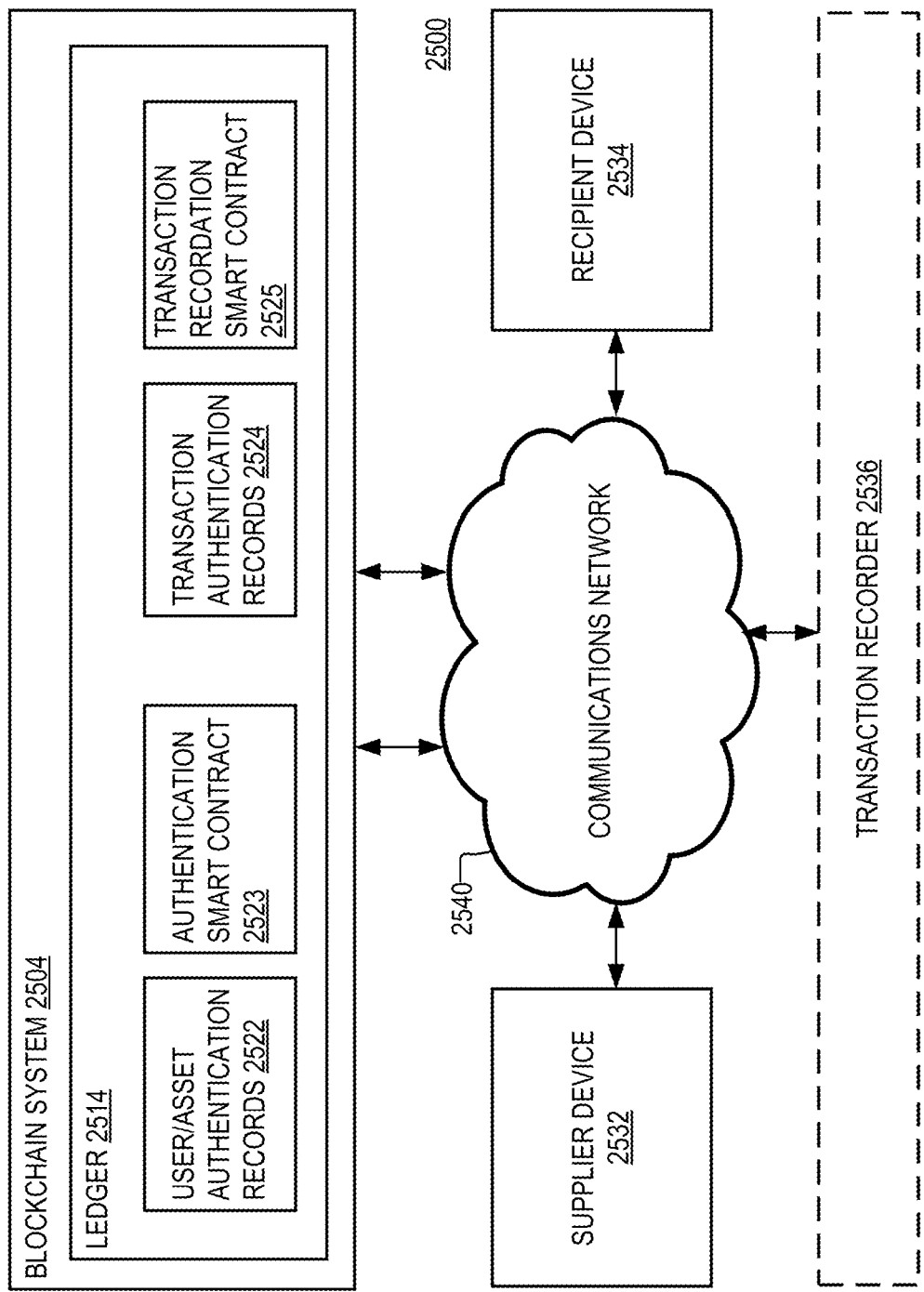
FIG. 27 is a diagram of an example of a system, according to aspects of the disclosure.

FIG. 27 is a diagram of the system 2500, in accordance with another implementation. In the implementation of system 2500, which is shown in FIG. 27, the blockchain system 2502 is omitted and the user/asset authentication records 2522 and the authentication smart contract 2523 are stored in the ledger 2514. In the example of FIG. 27, the smart contract 2523 is executed by the blockchain system 2502—i.e., the same blockchain system that is used to maintain a record of the chain of custody of an asset. In other words, FIG. 27 illustrates that although in the example of FIGS. 25A-26 authentication records are generated by using authentication mechanisms which are external to the blockchain system that is used to record the chain of custody of an asset, alternative implementations are possible in which the same blockchain system is used to: (i) provide the authentication mechanism used for generating authentication records and (ii) record transactions of an asset.

Figure 28:
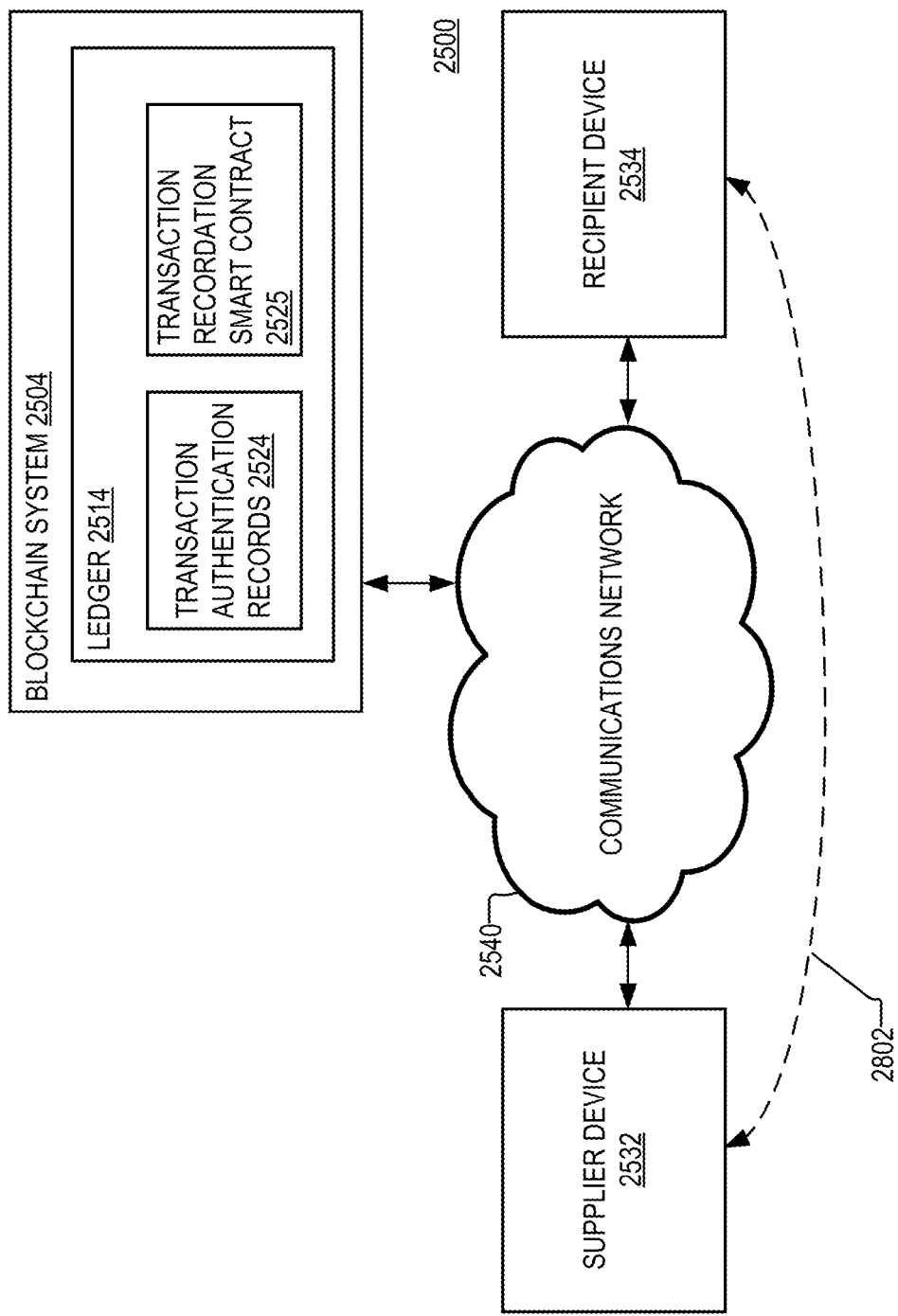
FIG. 28 is a diagram of an example of a computing device, according to aspects of the disclosure.

FIG. 28 is a diagram of the system 2500, in accordance with another implementation. In the implementation of system 2500, which is shown in FIG. 28, the blockchain system 2502 is omitted. The authentication record for any asset transfer between a user of the supplier device 2532 and the user of the recipient device 2534 is generated by the supplier device 2532, and it may include an indication that authentication device 2532 has been successfully paired to the recipient device 2534 via a connection 2802. The connection 2802, according to the present example, is a Bluetooth connection and the pairing is established via Bluetooth. However, alternative implementations are possible, in which RFID (or another short-range protocol) is used. Furthermore, alternative implementations are possible in which the supplier device 2532 and the recipient device 2534 are paired over the communications network 2540. In some implementations, the supplier device 2532 may be configured, such that, it would not transmit a request to record the asset transfer unless the supplier device 2532 and the recipient device 2534 have been successfully paired. Additionally or alternatively, in some implementations, the blockchain system 2504 may be configured such that it would not execute a request to record an asset transfer (from the supplier device 2532), unless the request is accompanied by a transaction record indicating that the supplier device 2532 and recipient device 2534 have been successfully paired (within a predetermined time period before the transmission of the request). In some implementations, using a short-range communications channel to pair the supplier device 2532 and the recipient device 2534 (such as Bluetooth or RFID) is advantageous because it can help establish that the supplier device 2532 and the recipient device 2534 have been situated at the same location when the asset transfer was recorded, thus building further confidence that the asset transfer indeed took place and is not fictitious.

Figure 29:
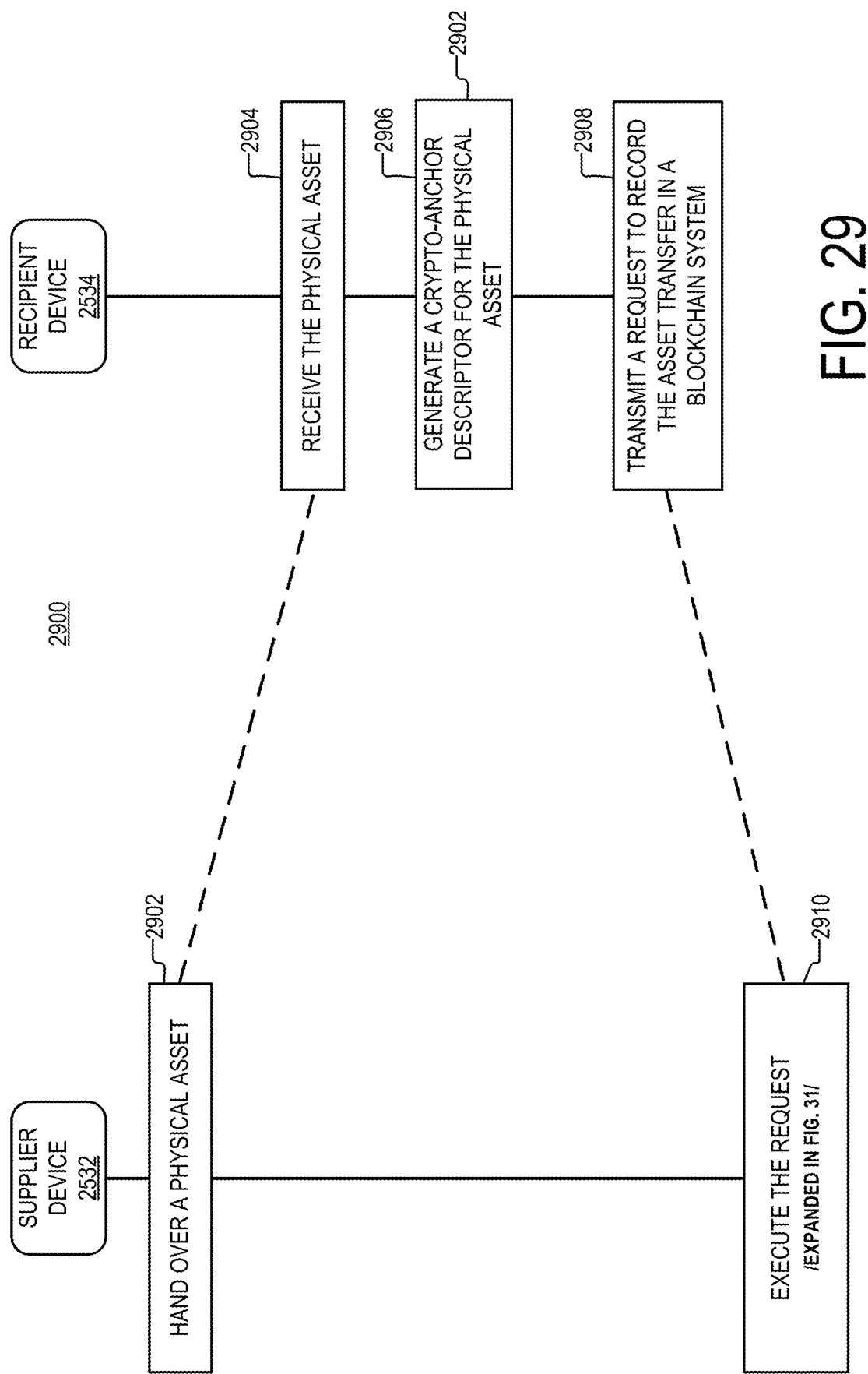
FIG. 29 is a sequence diagram of an example of a process, according to aspects of the disclosure.

FIG. 29 is a sequence diagram of an example of a process 2900, according to aspects of the disclosure. At step 2902, a physical asset is handed over by a user of the supplier device 2532 to a user of the recipient device 2534. Handing over the asset may include shipping the asset to the user of the supplier device 2532 and/or taking any other action that may cause the user of the supplier device 2532 to take physical possession of the asset. At step 2904, the asset is received by the user of the recipient device 2534. At step 2906, the recipient device 2534 generates a crypto-anchor descriptor for the physical asset. At step 2908, the recipient device 2534 transmits to the supplier device 2532, a request to record the asset transfer. The request may include the crypto-anchor descriptor (generated at step 2906) or otherwise be associated with the crypto-anchor descriptor. At step 2910, the supplier device 2532 executes the request. In some implementations, the request may be executed in accordance with one of processes 3100, 3200, and 3330, which are discussed further below with respect to FIGS. 31, 32, and 33, respectively. Although in the example of FIG. 29 the recipient device 2534 transmits a request to the supplier device 2532 to record the asset transfer, alternative implementations are possible in which the recipient device 2534 itself records the asset transfer.

Figure 30:
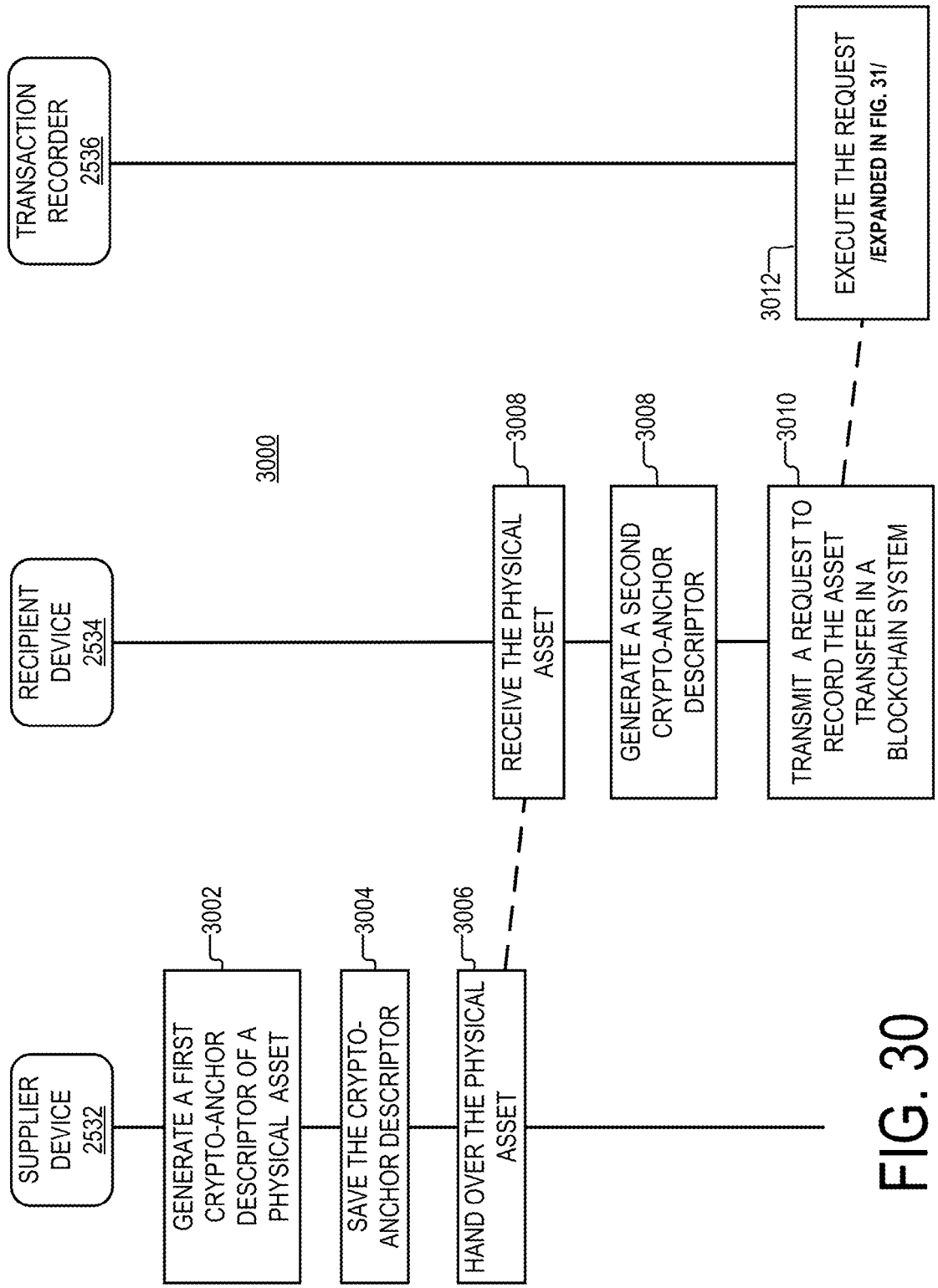
FIG. 30 is a sequence diagram of an example of a process, according to aspects of the disclosure.

FIG. 30 is a sequence diagram of an example of a process 3000, according to aspects of the disclosure. At step 3002, the supplier device 2532 generates a first crypto-anchor descriptor for a physical asset. At step 3004, the supplier device 2532 saves the first crypto-anchor descriptor. The generated asset authentication record may be in the ledger 2512 of the blockchain system 2502, the database 2602, and/or any other location. At step 3006, the physical asset is handed over by a user of the supplier device 2532 to a user of the recipient device 2534. At step 3008, the asset is received by the user of the recipient device 2534. At step 3008, the recipient device 2534 generates a second crypto-anchor descriptor for the asset. At step 3010, the recipient device 2534 transmits to the transaction recorder 2536, a request to record the asset transfer. The request may include one or more of: (i) an identifier of the asset, the second crypto-anchor descriptor, or a pointer to the crypto-anchor descriptor. At step 3012, the transaction recorder 2536 executes the request. In some implementations, the request is executed by comparing the first crypto-anchor descriptor to the second crypto-anchor descriptor. Additionally or alternatively, in some implementations, the request is executed by authenticating one or both of the first crypto-anchor descriptor to the second crypto-anchor descriptor. In some implementations, the request may be executed in accordance with one of processes 3100, 3200, and 3330, which are discussed further below with respect to FIGS. 31, 32, and 33, respectively. Although in the example of FIG. 30 the recipient device 2534 transmits a request to the transaction recorder 2536 to record the asset transfer, alternative implementations are possible in which the recipient device 2534 itself records the asset transfer.

Figure 31:
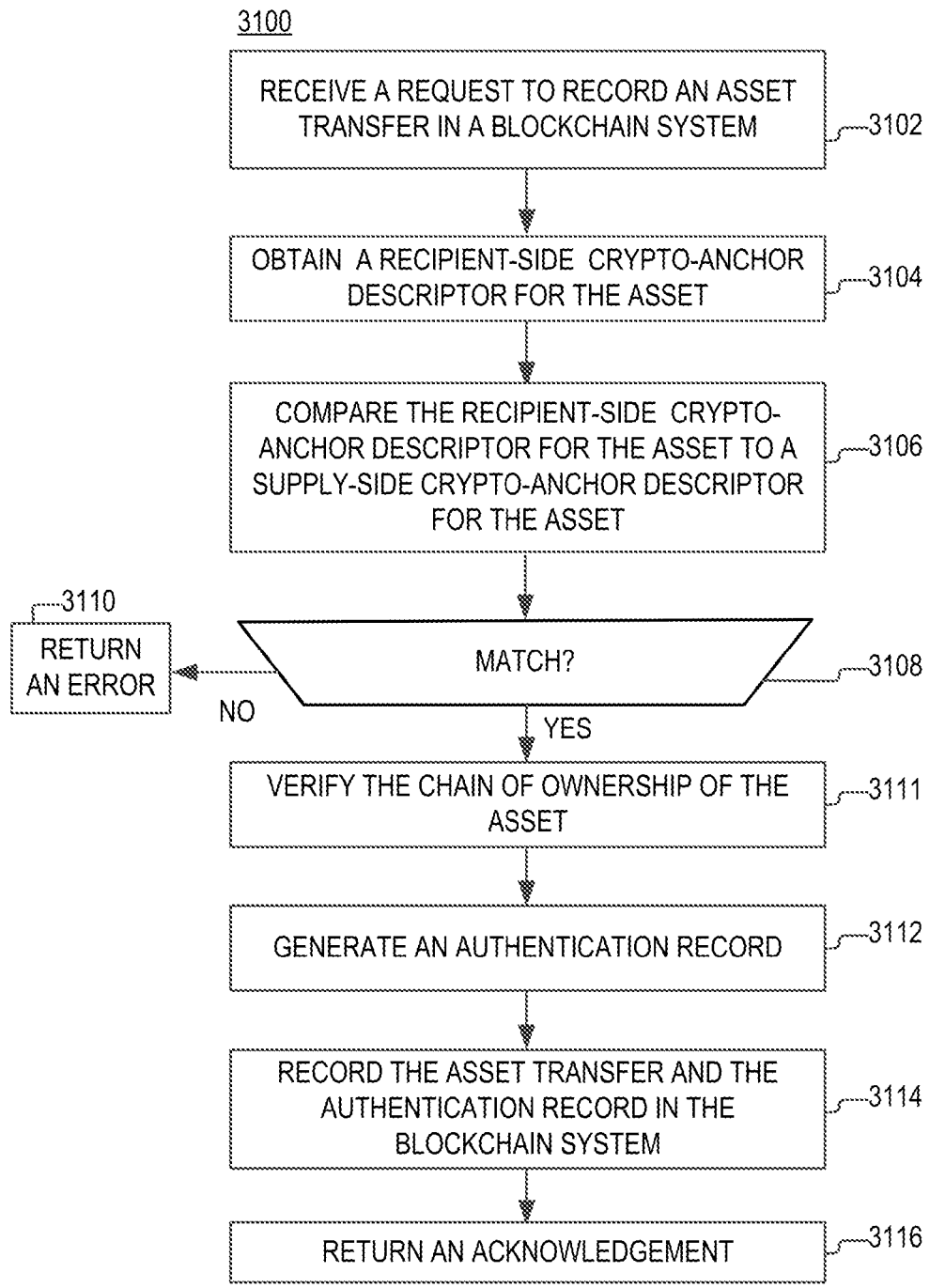
FIG. 31 is a flowchart of an example of a process, according to aspects of the disclosure.

In the example of FIGS. 29-30 a crypto-anchor for the asset is generated and stored by the supplier of the asset every time the asset is transferred, and this crypto-anchor may be compared to another crypto-anchor for the asset that is generated by the receiver (see FIG. 31). However, alternative implementations are possible in which the crypto-anchor for any asset is not generated every time by the supplier of the asset. In such implementations, a crypto-anchor for an asset may be stored once in the ledger 2512 of the blockchain system 2502 (or elsewhere), after which a recipient-side crypto-anchor is validated against the manufacturer-generated crypto-anchor every time the asset is transferred. In the example of FIGS. 29-30, the asset transfer is recorded (in the blockchain system 2504) by the supplier of the asset or the transaction recorder 2536. However, alternative implementations are possible in which the asset transfer is recorded by the recipient of the asset (e.g., by the recipient device 2534).

FIG. 31 is a flowchart of an example of a process 3100, according to aspects of the disclosure. According to the example of FIG. 31, the process 3100 is executed by the supplier device 2532. However, alternative implementations are possible in which the process 3100 is executed by the transaction recorder 2536 or the recipient device 2534.

At step 3102, the supplier device 2532 receives a request to record an asset transfer in the blockchain system 2504. The request is received from the recipient device 2534. The request may be the same or similar to the request transmitted at steps 2908 and 3010 (shown in FIGS. 29-30). The request may be to record a transfer of an asset from a user of the supplier device 2532 to a user of the recipient device 2534.

At step 3104, the supplier device 2532 obtains a recipient-side crypto-anchor descriptor for the asset. The recipient-side crypto-anchor descriptor includes a crypto-anchor descriptor that is generated by the recipient device 2534. The recipient-side crypto-anchor descriptor may be contained in the request (received at step 3102) or received separately from the request (e.g., from the recipient device 2534 or another entity).

At step 3106, the supplier device 2532 compares the recipient-side crypto-anchor descriptor to a supply-side crypto-anchor descriptor. The supply-side crypto-anchor descriptor may include a descriptor that is generated by the supplier device 2532. At step 3108, the supplier device 2532 determines the outcome of the comparison. If the supply-side descriptor matches the recipient-side descriptor, the recipient-side descriptor is considered authentic. Otherwise, if the supply-side descriptor does not match the recipient-side descriptor, the recipient-side descriptor is not considered authentic. If the supply-side descriptor matches the recipient-side descriptor, the process 3100 proceeds to step 3111. Otherwise, if the supply-side descriptor does not match the recipient-side descriptor, the process 3100 proceeds to step 3110. At step 3110, the supplier device 2532 returns an error in response to the request received at step 3102.

At step 3111, the supplier device 2532 verifies the chain of ownership of the asset that is being transferred. Verifying the chain of ownership may include querying the blockchain system 2504 to determine whether a respective record is stored in the blockchain system 2504 for each transfer of the asset during the entire life of the asset (or during a portion of the life of the asset). As a result of executing step 3111, the supplier device 2532 may determine whether there are any breaks in the chain of ownership of the asset. Furthermore, in some implementations, when multiple systems are used to record transfers of the asset, verifying the chain of ownership of the asset may include querying those systems to determine whether the chain of ownership is interrupted. For instance, the first transfer of the asset (i.e., a transfer from the manufacturer to an original purchaser) may be recorded in another system (i.e. a database or blockchain system that is managed by the manufacturer, rather than the blockchain system 2504), and all subsequent transfers of the asset may be recorded in the blockchain system 2504. In such instances, the supplier device 2532 may query the other system, as well as the blockchain system 2504, to determine whether the chain of ownership of the asset is interrupted.

At step 3112, the supplier device 2532 generates an authentication record indicating at least one of: (i) that the recipient-side descriptor for the asset is authentic and/or (ii)

whether the chain of ownership of the asset could be verified. For example, the authentication record may include a first indication (e.g., a number, string, or alphanumerical string), which indicates whether the recipient side descriptor for the asset is authentic. As another example, the authentication record may include a second indication (e.g., a number, string, or alphanumerical string) of whether the supplier device 2532 the chain of ownership of the asset is interrupted. Depending on the implementation, the authentication record may include only one of the first and second indications or both of them.

At step 3114, the supplier device 2432 records the transfer of the asset in the blockchain system 2504. Recording the transfer of the asset may include generating an entry 2582 for the asset transfer (e.g., see FIG. 25) and storing the generated entry, along with the authentication record generated at step 3112, in the ledger 2514 of the blockchain system 2504. The generated entry 2582 may indicate that the asset has been transferred from the user of the supplier device 2432 to the user of the recipient device 2534, and the user of the recipient device 2534 is now in possession of the asset. At step 3116, the supplier device 2432 returns an acknowledgment indicating that the request (received at step 3102) has been executed.

The authentication record generated at step 3112 may include any information about how the recipient-side descriptor has been authenticated. For example, the authentication record may include one or more of: (i) an identifier of the asset that was being transferred, (ii) an identifier of a transaction by which the asset of was authenticated, (iii) a timestamp indicating the time when the transaction was authenticated, and (iv) an identifier of the authority used to perform the authentication).

According to the example of FIG. 31, at step 3106, the recipient-side crypto-anchor descriptor is compared to a supply-side crypto-anchor descriptor, which is generated by the supplier device 2532. However, alternative implementations are possible in which the recipient-side crypto-anchor descriptor is compared to another crypto-anchor descriptor, such as a crypto-anchor descriptor for the asset that is generated by the manufacturer of the asset.

In some implementations, the comparison of the recipient-side crypto-anchor descriptor to a supply-side crypto-anchor descriptor (or a manufacturer crypto-anchor descriptor) may be performed by the supplier device 2532. For example, when a manufacturer crypto-anchor descriptor is used to perform the comparison, the supplier device 2532 may retrieve the manufacturer crypto-anchor descriptor from a remote database. In instances, in which a supply-side crypto-anchor descriptor is being compared to a recipient-side crypto-anchor descriptor, the supply-side crypto-anchor descriptor may be generated by the supplier device 2532 and readily available for the comparison.

In some implementations, the comparison between the recipient-side crypto-anchor descriptor and a supply-side (or manufacturer) crypto-anchor descriptor may be performed by the blockchain system 2502. For example, the supplier device 2532 may transmit, to one or more nodes of the blockchain system 2502, a request, which when executed by the blockchain system 2502, causes the blockchain system 2502 to compare the recipient-side descriptor to a crypto-anchor descriptor for the asset that is stored in the ledger 2512, and return a response indicating whether the recipient-side descriptor matches the crypto-anchor descriptor which is on record in the ledger 2512 as belonging to the asset. In some implementations, the blockchain system 2502 may perform the comparison by executing the smart contract 2523. In some implementations, steps 3112-3116 may be executed only when the recipient-side crypto-anchor descriptor matches the crypto-anchor descriptor for the asset that is recorded in the blockchain system 2502.

FIG. 31 is provided as an example only. At least some of the steps depicted in FIG. 31 can be performed in a different order, in parallel, or altogether omitted. For example, in some implementations, step 3102 may be omitted. In this regard, although steps 3104-3116 are executed in response to the receipt of a request to record an asset transfer, it will be understood that alternative implementations are possible in which steps 3104-3116 are executed in response to another event or API call. Additionally or alternatively, in some implementations, step 3111 may be omitted, in such implementations the authentication record (generated at step 3112) may only indicate whether the supplier-side descriptor and the recipient-side descriptor match. Additionally or alternatively, in some implementations, steps 3106-3110 may be omitted, in such implementations the authentication record (generated at step 3112) may only indicate whether the chain of ownership for the asset is valid.

Figure 32:
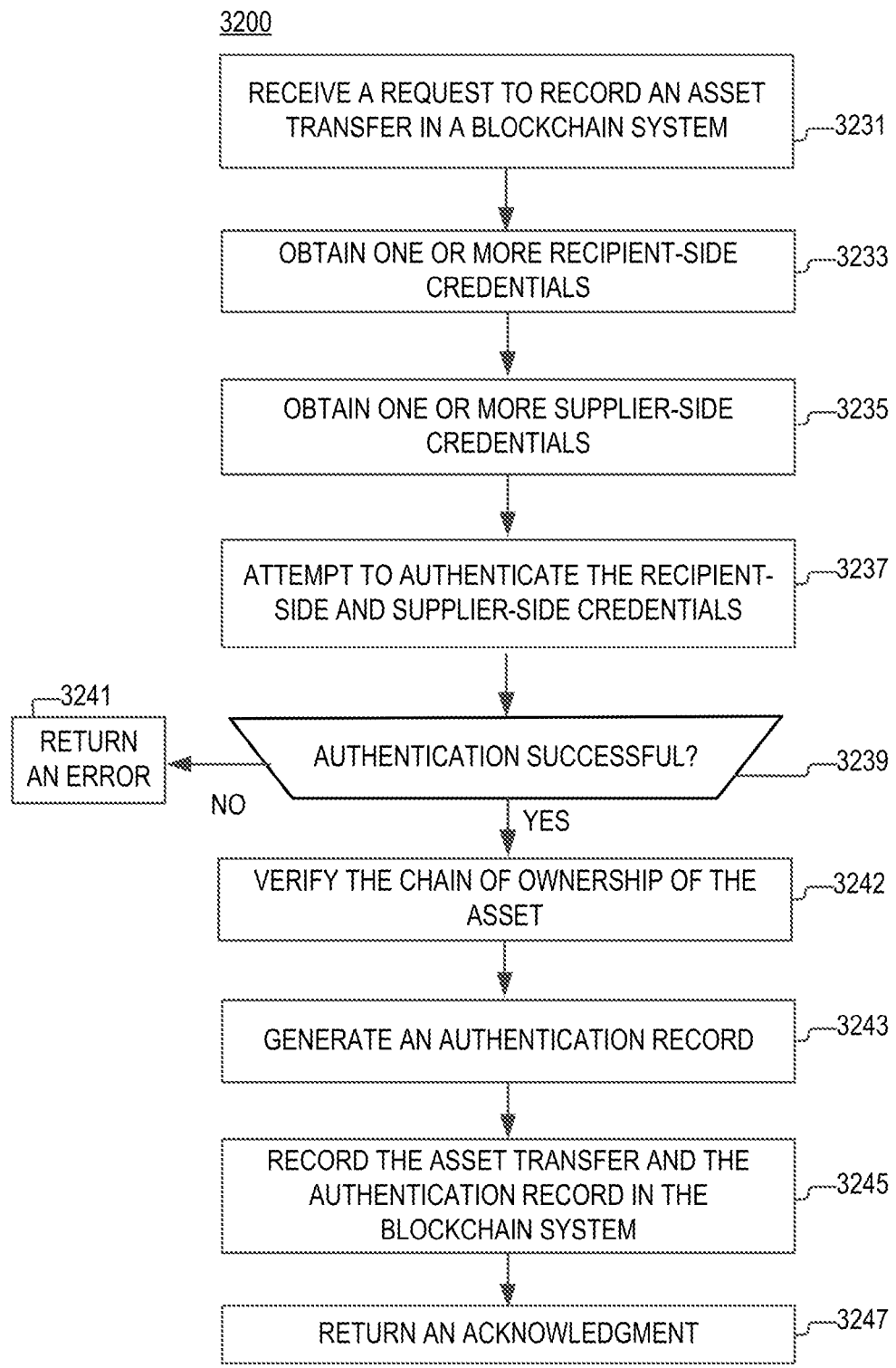
FIG. 32 is a flowchart of an example of a process, according to aspects of the disclosure.

FIG. 32 is a diagram of an example of a process 3200 for recording an asset transfer in the blockchain system 2504, according to aspects of the disclosure. The process 3200 may be performed by the supplier device 2532, the recipient device 2324, the transaction recorder 2536, and/or any other computing device.

At step 3231, the supplier device 2532 receives a request to record an asset transfer in the blockchain system 2504. The request is received from the recipient device 2534. The asset transfer request may be the same or similar to the request transmitted at steps 2908 and 3010 (shown in FIGS. 29-30). The request may be to record a transfer of an asset from a user of the supplier device 2532 to a user of the recipient device 2534.

At step 3233, one or more recipient-side credentials are obtained. The recipient side credentials may include a user authentication information item that is submitted for the purposes of confirming that the request is indeed coming from an authorized user of the recipient device 2534. Additionally or alternatively, the one or more recipient-side credentials may include an asset authentication information item that is submitted for the purposes of confirming that the user of the recipient device 2534 is indeed in possession of the asset that is being transferred.

At step 3235, one or more supplier-side credentials are obtained. The supplier-side credentials may include a user authentication information item that is submitted for the purposes of validating the identity of the user of the supplier device 2532. Additionally or alternatively, the one or more supplier-side credentials may include an asset authentication information item that is submitted for the purposes of confirming that the user of the supplier device 2532 is (or was) indeed in possession of the asset that is being transferred.

At step 3237, an attempt is made to authenticate the supplier-side and/or user-side credential. At step 3239, a determination is made if the authentication of the supplier-side and/or user-side credentials is successful. If the authentication is successful, the process 3200 proceeds to step 3242. Otherwise, the process 3200 proceeds to step 3241. At step 3241, an error is returned.

At step 3242, the chain of ownership of the asset is verified. Step 3242 may be executed in the same or similar manner to step 3111, which is discussed above with respect to FIG. 31. As noted above, verifying the chain of ownership may include querying the blockchain system 2504 and/or another system (by the device executing the process 3200) to determine whether all transfers of the asset (during the entire life of the asset or portion thereof) have been recorded.

At step 3243, the supplier device 2532 generates an authentication record indicating at least one of: (i) whether the recipient-side credentials and/or supply-side credentials have been authenticated, (ii) whether a supply-side descriptor for the asset matches a recipient-side descriptor for the asset, (iii) whether a recipient-side descriptor for the asset matches a descriptor for the asset that is recorded in the database 2602 and/or the ledger 2514 of the blockchain system 2504, (iv) whether credentials (e.g., user name or password) of the user of the supplier device 2532 have been authenticated successfully, (v) whether credentials (e.g., user name or password) of the recorded current owner of the asset (e.g., the user of the supplier device 2532) have been authenticated successfully, (vi) whether credentials (e.g., user name or password) of the user of recipient device 2534 (or the transaction recorder 2536) have been authenticated successfully, (vii) whether credentials (e.g., user name or password) of the recipient of the asset (e.g., the user of the recipient device 2536) have been authenticated successfully, and/or (viii) whether an uninterrupted chain of ownership of the asset could be validated (e.g., by the device executing the process 3200 and/or the blockchain system 2504).

At step 3245, the transfer of the asset is recorded in the blockchain system 2504. Recording the transfer of the asset may include generating an entry 2582 for the asset transfer (e.g., see FIG. 25) and storing the generated entry, along with the authentication record generated at step 3243, in the ledger 2514 of the blockchain system 2504. The generated entry 2582 may indicate that the asset has been transferred from the user of the supplier device 2432 to the user of the recipient device 2534, and the user of the recipient device 2534 is now in possession of the asset. At step 3247, an acknowledgment is returned indicating that the request (received at step 3102) has been executed.

In the example of FIG. 32 both supplier-side and recipient-side credentials are authenticated. However, in some implementations, only one or more supplier-side credentials or one or more recipient-side credentials may be authenticated. The authentication may be performed by the device executing the process 3200, the blockchain system 2502, the blockchain system 2504, and/or any other authority. The authentication record generated at step 3241 may include any information about how the recipient-side descriptor has been authenticated. For example, the authentication record may include one or more of: (i) an identifier of the asset that was being transferred, (ii) an identifier of transaction by which the asset of was authenticated, (iii) a timestamp indicating the time when the transaction was authenticated, and (iv) an identifier of the authority used to perform the authentication).

FIG. 32 is provided as an example only. At least some of the steps depicted in FIG. 31 can be performed in a different order, in parallel, or altogether omitted. For example, in some implementations, step 3201 may be omitted. In this regard, although steps 3231-3247 are executed in response to the receipt of a request to record an asset transfer, it will be understood that alternative implementations are possible in which steps 3231-3247 are executed in response to another event or API call. Furthermore, as noted above, in some implementations, only one of the user-side or supplier-side credentials may be authenticated. In such implementations, one of steps 3233 and 3235 may be omitted. In some implementations, step 3242 may be omitted. Additionally or alternatively, in some implementations, steps 3233-3239 may be omitted. In such implementations, the authentication record may include only an indication of whether an uninterrupted chain of ownership of the asset can be confirmed. In the example of FIG. 32, the asset transfer is recorded irrespective of whether an uninterrupted chain of ownership of the asset can be confirmed. However, alternative implementations are possible in which the asset transfer is recorded if and only if an uninterrupted chain of ownership of the asset is verified (i.e., if a record for every transfer of the asset (during the entire life of the asset or a specific continuous period in the life of the asset) can be found.

Figures 33, 34:
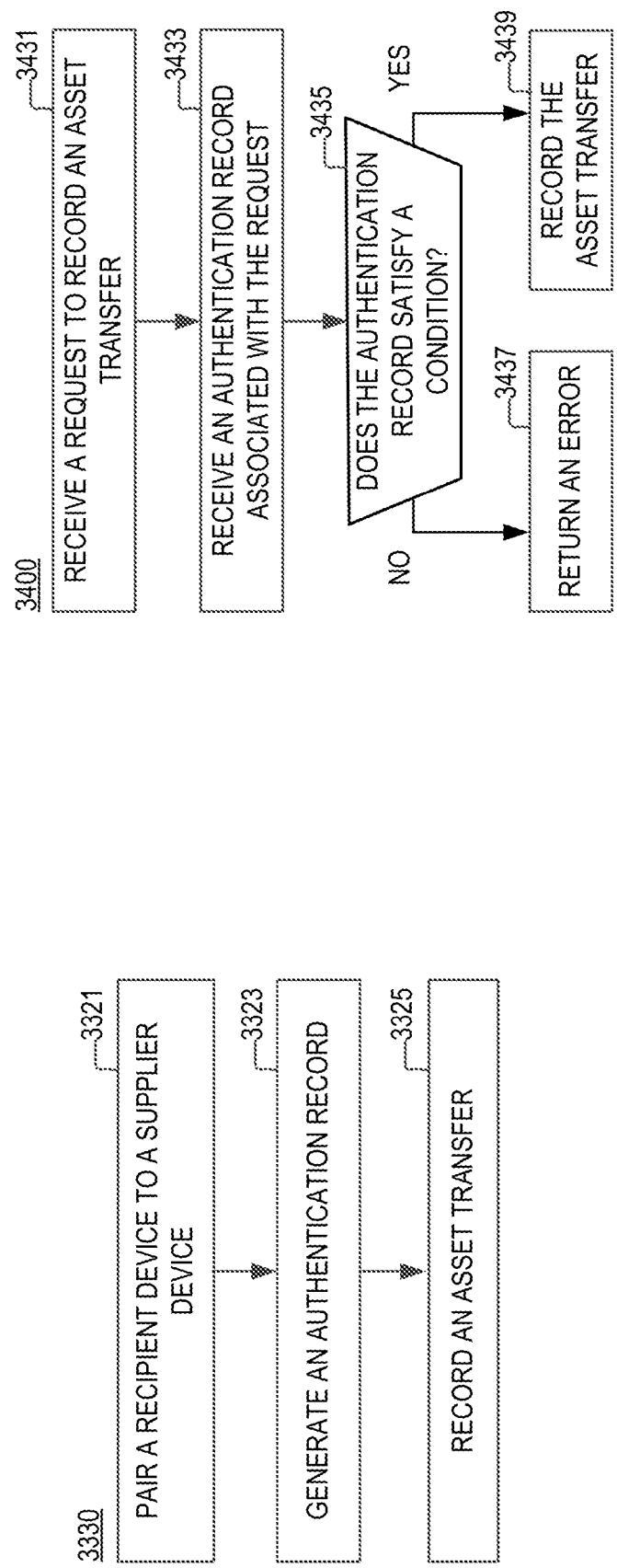
FIG. 33 is a flowchart of an example of a process, according to aspects of the disclosure.
FIG. 34 is a flowchart of an example of a process, according to aspects of the disclosure.

FIG. 33 is a diagram of an example of a process 3330 for recording an asset transfer in the blockchain system 2504, according to aspects of the disclosure. However, alternative implementations are possible in which the process 3330 is executed in by the recipient device 2534. At step 3321, the recipient device 2534 and the supplier device 2532 are paired. The pairing may be performed by using Bluetooth, RFID, and/or any other suitable type of communications protocol. At step 3323, an authentication record is generated indicating the recipient device 2534 and the supplier device 2532 are paired. At step 3325, the transfer of the asset is recorded in the blockchain system 2504. Recording the transfer of the asset may include generating an entry 2582 for the asset transfer (e.g., see FIG. 25) and storing the generated entry, along with the authentication record generated at step 3323, in the ledger 2514 of the blockchain system 2504. The generated entry 2582 may indicate that the asset has been transferred from the user of the supplier device 2432 to the user of the recipient device 2534—in other words, it may indicate the user of the recipient device 2534 has assumed possession of the asset.

According to the present example, the process 3330 is executed by the supplier device 2532. However, alternative implementations are possible in which the process 3330 is executed by the recipient device 2534. Pairing the supplier device 2532 to the recipient device 2534 may include executing an authentication handshake which results in the supplier device 2532 authenticating the recipient device 2534 (or vice versa). Additionally or alternatively, pairing the supplier device 2532 to the recipient device 2534 may include bringing the supplier device 2532 and the recipient device 2534 in close proximity to teach other (as would be necessary in order to use Bluetooth or RFID). The authentication record generated at step 3323 may attest that the supplier device 2532 has successfully authenticated the recipient device 2534 (or vice versa). Additionally or alternatively, the authentication record generated at step 3323 may attest that the supplier device 2532 was collocated with the recipient device 2534 when the asset transfer was recorded in the blockchain system 2504, thus offering proof that an in-person meeting (i.e., a physical meeting) between the transacting parties indeed took place when the asset transfer was performed (which could indicate that the transfer was not fictitious and was intended by the supplier of the asset). For example, the authentication record may include one or more of: (i) an identifier of the asset that was being transferred, (ii) an identifier of transaction by which resulted in the supplier device 2532 and the recipient device 2534 being paired, (iii) a timestamp indicating the time when the two devices were paired, and (iv) an identifier of the protocol used to perform the pairing (e.g., Bluetooth or RFID), and/or any other suitable information. In some implementations, steps 3323 and 3325 may be executed only when the supplier device 2532 and the recipient device 2534 have been successfully paired immediately before that (e.g., within 0.1-30 minutes before steps 3233 and 3324 are executed). In some implementations, steps 3323 and 3325 may be executed only if the supplier device 2532 and the recipient device 2534 remain paired during the execution of steps 3321-3323.

In some implementations, the device executing the process 3300 may attempt to verify the chain of ownership of the asset as part of the process 3300. The verification may be performed as discussed above with respect to FIGS. 31 and 32. In such implementations, the authentication record 3323 may also include an indication of whether an uninterrupted chain of ownership of the asset can be confirmed. Furthermore, in some implementations, the device executing the process 3300 may also authenticate supplier-side and/or recipient side credentials, as discussed above with respect to FIG. 32. Additionally or alternatively, in some implementations, the authentication record may include any of the information discussed above with respect to FIG. 32.

FIG. 34 is a flowchart of an example of a process 3400 for recording an asset transfer, according to aspects of the disclosure. At step 3431, the blockchain system 2504 receives a request to record a transfer of an asset transfer from the user of the supplier device 2532 to the user of the recipient device 2534. The request may be the same or similar to any of the requests transmitted at steps 3114, 3245, and 3325 (shown in FIGS. 31-33). At step 3433, the blockchain system 2504 receives an authentication record that is associated with the request. The authentication record may be encapsulated in the request or it may be provided separately from the request. The authentication record may be the same or similar to any of the authentication records that are generated at steps 3112, 3243, and 3323 (shown in FIGS. 31-33). At step 3435, the blockchain system detects whether the authentication request satisfies a predetermined condition. If the condition is not satisfied, the process 3400 proceeds to step 3437. Otherwise, the process 3400 proceeds to step 3439. At step 3437, the blockchain system 2504 returns an error. At step 3439, the blockchain system 2504 records the asset transfer. Recording the transfer of the asset may include generating an entry 2582 for the asset transfer (e.g., see FIG. 25) and storing the generated entry, along with the authentication record generated at step 3241, in the ledger 2514 of the blockchain system 2504. The generated entry 2582 may indicate that the asset has been transferred from the user of the supplier device 2432 to the user of the recipient device 2534, and the user of the recipient device 2534 is now in possession of the asset. Although in the example of FIG. 34, the pairing is performed by using near-range communications protocols, alternative implementations are possible in which the pairing is performed over another type of connection, such as a connection established over the Internet.

In some implementations, the process 3400 may be specified by the smart contract 2525. In some implementations, the process 3400 (or at least step 3435 and/or step 3439) may be executed by a plurality of nodes in the blockchain system 2502 by using a consensus-building mechanism. In some implementations, the authentication record may satisfy the condition only when the authentication record is generated within a predetermined period of time before the receipt of the request at step 3431. If the authentication record is generated outside of this period, the authentication record may be determined to fail the condition. Additionally or alternatively, in some implementations, the authentication record may satisfy the condition only when the authentication record indicates that the supplier device 2532 and the recipient device 2534 were paired within a predetermined period of time before the receipt of the request at step 3431. Additionally or alternatively, in some implementations, the authentication record may satisfy the condition only when the authentication record indicates that the supplier device 2532 and the recipient device 2534 were collocated within a predetermined period of time before the receipt of the request at step 3431. Additionally or alternatively, in some implementations, the authentication record may satisfy the condition only when the authentication record indicates that the asset which is the subject of the transfer has been authenticated successfully (e.g., based on crypto-anchor descriptors for the asset). Additionally or alternatively, in some implementations, the authentication record may satisfy the condition only when the authentication record indicates that at least one of the users of the supplier device 2532 or the recipient device 2534 has been authenticated successfully. Additionally or alternatively, in some implementations, the authentication record may satisfy the condition only when the authentication record indicates that an uninterrupted chain of title for the asset could be confirmed.

In the example of FIGS. 31-32, the chain of ownership of an asset is verified by the device recording the asset, and an indication is inserted of the verification in the authentication record. However, alternative implementations are possible in which the verification of the chain of ownership of the asset is performed by the blockchain system 2504 by using a consensus-building mechanism. In such implementations, the blockchain system may record the asset transfer (and/or execute step 3439) only when the blockchain system 2504 is able to confirm an uninterrupted chain of the ownership of the asset.

In some implementations, to confirm an uninterrupted chain of ownership of the asset, the blockchain system 2504 may attempt to find an authentication record for each transfer of the asset in a sequence of transfers of the asset. If a valid authentication record is found for each transfer of the asset in the sequence, the blockchain system 2504 may determine that an uninterrupted chain of ownership of the asset exists. If a valid authentication record cannot be found for each transfer of the asset in the sequence, the blockchain system 2504 may determine that the chain of ownership of the asset is broken.

In some implementations, the blockchain system 2504 may rely only on records that are stored in the ledger 2514 to determine whether an uninterrupted chain of ownership exists. However, in some implementations, the blockchain system 2504 may use records that are stored in another database or blockchain system to determine whether an uninterrupted chain of ownership exists. In some implementations, the request (received 3431) may include the address (or another type of identifier) of an external database or blockchain system that could be quarried to determine if an uninterrupted chain of ownership of the asset can be confirmed. In some implementations, the blockchain system 2504 may use a consensus-building mechanism to confirm the chain of ownership of the asset. By way of example, when an external database or blockchain system 2504 is involved in the confirmation, the consensus-building mechanism may include multiple nodes querying the external database or blockchain system and determining whether all (or a majority) of the nodes can independently confirm that an uninterrupted chain of ownership of the asset exists.

In some implementations, an uninterrupted chain of ownership of an asset may be said to exist when a valid record (e.g., an asset transfer record and/or an authentication record) can be found for each and every transfer of the asset that has taken place during the entire life of the asset, starting when the asset is released by the manufacturer and ending when the asset is received by the current recorded owner of the asset. Alternatively, in some implementations, an uninterrupted chain of ownership of an asset may be said to exist when a valid record (e.g., an asset transfer record and/or an authentication record) can be found for each and every transfer of the asset that has taken place during only a portion of the life of the asset (e.g., in the last three months, etc).

On the other hand, in some implementations, when a valid record cannot be found for each and every transfer of the asset that has taken place during the entire life of the asset (or during a predetermined portion of the life of the asset), the chain of ownership of the asset may be considered interrupted (and/or impossible to verify). For example, when the blockchain system 2504 (and possibly other systems) include(s) records for: (i) a transfer of an asset from user 'A' to user 'B', and (ii) another transfer of the asset from user 'D' to user 'E', while lacking any asset transfer records and/or authentication records for transaction(s) in which the asset is transferred away from user 'B' and/or received by user 'D', the chain of ownership of the asset may be considered interrupted (and/or impossible to verify). In other words, if no transfer records are available that explain how user 'D' became in possession of the asset, the chain of ownership of the asset may be considered interrupted (and/or impossible to verify).

In some implementations, as noted above, the blockchain system 2504 may record an asset transfer only when an uninterrupted chain of ownership of the asset has been confirmed. In such implementations, the presence of an asset transfer record system 2504 in the ledger of the blockchain system 2504 may be an implicit guarantee that an uninterrupted chain of ownership of the asset exists up to this point. Additionally or alternatively, in some implementations, the blockchain system 2504 may also update the authentication record (received at step 3435) with an indication of whether it has been able to confirm that an uninterrupted chain of ownership exists for the asset. Additionally or alternatively, in some implementations, the blockchain system 2504 may record the asset transfer irrespective of whether an uninterrupted chain of ownership of the asset could be confirmed.

As discussed above, the authentication record that is stored along each asset transfer record for an asset can be used to confirm that: (i) the asset is indeed changing hands (rather than being transferred on paper only) and (ii) an uninterrupted chain of ownership of the asset exists. The asset transfer records and/or authentication records for an asset that are stored in the ledger of the blockchain system 2504 could be used to audit the ownership of the asset during the entire lifetime of the asset (or only a portion of the lifetime). This is especially useful with respect to medications and other controlled substances, whose ownership/possession needs to be monitored closely by the government or a private entity. By way of example, and as used throughout the disclosure, the phrase "obtaining an authentication record indicating that a request to record an asset transfer has been authenticated successfully" may refer to one or more of an authentication record indicating that a crypto-anchor descriptor for the asset has been authenticated successfully, an authentication record indicating that recipient and/or supplier credentials have been authenticated successfully, and/or an authentication record indicating that the chain of ownership of the asset is not interrupted.

Figure 35:
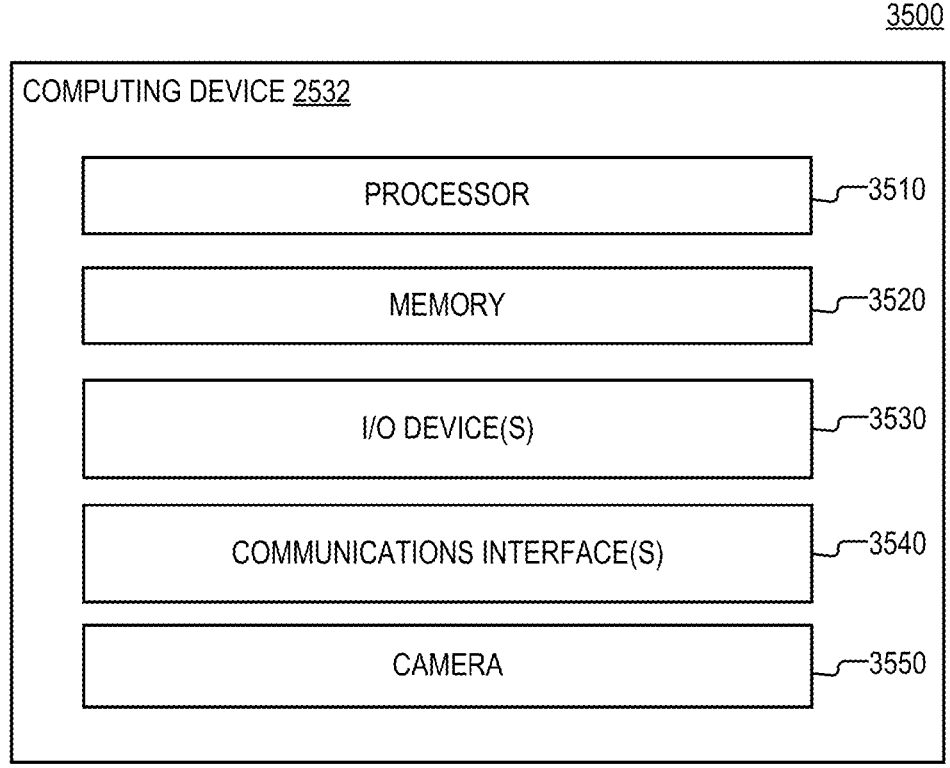
FIG. 35 is a diagram of an example of computing device.

FIG. 35 is a diagram of an example of a computing device 3500, according to aspects of the disclosure. The computing device 3500 may include a desktop computer, a laptop computer, a smartphone, and/or any other suitable type of computing device. As illustrated, the computing device may include a processor 3510, a memory 3520, I/O devices 3530, a communications interface 3540, and a camera 3550. The processor 3510 may include any suitable type of processing circuitry, such as one or more of an application-specific integrated circuit (ASIC), a field-programmable gate array (FPGA), and/or a general-purpose processor (e.g., an ARM-based processor, an x86 processor, etc.). The memory 3520 may include any suitable type of volatile and/or non-volatile memory. For example, in some implementations, the memory 3520 may include one or more of random-access memory (RAM), a read-only memory (ROM), a solid-state drive (SSD), electrically erasable programmable read-only memory (EEPROM), network-accessible storage (NAS), a redundant array of independent disks (RAID) and/or any other suitable type of memory. The I/O devices 3530 may include one or more of a touchpad, a smartcard reader, a display, a speaker, an iris scanner, a fingerprint reader, and/or any other suitable type of input device. In some implementations, the I/O devices 3530 may include two different smart card interfaces or two different smart card slots, as discussed above with respect to FIGS. 24A-B. The communications interface 3540 may include a Bluetooth interface, a Wi-Fi interface, a ZigBee interface, a Universal Serial Bus (USB) interface, and/or any other suitable type of interface. Although in the example of FIG. 35 the device 3500 is depicted as an integrated system, it will be In some implementations, the computing device 3500 may be the same or similar to the device 7012, which is discussed above with respect to FIGS. 24A-B. In such implementations, any transaction that is executed by using the device 3500 may be recorded in the blockchain system 2504 with or without an accompanying authentication record because the use of the device 3500 would imply that the transacting parties are both present at the same location, and each of the transacting parties has inserted its respective smartcard into the device 3500.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for recording an asset transfer, the asset transfer including a transfer of a physical asset from a first user of a supplier device to a second user of a recipient device, the method comprising:
   performing a check to determine whether an uninterrupted chain of ownership of the physical asset exists by determining whether a respective transfer record can be identified for each and every transfer of the physical asset that has taken place during at least a portion of a life of the physical asset;
   generating an authentication record that is associated with the asset transfer, the authentication record including an indication of whether the uninterrupted chain of ownership of the physical asset could be confirmed as a result of performing the check; and
   recording, by the supplier device, the asset transfer in a blockchain system, the asset transfer being recorded by transmitting a recordation request to the blockchain system, the recordation request including the authentication record,
   wherein the blockchain system is configured to record the asset transfer only when the authentication record indicates that: (i) an uninterrupted chain of ownership of the physical asset has been confirmed and (ii) the recipient device has become paired with the supplier device, via a communications protocol. within a predetermined period of the blockchain system receiving the recordation request,
   wherein the authentication record is transmitted to the blockchain system to supplement any authentication mechanisms that are built into the blockchain system.

2. The method of claim 1, wherein the authentication record further includes an indication of an authority used to authenticate a recipient-side descriptor of the physical asset that is provided by the recipient device to the supplier device.

3. The method of claim 1, wherein generating the authentication record includes authenticating a recipient-side descriptor that is provided by the recipient device, and including in the authentication record an indication of whether the recipient-side descriptor has been successfully authenticated.

4. The method of claim 1, wherein generating the authentication record includes authenticating a recipient credential and including in the authentication record an indication of whether the recipient credential has been successfully authenticated.

5. The method of claim 1, wherein the communications protocol includes a short-range communications protocol, the method further comprising pairing the supplier device to the recipient device by using the short-range communications protocol and inserting into the authentication record an indication of a time when the pairing was completed.

6. The method of claim 5, wherein the communications protocol includes one of Bluetooth or a protocol based on Radio Frequency Identification (RFID).

7. The method of claim 1, wherein generating the authentication record includes storing in the authentication record an indication of whether an uninterrupted chain of ownership could be confirmed.

8. The method of claim 1, wherein the check to determine whether an uninterrupted chain of ownership of the physical asset exists is performed by determining whether a respective transfer record can be identified for each and every transfer of the physical asset that is performed during an entire life of the physical asset, starting when the physical asset is released by a manufacturer.

9. A system for recording an asset transfer, the asset transfer including a transfer of a physical asset between a first user of the system and a second user of an external device, the system comprising:
a memory; and
at least one processor that is operatively coupled to the memory, the at least one processor being configured to perform the operations of:
performing a check to determine whether an uninterrupted chain of ownership of the physical asset exists by determining whether a respective transfer record can be identified for each and every transfer of the physical asset that has taken place during at least a portion of a life of the physical asset;
generating an authentication record that is associated with the asset transfer, the authentication record including an indication of whether the uninterrupted chain of ownership of the physical asset could be confirmed as a result of performing the check; and
recording the asset transfer in a blockchain system, the asset transfer being recorded by transmitting a recordation request to the blockchain system, the recordation request including the authentication record,
wherein the authentication record is transmitted to the blockchain system to supplement any authentication mechanisms that are built into the blockchain system, and
wherein the blockchain system is configured to record the asset transfer only when the authentication record indicates that the system has become paired with an external device of the second user, via a communications protocol, within a predetermined period of the blockchain system receiving the recordation request.

10. The system of claim 9, wherein the blockchain system is further configured to record the asset transfer only when the authentication record indicates that an uninterrupted chain of ownership of the physical asset has been confirmed.

11. The system of claim 9, wherein the authentication record further includes an indication of an authority used to authenticate a recipient-side descriptor of the physical asset that is provided by the external device.

12. The system of claim 9, wherein generating the authentication record includes authenticating a recipient-side descriptor that is provided by the external device, and including in the authentication record an indication of whether the recipient-side descriptor has been successfully authenticated.

13. The system of claim 9, wherein generating the authentication record includes authenticating a recipient credential and including in the authentication record an indication of whether the recipient credential has been authenticated successfully.

14. The system of claim 9, wherein the at least one processor is further configured to:
pair the system with the external device of the second user via the communications protocol; and
include in the authentication record an indication of a time when the pairing was performed.

15. The system of claim 14, wherein the communications protocol includes one of Bluetooth or a Radio Frequency Identification (RFID) based protocol.

16. The system of claim 9, wherein generating the authentication record includes storing in the authentication record an indication of whether an uninterrupted chain of ownership could be confirmed.

17. The system of claim 9, wherein the check to determine whether an uninterrupted chain of ownership of the physical asset exists is performed by determining whether a respective transfer record can be identified for each and every transfer of the physical asset that is performed during an entire life of the physical asset, starting when the physical asset is released by a manufacturer.

18. A non-transitory computer-readable medium storing one or more processor-executable instructions, which when executed by at least one processor, cause the at least one processor of a supplier device to execute a process for recording an asset transfer, the asset transfer including a transfer of a physical asset from a first user of the supplier device to a second user of a recipient device, the process including the operations of:
performing a check to determine whether an uninterrupted chain of ownership of the physical asset exists by determining whether a respective transfer record can be identified for each and every transfer of the physical asset that has taken place during at least a portion of a life of the physical asset;
generating an authentication record that is associated with the asset transfer, the authentication record including an indication of whether the uninterrupted chain of ownership of the physical asset could be confirmed as a result of performing the check; and
recording the asset transfer in a blockchain system, the asset transfer being recorded by transmitting a recordation request to the blockchain system, the recordation request including the authentication record,
wherein the authentication record is transmitted to the blockchain system to supplement any authentication mechanisms that are built into the blockchain system, and
wherein the blockchain system is configured to record the asset transfer only when the authentication record indicates that the recipient device has become paired with the supplier device, via a communications protocol, within a predetermined period of the blockchain system receiving the recordation request.

19. The non-transitory computer-readable medium of claim 18, wherein the authentication record further includes an indication of whether a recipient-side descriptor of the physical asset is authentic, the recipient-side descriptor being provided by the recipient device to the supplier device.

* * * * *